US008948354B2

(12) United States Patent
Katis et al.

(10) Patent No.: US 8,948,354 B2
(45) Date of Patent: *Feb. 3, 2015

(54) TELECOMMUNICATION AND MULTIMEDIA MANAGEMENT METHOD AND APPARATUS

(71) Applicant: Voxer IP LLC, San Francisco, CA (US)

(72) Inventors: Thomas E. Katis, Jackson, WY (US); James T. Panttaja, San Francisco, CA (US); Mary G. Panttaja, San Francisco, CA (US); Matthew J. Ranney, Oakland, CA (US)

(73) Assignee: Voxer IP LLC, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/463,995

(22) Filed: Aug. 20, 2014

(65) Prior Publication Data

US 2014/0355488 A1  Dec. 4, 2014

Related U.S. Application Data

(63) Continuation of application No. 14/198,043, filed on Mar. 5, 2014, which is a continuation of application No. 13/555,034, filed on Jul. 20, 2012, now Pat. No. 8,705,714, which is a continuation of application No.

(Continued)

(51) Int. Cl.
*H04M 11/00* (2006.01)
*H04M 3/53* (2006.01)

(52) U.S. Cl.
CPC .............. *H04M 3/53* (2013.01); *H04M 3/5307* (2013.01)
USPC .................. 379/93.01; 379/88.13; 379/88.16; 379/88.17; 379/88.22

(58) Field of Classification Search
CPC . H04M 11/00; H04L 12/1831; H04L 12/581; H04L 29/06353; H04L 29/06401; H04L 29/06414; H04L 29/06496; H04L 51/04; H04L 51/22; H04L 51/26

USPC .......... 379/93.01, 90.01, 88.04, 88.06–88.08, 379/88.22–88.28, 93.24, 202.01; 370/260–261; 709/204–206
See application file for complete search history.

(56) References Cited

U.S. PATENT DOCUMENTS 4,807,224 A   2/1989 Naron et al.
5,117,422 A   5/1992 Hauptschein et al.
(Continued)

FOREIGN PATENT DOCUMENTS

EP   1202531      5/2002
JP   09-261155    10/1997
(Continued)

OTHER PUBLICATIONS

"dircproxy," http://home.pcisys.net/~tbc/hacks/dircproxy.htm, Downloaded on Sep. 26, 2008, 1 page.

(Continued)

*Primary Examiner* — Melur Ramakrishnaiah
(74) *Attorney, Agent, or Firm* — Beyer Law Group LLP

(57) ABSTRACT

A telecommunication and multimedia management apparatus and method that supports voice and other media communications and that enables users to: (i) participate in multiple conversation modes, including live phone calls, conference calls, instant voice messaging or tactical communications; (ii) review the messages of conversations in either a live mode or a time-shifted mode and to seamlessly transition back and forth between the two modes; (iii) participate in multiple conversations either concurrently or simultaneously; (iv) archive the messages of conversations for later review or processing; and (v) persistently store media either created or received on the communication devices of users. The latter feature enables users to generate or review media when either disconnected from the network or network conditions are poor and to optimize the delivery of media over the network based on network conditions and the intention of the users participating in conversations.

18 Claims, 33 Drawing Sheets

Related U.S. Application Data

12/037,256, filed on Feb. 26, 2008, now Pat. No. 8,243,894, which is a continuation of application No. 12/028,400, filed on Feb. 8, 2008, now Pat. No. 8,180,029.

(60) Provisional application No. 60/999,619, filed on Oct. 19, 2007, provisional application No. 60/937,552, filed on Jun. 28, 2007.

(56) References Cited

U.S. PATENT DOCUMENTS

| | | | |
|---|---|---|---|
| 5,283,818 A | 2/1994 | Klausner et al. | |
| 5,375,018 A | 12/1994 | Klausner et al. | |
| 5,390,236 A | 2/1995 | Klausner et al. | |
| 5,487,167 A | 1/1996 | Dinallo et al. | |
| 5,524,140 A | 6/1996 | Klausner et al. | |
| 5,572,576 A | 11/1996 | Klausner et al. | |
| 5,651,054 A | 7/1997 | Dunn et al. | |
| 5,692,213 A | 11/1997 | Goldberg et al. | |
| 5,734,963 A | 3/1998 | Fitzgerald et al. | |
| 5,737,011 A | 4/1998 | Lukacs | |
| 5,889,764 A | 3/1999 | Needham et al. | |
| 5,918,158 A | 6/1999 | LaPorta et al. | |
| 5,958,005 A | 9/1999 | Thorne et al. | |
| 5,963,551 A | 10/1999 | Minko | |
| 5,970,122 A | 10/1999 | LaPorta et al. | |
| 6,037,932 A | 3/2000 | Feinleib | |
| 6,092,120 A | 7/2000 | Swaminathan et al. | |
| 6,104,757 A | 8/2000 | Rhee | |
| 6,175,619 B1 | 1/2001 | DeSimone | |
| 6,233,389 B1 | 5/2001 | Barton et al. | |
| 6,262,994 B1 | 7/2001 | Dirschedl et al. | |
| 6,366,785 B2 * | 4/2002 | Saarela et al. | 455/466 |
| 6,378,035 B1 | 4/2002 | Parry et al. | |
| 6,480,783 B1 | 11/2002 | Myr | |
| 6,507,586 B1 | 1/2003 | Satran et al. | |
| 6,564,261 B1 | 5/2003 | Gudjonsson et al. | |
| 6,577,599 B1 | 6/2003 | Gupta et al. | |
| 6,580,694 B1 | 6/2003 | Baker | |
| 6,594,693 B1 | 7/2003 | Borwankar et al. | |
| 6,671,732 B1 | 12/2003 | Weiner | |
| 6,700,902 B1 | 3/2004 | Meyer | |
| 6,717,925 B1 | 4/2004 | Leppisaari et al. | |
| 6,721,703 B2 | 4/2004 | Jackson et al. | |
| 6,791,949 B1 | 9/2004 | Ryu et al. | |
| 6,807,565 B1 | 10/2004 | Dodrill et al. | |
| 6,807,578 B2 | 10/2004 | Satran et al. | |
| 6,829,473 B2 | 12/2004 | Raman et al. | |
| 6,834,039 B1 | 12/2004 | Kelly et al. | |
| 6,850,965 B2 | 2/2005 | Allen | |
| 6,912,544 B1 | 6/2005 | Weiner | |
| 6,931,114 B1 | 8/2005 | Martin | |
| 6,970,926 B1 | 11/2005 | Needham et al. | |
| 6,973,309 B1 | 12/2005 | Rygula et al. | |
| 6,993,009 B2 | 1/2006 | Kelly et al. | |
| 6,996,624 B1 | 2/2006 | LeCroy et al. | |
| 7,002,913 B2 | 2/2006 | Huang et al. | |
| 7,039,040 B1 | 5/2006 | Burg | |
| 7,039,675 B1 | 5/2006 | Kato | |
| 7,047,030 B2 | 5/2006 | Forsyth | |
| 7,058,392 B1 | 6/2006 | Weinman, Jr. | |
| 7,082,164 B2 | 7/2006 | Chaddha | |
| 7,111,044 B2 | 9/2006 | Lee | |
| 7,117,521 B2 | 10/2006 | Puthiyedath | |
| 7,139,371 B2 | 11/2006 | McElvaney | |
| 7,171,491 B1 | 1/2007 | O'Toole et al. | |
| 7,187,941 B2 | 3/2007 | Siegel | |
| 7,218,709 B2 | 5/2007 | Garg et al. | |
| 7,233,589 B2 | 6/2007 | Tanigawa et al. | |
| 7,236,738 B2 | 6/2007 | Settle | |
| 7,240,105 B2 | 7/2007 | Satran et al. | |
| 7,277,453 B2 | 10/2007 | Chin et al. | |
| 7,283,809 B1 | 10/2007 | Weinman, Jr. | |
| 7,304,951 B2 | 12/2007 | Rhee | |
| 7,305,438 B2 | 12/2007 | Christensen et al. | |
| 7,313,593 B1 | 12/2007 | Pulito et al. | |
| 7,349,871 B2 | 3/2008 | Labrou et al. | |
| 7,382,881 B2 | 6/2008 | Uusitalo et al. | |
| 7,403,775 B2 | 7/2008 | Patel et al. | |
| 7,415,284 B2 | 8/2008 | Hoover et al. | |
| 7,415,291 B1 | 8/2008 | Kirkpatrick | |
| 7,626,951 B2 | 12/2009 | Croy et al. | |
| 7,634,652 B2 | 12/2009 | McEnroe et al. | |
| 7,719,975 B2 | 5/2010 | Mallet et al. | |
| 7,913,053 B1 | 3/2011 | Newland | |
| 7,957,363 B2 | 6/2011 | Deen et al. | |
| 7,970,918 B2 | 6/2011 | Thompson et al. | |
| 8,086,222 B2 | 12/2011 | Vaananen | |
| 8,099,512 B2 | 1/2012 | Katis et al. | |
| 8,121,270 B2 | 2/2012 | Katis et al. | |
| 8,130,921 B2 | 3/2012 | Katis et al. | |
| 8,175,234 B2 | 5/2012 | Katis et al. | |
| 8,180,029 B2 | 5/2012 | Katis et al. | |
| 8,180,030 B2 | 5/2012 | Katis et al. | |
| 8,243,894 B2 | 8/2012 | Katis et al. | |
| 8,311,050 B2 | 11/2012 | Katis et al. | |
| 8,345,836 B2 | 1/2013 | Katis et al. | |
| 8,401,582 B2 | 3/2013 | Katis et al. | |
| 8,401,583 B2 | 3/2013 | Katis et al. | |
| 8,533,611 B2 | 9/2013 | Katis et al. | |
| 8,559,319 B2 | 10/2013 | Katis et al. | |
| 2001/0000540 A1 | 4/2001 | Cooper et al. | |
| 2001/0025377 A1 | 9/2001 | Hinderks | |
| 2002/0032799 A1 | 3/2002 | Wiedeman et al. | |
| 2002/0067739 A1 | 6/2002 | Wilkes et al. | |
| 2002/0091848 A1 | 7/2002 | Agresta et al. | |
| 2002/0128029 A1 | 9/2002 | Nishikawa et al. | |
| 2002/0150094 A1 | 10/2002 | Cheng et al. | |
| 2002/0154745 A1 | 10/2002 | Shtivelman | |
| 2002/0159600 A1 | 10/2002 | Weiner | |
| 2002/0184368 A1 | 12/2002 | Wang | |
| 2003/0027566 A1 | 2/2003 | Weiner | |
| 2003/0028632 A1 | 2/2003 | Davis | |
| 2003/0040301 A1 | 2/2003 | Fukuzato | |
| 2003/0099198 A1 | 5/2003 | Kiremidjian et al. | |
| 2003/0126162 A1 | 7/2003 | Yohe et al. | |
| 2003/0163580 A1 | 8/2003 | Lee | |
| 2003/0172233 A1 | 9/2003 | Mugitani et al. | |
| 2003/0186722 A1 | 10/2003 | Weiner | |
| 2003/0210265 A1 | 11/2003 | Haimberg | |
| 2004/0017905 A1 | 1/2004 | Warrier et al. | |
| 2004/0019539 A1 | 1/2004 | Raman et al. | |
| 2004/0045036 A1 | 3/2004 | Terasaki | |
| 2004/0052218 A1 | 3/2004 | Knappe | |
| 2004/0074448 A1 | 4/2004 | Bunt | |
| 2004/0090959 A1 | 5/2004 | Cinghita et al. | |
| 2004/0095900 A1 | 5/2004 | Siegel | |
| 2004/0117722 A1 | 6/2004 | Harada | |
| 2004/0125816 A1 | 7/2004 | Xu et al. | |
| 2004/0151158 A1 | 8/2004 | Gannage et al. | |
| 2004/0192353 A1 | 9/2004 | Mason et al. | |
| 2004/0192378 A1 | 9/2004 | Wulkan | |
| 2004/0203670 A1 | 10/2004 | King et al. | |
| 2004/0207724 A1 | 10/2004 | Crouch et al. | |
| 2004/0252679 A1 | 12/2004 | Williams et al. | |
| 2004/0255148 A1 | 12/2004 | Monteiro et al. | |
| 2004/0258220 A1 | 12/2004 | Levine et al. | |
| 2005/0020246 A1 | 1/2005 | Kang | |
| 2005/0021819 A1 | 1/2005 | Kilkki | |
| 2005/0025308 A1 | 2/2005 | Tischer et al. | |
| 2005/0030932 A1 | 2/2005 | Kelly et al. | |
| 2005/0037706 A1 | 2/2005 | Settle | |
| 2005/0053033 A1 | 3/2005 | Kelly et al. | |
| 2005/0102358 A1 | 5/2005 | Gold et al. | |
| 2005/0135333 A1 | 6/2005 | Rojas | |
| 2005/0144247 A1 | 6/2005 | Christensen et al. | |
| 2005/0160345 A1 | 7/2005 | Walsh et al. | |
| 2005/0202807 A1 | 9/2005 | Ayyasamy | |
| 2005/0207487 A1 | 9/2005 | Monroe | |
| 2005/0210394 A1 | 9/2005 | Crandall et al. | |
| 2005/0215228 A1 | 9/2005 | Fostick et al. | |
| 2005/0220137 A1 | 10/2005 | Prigent et al. | |
| 2005/0237999 A1 | 10/2005 | Shores et al. | |
| 2005/0259682 A1 | 11/2005 | Yosef et al. | |

(56) References Cited

U.S. PATENT DOCUMENTS

| | | |
|---|---|---|
| 2005/0288101 A1 | 12/2005 | Lockton et al. |
| 2006/0007943 A1 | 1/2006 | Fellman |
| 2006/0041815 A1 | 2/2006 | Haymond |
| 2006/0045038 A1 | 3/2006 | Kay et al. |
| 2006/0059267 A1 | 3/2006 | Cugi et al. |
| 2006/0059342 A1 | 3/2006 | Medvinsky et al. |
| 2006/0062215 A1 | 3/2006 | Lam |
| 2006/0093304 A1 | 5/2006 | Battey et al. |
| 2006/0107285 A1 | 5/2006 | Medvinsky |
| 2006/0111130 A1 | 5/2006 | Lee et al. |
| 2006/0121925 A1 | 6/2006 | Jung |
| 2006/0146822 A1 | 7/2006 | Kolakowski et al. |
| 2006/0160522 A1 | 7/2006 | Jennings |
| 2006/0168003 A1 | 7/2006 | Vau et al. |
| 2006/0172754 A1 | 8/2006 | Shin et al. |
| 2006/0187897 A1 | 8/2006 | Dabbs et al. |
| 2006/0189305 A1 | 8/2006 | Ando et al. |
| 2006/0211411 A1 | 9/2006 | Haaramo et al. |
| 2006/0212582 A1 | 9/2006 | Gupta et al. |
| 2006/0212592 A1 | 9/2006 | Gupta et al. |
| 2006/0221995 A1 | 10/2006 | Berkman |
| 2006/0224748 A1 | 10/2006 | Gupta et al. |
| 2006/0229934 A1 | 10/2006 | Law |
| 2006/0244588 A1 | 11/2006 | Hannah et al. |
| 2006/0245367 A1 | 11/2006 | Jeffery et al. |
| 2006/0248149 A1 | 11/2006 | Kraft et al. |
| 2006/0251167 A1 | 11/2006 | Van Der Schaar et al. |
| 2006/0253599 A1 | 11/2006 | Monteiro et al. |
| 2006/0268750 A1 | 11/2006 | Weiner |
| 2006/0274698 A1 | 12/2006 | Twitchell |
| 2006/0276714 A1 | 12/2006 | Holt et al. |
| 2006/0282544 A1 | 12/2006 | Monteiro et al. |
| 2006/0288391 A1 | 12/2006 | Puthiyedath |
| 2006/0294259 A1 | 12/2006 | Matefi et al. |
| 2007/0001869 A1 | 1/2007 | Hunzinger |
| 2007/0002832 A1 | 1/2007 | Sylvain |
| 2007/0006021 A1 | 1/2007 | Nicholson et al. |
| 2007/0081622 A1 | 4/2007 | Bruder et al. |
| 2007/0110046 A1 | 5/2007 | Farrell et al. |
| 2007/0168863 A1 | 7/2007 | Blattner et al. |
| 2007/0177549 A1 | 8/2007 | Lo et al. |
| 2007/0180032 A1 | 8/2007 | Pearson |
| 2007/0182819 A1 | 8/2007 | Monroe |
| 2007/0189327 A1 | 8/2007 | Konda |
| 2007/0190987 A1 | 8/2007 | Vaananen |
| 2007/0192427 A1 | 8/2007 | Berstis et al. |
| 2007/0195742 A1 | 8/2007 | Erdman et al. |
| 2007/0207785 A1 | 9/2007 | Chatterjee et al. |
| 2007/0226804 A1 | 9/2007 | Somkiran et al. |
| 2007/0263575 A1 | 11/2007 | Choe |
| 2007/0268887 A1 | 11/2007 | Schwartz |
| 2007/0294333 A1 | 12/2007 | Yang et al. |
| 2007/0300007 A1 | 12/2007 | Bulusu et al. |
| 2008/0000979 A1 | 1/2008 | Poisner |
| 2008/0002621 A1 | 1/2008 | Ginzburg et al. |
| 2008/0002691 A1 | 1/2008 | Qi et al. |
| 2008/0025300 A1 | 1/2008 | Lide et al. |
| 2008/0031448 A1 | 2/2008 | Dang et al. |
| 2008/0086700 A1 | 4/2008 | Rodriguez et al. |
| 2008/0091839 A1 | 4/2008 | Mitchell et al. |
| 2008/0095173 A1 | 4/2008 | Bugenhagen |
| 2008/0095338 A1 | 4/2008 | Cosky |
| 2008/0109865 A1 | 5/2008 | Su et al. |
| 2008/0115087 A1 | 5/2008 | Rollin et al. |
| 2008/0117901 A1 | 5/2008 | Klammer |
| 2008/0119210 A1 | 5/2008 | Snyder et al. |
| 2008/0123623 A2 | 5/2008 | Kurganov et al. |
| 2008/0123628 A1 | 5/2008 | Everard |
| 2008/0134054 A1 | 6/2008 | Clark et al. |
| 2008/0147910 A1 | 6/2008 | Hibbard et al. |
| 2008/0155032 A1 | 6/2008 | Toeroe |
| 2008/0165707 A1 | 7/2008 | Baird et al. |
| 2008/0165791 A1 | 7/2008 | DeGrazia |
| 2008/0189295 A1 | 8/2008 | Khedouri et al. |
| 2008/0205444 A1 | 8/2008 | Campbell et al. |
| 2008/0256255 A1 | 10/2008 | Mordovskoi et al. |
| 2008/0267377 A1 | 10/2008 | Siegrist |
| 2009/0003340 A1 | 1/2009 | Katis et al. |
| 2009/0003536 A1 | 1/2009 | Katis et al. |
| 2009/0003544 A1 | 1/2009 | Katis et al. |
| 2009/0003545 A1 | 1/2009 | Katis et al. |
| 2009/0003547 A1 | 1/2009 | Katis et al. |
| 2009/0003560 A1 | 1/2009 | Katis et al. |
| 2009/0003563 A1 | 1/2009 | Katis et al. |
| 2009/0063698 A1 | 3/2009 | Xu et al. |
| 2009/0103689 A1 | 4/2009 | Katis et al. |
| 2009/0175425 A1 | 7/2009 | Lee |
| 2010/0046535 A1 | 2/2010 | Bugenhagen et al. |
| 2010/0198925 A1 | 8/2010 | Katis et al. |
| 2010/0199133 A1 | 8/2010 | Katis et al. |
| 2010/0215158 A1 | 8/2010 | Katis et al. |
| 2010/0217822 A1 | 8/2010 | Katis et al. |
| 2010/0279663 A1 | 11/2010 | Wang et al. |
| 2010/0312844 A1 | 12/2010 | Katis et al. |
| 2010/0312845 A1 | 12/2010 | Katis et al. |
| 2010/0312914 A1 | 12/2010 | Katis et al. |
| 2011/0019662 A1 | 1/2011 | Katis et al. |
| 2011/0252161 A1 | 10/2011 | Ranney |
| 2012/0114108 A1 | 5/2012 | Katis et al. |
| 2012/0284352 A1 | 11/2012 | Katis et al. |

FOREIGN PATENT DOCUMENTS

| | | |
|---|---|---|
| JP | 2001-045560 | 2/2001 |
| JP | 2001-128133 | 5/2001 |
| JP | 2001-160858 | 6/2001 |
| JP | 2001-292090 | 10/2001 |
| JP | 2002-044360 | 2/2002 |
| JP | 2002-176510 | 6/2002 |
| JP | 2002-199019 | 7/2002 |
| JP | 2002-199088 | 7/2002 |
| JP | 2003-143237 | 5/2003 |
| JP | 2003-174681 | 6/2003 |
| JP | 2003-209611 | 7/2003 |
| JP | 2004-201096 | 7/2004 |
| JP | 2005-509337 | 7/2005 |
| JP | 2005-244522 | 9/2005 |
| JP | 2005-278109 | 10/2005 |
| JP | 2006-080919 | 3/2006 |
| JP | 2006-507765 | 3/2006 |
| JP | 2006-166284 | 6/2006 |
| JP | 2007-019767 | 1/2007 |
| JP | 2007-060016 | 3/2007 |
| WO | WO 03/015384 | 2/2003 |
| WO | WO 03/073642 | 9/2003 |
| WO | WO 2004/008336 | 1/2004 |
| WO | WO 2004/049608 | 6/2004 |
| WO | WO/2006/028850 | 3/2006 |
| WO | WO 2006/114673 | 11/2006 |
| WO | WO 2007/026320 | 3/2007 |

OTHER PUBLICATIONS

Apple Inc., "iPhone User's Guide," http://manuals.info.apple.com/en_US/iPhone_User_Guide.pdf, Downloaded on Oct. 3, 2008, 154 pages.

Brandx.net, "Using Talk," http://www.brandx.net/support/usingtelnet/talk.shtml, Downloaded on Sep. 19, 2008, 2 pages.

Businesswire.com "LignUp 4.0 Delivers Industry's Most Comprehensive Suite of Communications Web Services," http://www.businesswire.com/portal/site/google/index.jsp?ndmViewId=news_view&newsId=20070430005498&newsLang=en, Downloaded on Nov. 21, 2008, 10 pages.

Calore, Michael, "SpinVox Moves Into VoIP, Brings Voice-to-Text to Skype Users," Monkey_Bites, http://blog.wired.com/monkeybites/2007/08/spinvox-moves-i.html, Downloaded on Oct. 3, 2008, 4 pages.

Cardei et al., "MAC Layer QoS Support for Wireless Networks of Unmanned Air Vehicles," Proceedings of the 37th Hawaii International Conference on System Sciences—2004, Jan. 5-8, 2004 pp. 9 pp.

(56) References Cited

OTHER PUBLICATIONS

Charny, Ben, "*Nextel pushes new 'push to talk' features*," URL: http://news.zdnet.com/2100-9584_22-134945.html, Mar. 18, 2004, 3 pages.

Chen et al., "*An Adaptive Multimedia Transmission Protocol for Distributed Multimedia Applications*," Proceedings of the 5th International Workshop on Multimedia Network Systems and Applications (MNSA'2003), in conjunction with The 23rd International Conference on Distributed Computing Systems (ICDCS-2003), 6 pages.

Dannen, Chris, "*Technology: The Skype Mobile Phone Will Blow Your Mind*," Dec. 18, 2007, URL: http://www.fastcompany.com/blog/chris-dannen/lab/technology-skype-mobile-phone-will-blow-your-mind, 2 pages.

Erwu et al., "*Packet-late indication based (PLIB): adaptive jitter buffer*," ACM International Conference Proceeding Series; vol. 58, Proceedings of the winter international symposium on Information and communication technologies, Cancun, Mexico, SESSION: Performance, reliability, and quality of service, pp. 1-5 Year of Publication: 2004.

FAQS.org, "*RFC1644—T/TCP—TCP Extensions for Transactions Functional S*," http://www.faqs.org/rfcs/rfc1644.html, Downloaded on Sep. 19, 2008, 26 pages.

FluidVoice "Overview of FluidVoice," http://viral.media.mit.edu/wiki/tiki-index.php?page=FluidVoice, Downloaded on Sep. 16, 2008, 2 pages.

GrandCentral.com, "*Call Record*," http://www.grandcentral.com/howitworks/call_record, Downloaded on Sep. 26, 2008, 1 page.

GrandCentral.com, "*One Voicemail Box*," http://www.grandcentral.com/home/one_voicemail, Downloaded on Sep. 26, 2008, 1 page.

GrandCentral.com, "*So Many Features, You Won't Believe it*," http://www.grandcentral.com/support/howitworks/, Downloaded on Sep. 26, 2008, 1 page.

GrandCentral.com, "*Voicemail forwarding*," http://www.grandcentral.com/howitworks/voicemail_forwarding, Downloaded on Sep. 26, 2008, 1 page.

Henshall, Stuart, "*HotRecorder—Record Skype Calls*," Skype Journal, URL: http://skypejournal.com/blog/archives/2005/03/hotrecorder_rec.php, Mar. 25, 2005, 11 pages.

IRCHelp.org, "*An IRC Tutorial*," http://www.irchelp.org/irchelp/irctutorial.html, Downloaded on Sep. 26, 2008, 14 pages.

Kadoink.com, "*Get a Widget*," http://www.kadoink.com/index.cfm?action=getWidgets, Downloaded on Sep. 19, 2008, 3 pages.

Krishnan et al., "*EVRC-Wideband: The New 3GPP2 Wideband Vocoder Standard*," IEEE International Conference on Acoustics, Speech and Signal Processing, 2007. ICASSP 2007, Publication Date: Apr. 15-20, 2007, vol. 2, on pp. II-333-II-336, Honolulu, HI.

Layton, Julia, "*How Slingbox Works*," Jan. 4, 2006, HowStuffWorks.com, http://electronics.howstuffworks.com/slingbox.htm, 9 pages.

LignUp.com, "*LignUp Communications Applications Server*," http://www.lignup.com/platform/index.html, Downloaded on Sep. 19, 2008, 1 page.

Network Dictionary, "*Instant Message (IM) Technology Overview*," http://www.networkdictionary.com/networking/im.php, Downloaded on Sep. 16, 2008, 2 pages.

Nikotalkie.com, "*Nikotalkie—Home*," http://www.nikotalkie.com/, Downloaded on Sep. 19, 2008, 2 pages.

Nikotel.com, "*Click-Pop-Talk WebStart Phone*," http://www.nikotel.com/nikotel-click-pop-talk-java-phone.html, Downloaded on Sep. 19, 2008, 1 page.

Notaras, George, "*dircproxy IRC Proxy*," http://www.g-loaded.eu/2007/02/01/dircproxy-irc-proxy/, Downloaded on Sep. 26, 2008, 4 pages.

Pash, Adam, "*Consolidate Your Phones with GrandCentral*," http://techgroup.groups.vox.com/library/post/6a00cd978d0ef7f9cc00e398b8ff7a0002.html, Downloaded on Sep. 19, 2008, 5 pages.

Patel, Nilay, "*Apple patent reveals data-to-voice translation system for cellphones*," Jul. 28, 2007, URL: http://www.engadget.com/2007/07/28/apple-patent-reveals-data-to-voice-translation-system-for-cellph/, 5 pages.

Piecuch et al., "*A Selective Retransmission Protocol for Multimedia on the Internet*," In Proceedings of SPIE Multimedia Systems and Applications, Nov. 2000, Boston MA, USA, 12 pages.

Qiao et al., "*SCTP Performance Issue on Path Delay Differential*," Lecture Notes in Computer Science, Springer Berlin / Heidelberg ISSN 0302-9743 (Print) 1611-3349 (Online) vol. 4517/2007, Wired/Wireless Internet Communications, pp. 43-54 Sunday, Jun. 24, 2007.

Ramo et al., "*On comparing speech quality of various narrow- and wideband speech codecs*," Proceedings of the Eighth International Symposium on Signal Processing and Its Applications, 2005. Publication Date: Aug. 28-31, 2005, vol. 2, on pp. 603-606.

Rey et al., "*I-D Action:draft-ietf-avt-rtp-retransmission-09.txt*," Aug. 5, 2003, http://osdir.com/ml/ietf.avt/2003-08/msg00003.html, Downloaded on Sep. 19, 2008, 2 pages.

Ribbit.com, "*Amphibian*," http://www.ribbit.com/everyday/, Downloaded on Sep. 26, 2008, 1 page.

Ribbit.com, "*Enhanced Visual Voicemail*," http://www.ribbit.com/everyday/tour/enhanced_visual_voicemail.php, Downloaded on Sep. 26, 2008, 2 pages.

Ribbit.com, "*What is Ribbit? Features*," http://www.ribbit.com/platform/features.php, Downloaded on Sep. 26, 2008, 1 page.

Ribbit.com, "*What is Ribbit? Overview*," http://www.ribbit.com/platform/index.php, Downloaded on Sep. 26, 2008, 1 page.

Ribbit.com, "*What is Ribbit? Voice Architecture*," http://www.ribbit.com/platform/architecture.php, Downloaded on Sep. 26, 2008, 2 pages.

Saito et al., "*IP Packet Loss Compensation Scheme with Bicast and Forwarding for Handover in Mobile Communications*," 2006 IEEE 17th International Symposium on Personal, Indoor and Mobile Radio Communications, Sep. 2006, pp. 1-5, Helsinki.

Skype.com, "*Making calls is just the start*," URL: http://www.skype.com/features/, Downloaded on Sep. 16, 2008, 2 pages.

Spinvox.com, "*Home Page*," http://www.spinvox.com/, Downloaded on Sep. 26, 2008, 3 pages.

Spinvox.com, "*How Does it Work?*," http://www.spinvox.com/how_it_works.html, Downloaded on Sep. 19, 2008, 2 pages.

Swissvoice.net, "*PSTN*," http://www.swissvoice.net/ww/htm_ww/08_technology/content_pstn.html, Downloaded on Sep. 19, 2008, 3 pages.

Tektronix, "*VOIP Technology Overview; Protocols, Convergence, Testing*," http://www.tektronics.com/voip, May 12, 2006.

The Jabber Extensible Communications Platform™, "*Products // Jabber XCP*," URL: http://www.jabber.com/CE/JabberXCP, Downloaded on Sep. 16, 2008, 2 pages.

ThunkDifferent.com, "*YouMail vs. Google Grandcentral Voice Mail Service*," http://thunkdifferent.com/2007/10/11/youmail-vs-google-grandcentral-voice-mail-service/ , Downloaded on Oct. 3, 2008, 6 pages.

VOIP-News.com, "*Company Profile, LignUp*," http://www.voip-news.com/vendors/lignup/, Downloaded on Dec. 5, 2008, 6 pages.

WikiBooks, "*Internet Technologies/IRC*," http://en.wikibooks.org/wiki/Internet_Technologies/IRC, Downloaded on Sep. 19, 2008, 4 pages.

WikiPedia—The Free Encyclopedia, "*E-mail*," http://en.wikipedia.org/wiki/E-mail, Downloaded on Sep. 19, 2008, 8 pages.

WikiPedia—The Free Encyclopedia, "*Internet Relay Chat*," http://en.wikipedia.org/wiki/Internet_Relay_Chat, Downloaded on Oct. 3, 2008, 11 pages.

WikiPedia—The Free Encyclopedia, "*Spinvox*," http://en.wikipedia.org/wiki/Spinvox, Downloaded on Sep. 26, 2008, 1 page.

WikiPedia—The Free Encyclopedia, "*TiVo*", http://en.wikipedia.org/wiki/TiVo, Downloaded on Sep. 16, 2008, 6 pages.

Yavuz et al., "*VoIP over cdma2000 1xEV-DO Revision A*," IEEE Communications Magazine, Feb. 2006, pp. 88-95.

HotRecorder.com, "*Features*," http://www.hotrecorder.com/music_features.asp, downloaded on Sep. 26, 2008, 1 page.

HotRecorder.com, "*Help*," http://www.hotrecorder.com/music_help.asp, downloaded on Sep. 26, 2008, 3 pages.

(56) References Cited

OTHER PUBLICATIONS

HotRecorder.com, "*FAQs*," http://www.hotrecorder.com/music_support.asp, downloaded on Sep. 26, 2008, 1 page.
WikiPedia—The Free Encyclopedia, "*Skype*," http://en.wikipedia.org/wiki/Skype, Downloaded on Sep. 26, 2008, 7 pages.
WikiPedia—The Free Encyclopedia, "*Skype Protocol*," http://en.wikipedia.org/wiki/Skype, Downloaded on Sep. 26, 2008, 4 pages.
Jabber.org, "*Main page*," http://www.jabber.org/web/main_page, Sep. 2, 2008, downloaded on Sep. 26, 2008, 1 page.
Jabber.org, "*FAQ*," http://www.jabber.org/web/faq, Sep. 4, 2008, downloaded on Sep. 26, 2008, 2 pages.
Apple Inc., "*iPhone: About Visual Voicemail*," http://www.support.apple.com/kb/HT1486, Downloaded on Sep. 26, 2008, 3 pages.
Jabber.org, "*Products // Jabber XCP // Benefits*," http://www.jabber.com/CE/JabberXCPBenefits, downloaded on Sep. 26, 2008, 1 page.
Jabber.org, "*Products // Jabber Clients*," http://www.jabber.com/CE/JabberClients, downloaded on Sep. 26, 2008, 1 page.
Jabber.org, "*Products // JabberNow*" http://www.jabber.com/CE/JabberNow, downloaded on Sep. 26, 2008, 1 page.
KillerStartups.com, "*Kadoink.com—Mobilizing your Socializing*," http://www.killerstartups.com/Web20/kadoink-com-moblizing-your-socializing, Downloaded on Sep. 26, 2008, 3 pages.
CNETNews.com, "*Kadoink's phonecast lines officially open for texting*," http://news.cnet.com/8301-17939_109-9829877-2.html, downloaded on Sep. 26, 2008, 1 page.
BusinessWire.com, "*LignUp 4.0 Delivers Industry's Most Comprehensive Suite of Communications Web Services*," Apr. 30, 2007, http://www.businesswire.com/portal/site/google/?ndmViewId=news_view&newsId=20070430005498&newsLang=en, Downloaded on Sep. 26, 2008, 6 pages.
VOIP-News.com, "*Company Profile—LignUp*," http://www.voip-news.com/vendors/lignup/, Downloaded on Oct. 3, 2008, 6 pages.
JustAnotheriPhoneBlog.com, "*Nikotalkie—Just Talk, Don't Type*," http://justanotheriphoneblog.com/wordpress/2007/10/13/nikotalkie-just-talk-dont-type/, Downloaded on Sep. 26, 2008, 10 pages.
WikiPedia—The Free Encyclopedia, "*Push to Talk*" http://en.wikipedia.org/wiki/Push_to_talk, Downloaded on Sep. 26, 2008, 3 pages.
WikiPedia—The Free Encyclopedia, "*Slingbox*" http://en.wikipedia.org/wiki/Slingbox, Downloaded on Sep. 26, 2008, 4 pages.
About.com, "*Linux / Unix Command: talk*,"http://linux.about.com/od/commands/l/b1cmdl1_talk.htm, Downloaded on Sep. 26, 2008, 2 pages.
Fall, Kevin, "*A Delay-Tolerant Network Architecture for Challenged Internets*," Feb. 2003, http://www.dtnrg.org/docs/papers/IRB-TR-03-003.pdf, 15 pages.
Chuah et al., "*Store-and-Forward Performance in a DTN*," Vehicular Technology Conference, 2006. VTC 2006-Spring. IEEE 63$^{rd}$, Publication Date: May 7-10, 2006, vol. 1, on pp. 187-191.
Krishnan, et al., "*The SPINDLE Disruption-Tolerant Networking System*," Military Communications Conference, 2007. MILCOM 2007. IEEE Volume , Issue , Oct. 29-31, 2007 pp. 1-7.
WikiPedia—The Free Encyclopedia, "*Visual Voicemail*" http://en.wikipedia.org/wiki/Visual_voicemail, downloaded on Sep. 26, 2008, 1 page.
Amir et al., "*An Overlay Architecture for High Quality VoIP Streams*,", IEEE Transactions on Multimedia, Publication Date: Dec. 2006, vol. 8, Issue:6, on pp. 1250-1262.
Rothermel et al., "*An Adaptive Stream Synchronization Protocol*," Lecture Notes in Computer Science; vol. 1018, Proceedings of the 5th International Workshop on Network and Operating System Support for Digital Audio and Video, pp. 178-189, Year of Publication: 1995.
Baset et al., "*An Analysis of the Skype Peer-to-Peer Internet Telephony Protocol*," INFOCOM 2006. 25th IEEE International Conference on Computer Communications. Proceedings (2006), pp. 1-11.
Cerf et al., "*A Protocol for Packet Network Intercommunication*," Communications, IEEE Transactions on, vol. 22, Issue 5, May 1974 pp. 637-648.

WikiPedia—The Free Encyclopedia, "*Eudora (email client)*," http://en.wikipedia.org/wiki/Eudora_(e-mail_client), Downloaded on Aug. 20, 2009, 3 pages.
"*Eudora*," Answers.com, http://www.answers.com/topic/eudora-e-mail-client, Downloaded on Aug. 20. 2009, 4 pages.
"*The Eudora Open Messaging Advantage*," Qualcomm, 1997, Part No. 100-50030-1, 23 pages.
"*Aspera—Next Generation File Transport—Broadcasting & Entertainment Media*," Asperasoft.com, http://www.asperasoft.com/en/industries/digital_media_10/Broadcast_Entertainment_Media_5, Downloaded on Sep. 22, 2009, 2 pages.
"*Aspera—Next Generation File Transport—fasp™ transfer times*," Asperasoft.com, http://www.asperasoft.com/en/technology/fasp_transfer_times_14/fasp_transfer_times_14, Downloaded on Sep. 22, 2009, 1 page.
"*Aspera—Next Generation File Transport—the fasp solution*," Asperasoft.com, http://www.asperasoft.com/en/technology/fasp_solution_3/the_fasp_solution_3, Downloaded on Sep. 22, 2009, 3 pages.
"*Aspera—Next Generation File Transport—the shortcomings of TCP file transfer*," Asperasoft.com, http://www.asperasoft.com/en/technology/shortcomings_of_TCP_2/the_shortcomings_of_TCP_file_transfer_2, Downloaded on Sep. 22, 2009, 2 pages.
"*Aspera—Next Generation File Transport—fasp technology overview*" Asperasoft.com, http://www.asperasoft.com/en/technology/fasp_overview_1/fasp_technology_overview_1, Downloaded on Sep. 22, 2009, 2 pages.
"*Aspera fasp™ High Speed Transport—A Critical Technology Comparison*," White Paper, Asperasoft.com, http://www.asperasoft.com/en/technology/white_papers_13/aspera_fasp_high_speed_transport_13, Downloaded on Sep. 22, 2009, 11 pages.
"*Palringo Brings First Push-to-Talk Application to the iPhone*," RedOrbit.com, http://www.redorbit.com/news/technology/1525545/palringo_brings_first_pushtotalk_application_to_the_iphone/index.html, Downloaded on Aug. 13, 2009, 2 pages.
*Palringo—Features*, Palringo.com, http://www.palringo.com/en/gb/features/, Downloaded on Aug. 13, 2009, 1 page.
Moren, Dan, "*Palringo Brings Picture Messaging to Iphone*," http://www.pcworld.com/article/149108/palringo_brings_picture_messaging_to_iphone.html, Downloaded on Aug. 13, 2009, 3 pages.
Paul, Ryan, "*Gmail gets Google Talk integration*,"Arstechnica.com, http://arstechnica.com/old/content/2006/02/6128.ars , Downloaded on Aug. 20, 2009, 1 page.
Sherman, Chris, "*Google Integrates Chat with Gmail*,"Search Engine Watch, http://searchenginewatch.com/3583121, Feb. 7, 2006, Downloaded on Aug. 20, 2009, 2 pages.
"*About Gmail*," http://mail.google.com/mail/help/chat.html, Downloaded on Aug. 20, 2009, 3 pages.
WikiPedia—The Free Encyclopedia, "*Google Talk*," http://en.wikipedia.org/wiki/Google_Talk, Downloaded on Aug. 20, 2009, 8 pages.
Azuri, Calvin, "*Palringo Gold Launched on BlackBerry Smartphone*", Apr. 20, 2009, http://ivr.tmcnet.com/topics/ivr-voicexml/articles/54573-palringo-gold-launched-blackberry-smartphone.htm, Downloaded on Aug. 13, 2009, 3 pages.
Liaw, Kim Poh, "*Palringo launches its IM Software for Android Phones*," Slashphone.com, Mar. 24, 2009, http://www.slashphone.com/palringo-launches-its-im-software-for-android-phones-245111, Downloaded on Aug. 13, 2009, 8 pages.
WikiPedia—The Free Encyclopedia, "*Palringo*" http://en.wikipedia.org/wiki/Palringo, Downloaded on Aug. 13, 2009, 1 page.
Final Office Action in U.S. Appl. No. 12/037,749, dated Jul. 8, 2011.
International Search Report from PCT/US2008/062941, mailed Oct. 24, 2008.
Written Opinion from PCT/US2008/062941, mailed Oct. 24, 2008.
International Search Report from PCT/US2008/062049, mailed Jan. 12, 2009.
Written Opinion from PCT/US2008/062049, mailed Jan. 12, 2009.
Office Action in EP 08747806.1, dated Apr. 27, 2010.
Office Action in EP 08769254.7, dated Jul. 12, 2010.
Office Action in U.S. Appl. No. 12/042,987, dated Nov. 24, 2010.
Office Action in U.S. Appl. No. 12/102,722, dated Dec. 8, 2010.
Office Action in U.S. Appl. No. 12/103,436, dated Dec. 8, 2010.

(56) References Cited

OTHER PUBLICATIONS

Office Action in EP 08747806.1, dated Nov. 18, 2010.
Final Office Action in U.S. Appl. No. 12/042,987, dated Jul. 13, 2011.
Final Office Action in U.S. Appl. No. 12/102,722, dated Jul. 13, 2011.
Final Office Action in U.S. Appl. No. 12/103,436, dated Jul. 13, 2011.
"Store and Forward," Wikipedia, the free encyclopedia, URL: http://en.wikipedia.org/wiki/Store_and_forward, Downloaded on Oct. 26, 2011, 2 pages.
Examination Report from Australian application No. 2008270956, dated Jan. 12, 2011.
Examination Report from Australian Application No. 2008270956, dated Feb. 7, 2012.
Office Action in Chinese Application No. 200880021664.9, mailed May 3, 2012, with English translation.
Office Action in Chinese Application No. 200880021553.8, mailed May 17, 2012, with English translation.
Office Action in Chinese Application No. 200880021725.1, mailed May 17, 2012, with English translation.
Office Action in Chinese Application No. 200880016045.0, mailed Jun. 25, 2012, with English translation.
Office Action in U.S. Appl. No. 13/466,011, dated Aug. 3, 2012.
Office Action in Japanese Patent Application No. 2010-514896, mailed Aug. 7, 2012, with English translation.
Patent Examination Report from AU 2008270895, dated Sep. 11, 2012.
"Protocol for Multimedia Application Text Conversion," International Telecommunication Union, Published Feb. 1998, 17 pages.
Office Action in U.S. Appl. No. 12/102,722, dated Sep. 27, 2012.
Office Action in U.S. Appl. No. 12/042,987, dated Oct. 9, 2012.
Office Action in U.S. Appl. No. 12/110,219 dated May 3, 2012.
International Search Report from PCT/US2008/063117 dated Oct. 24, 2008.
Written Opinion from PCT/US2008/063117 dated Oct. 24, 2008.
Chinese Office Action from 200880021723.2, mailed May 4, 2012 with English translation.
Office Action in U.S. Appl. No. 12/103,436 dated Oct. 11, 2012.
Office Action in U.S. Appl. No. 12/037,749 dated Oct. 15, 2012.
Office Action in U.S. Appl. No. 13,466,011 dated Oct. 17, 2012.
Notice of Allowance in U.S. Appl. No. 13/549,318 mailed Oct. 18, 2012.
Notice of Allowance in U.S. Appl. No. 12/110,219 mailed Nov. 13, 2012.
$2^{nd}$ Patent Examination Report from AU 2008270895, dated Nov. 1, 2012.
Peter, I., et al., "The Wavelet Stream: Progressive transmission of compressed light field data" In IEEE Visualization 1999 (pp. 69-72).
Wurmlin, S., et al. "3D Video Recorder: A System for Recording and Playing Free-Viewpoint Video" Computer Graphics forum vol. 22(2003), No. 2 pp. 181-193.
Office Action in Japanese Patent Application No. 2010-514894 dated Oct. 30, 2012, with English Translation.
Office Action in Japanese Patent Application No. 2010-514916 dated Dec. 18, 2012, with English Translation.
Office Action in U.S. Appl. No. 13/466,011 dated Jan. 4, 2013.
Office Action in U.S. Appl. No. 13/666,747 dated Mar. 6, 2013.
Office Action in Japanese Patent Application No. 2010-514896 dated Dec. 7, 2012, with English Translation.
Office Action in Chinese Patent Application No. 200880021664.9 dated Jan. 14, 2013, with English Translation.
Office Action in Chinese Patent Application No. 200880016045.0 dated Feb. 25, 2013, with English Translation.
Office Action in U.S. Appl. No. 12/102,722 dated Apr. 25, 2013.
Office Action in U.S. Appl. No. 12/775,389 dated Jun. 28, 2013.
Office Action in U.S. Appl. No. 12/775,383 dated Jun. 28, 2013.
Extended EP Search Report in EP Application No. 11179399.8, dated Apr. 11, 2013.
Anonymous: "VoiceEmotion", Jun. 3, 2006. XP55058210, Retrieved from the Internet: URL:http:jjweb.archive.orgj web/20060603021611/http://www.voiceemotion.comjtutorial.htm [retrieved on Apr. 2, 2013].
Anonymous: "VoiceEmotion", May 5, 2006. XP55058207. Retrieved from the Internet: URL:http:jjweb.archive.orgjweb/20060505064512/http://www.voiceemotion.com/index.htm [retrieved on Apr. 2, 2013].
Extended EP Search Report in EP Application No. 11170723.8, dated Apr. 22, 2013.
Office Action in U.S. Appl. No. 13/549,318 dated Aug. 9, 2013.
Office Action in U.S. Appl. No. 12/037,749 dated Aug. 16, 2013.
Office Action in U.S. Appl. No. 12/103,436 dated Aug. 16, 2013.
Office Action in U.S. Appl. No. 12/775,383 dated Nov. 13, 2013.
Korean Office Action in KR 10-2013-7011111 dated Nov. 15, 2013, with English translation.
Office Action in U.S. Appl. No. 13/549,318 dated Nov. 29, 2013.
Office Action in U.S. Appl. No. 12/775,389 dated Nov. 27, 2013.
Office Action in U.S. Appl. No. 12/552,979, dated Jun. 17, 2013.
Office Action in U.S. Appl. No. 12/552,980, dated Jun. 13, 2013.
Advisory Action in U.S. Appl. No. 12/552,979, dated Jul. 10, 2013.
Advisory Action in U.S. Appl. No. 12/552,980, dated Jul. 10, 2013.
Office Action in U.S. Appl. No. 12/037,749 dated Dec. 27, 2013.
Office Action in U.S. Appl. No. 13/549,318 dated Dec. 31, 2013.
Notice of Allowance in U.S. Appl. No. 12/775,383 dated Jan. 6, 2014.
Office Action in Korean. Patent Application No. 10-20107001868 dated Jan. 6, 2014.
Office Action in Korean. Patent Application No. 10-20107001879 dated Jan. 6, 2014.
Office Action in Korean. Patent Application No. 10-20107020536 dated Jan. 6, 2014.
Office Action in U.S. Appl. No. 12/102,722 dated Jan. 27, 2014.
Office Action in U.S. Appl. No. 12/103,436 dated Jan. 30, 2014.
Office Action in Japanese Patent Application No. 2013-073423 dated Feb. 10, 2014.
Notice of Allowance in U.S. Appl. No. 13/549,318 dated Feb. 19, 2014.
Office Action from EP Application No. 11179399.8 dated Feb. 3, 2014.
Trial Decision in JP Application No. 2010-514896, mailed Feb. 4, 2014 with English Summary.
Office Action in U.S. Appl. No. 13/555,034 dated Jan. 22, 2013.
Office Action in U.S. Appl. No. 13/555,034 dated Apr. 17, 2013.
Office Action in U.S. Appl. No. 13/555,034 dated Jan. 6, 2014.
Notice of Allowance in U.S. Appl. No. 13/555,034 dated Feb. 20, 2014.
Office Action in Japanese Patent Application No. JP 2013-073422 dated Mar. 10, 2014.
Office Action in Japanese Patent Application No. JP 2013-081798 dated Apr. 8, 2014.
Office Action in Korean Patent Application No. 10-2013-7011111 dated May 12, 2014.
Office Action in U.S. Appl. No. 12/102,722 dated Jul. 18, 2014.
U.S. Final Office Action dated Sep. 4, 2014 from U.S. Appl. No. 12/103,436.

\* cited by examiner

TELECOMMUNICATION AND MULTIMEDIA MANAGEMENT METHOD AND APPARATUS

CROSS-REFERENCE TO RELATED APPLICATIONS

This application is a continuation of U.S. application Ser. No. 14/198,043, filed Mar. 5, 2014, which is a continuation of U.S. application Ser. No. 13/555,034 (now U.S. Pat. No. 8,705,714), filed Jul. 20, 2012, which is a continuation of U.S. application Ser. No. 12/037,256 (now U.S. Pat. No. 8,243,894), filed on Feb. 26, 2008, which is continuation of Ser. No. 12/028,400 (now U.S. Pat. No. 8,180,029), filed on Feb. 8, 2008 entitled "TELECOMMUNICATION AND MULTIMEDIA MANAGEMENT METHOD AND APPARATUS", which claims the benefit of U.S. Provisional Patent Application No. 60/937,552, filed Jun. 28, 2007 entitled "RETHINKING VOICE COMMUNICATION" and U.S. Provisional Patent Application No. 60/999,619, filed on Oct. 19, 2007 entitled "TELECOMMUNICATION AND MULTIMEDIA MANAGEMENT SYSTEM AND METHOD." All of the foregoing applications are incorporated herein by reference in their entirety for all purposes.

BACKGROUND

1. Field of the Invention

This invention pertains to telecommunications, and more particularly, to a telecommunication and multimedia management method and apparatus that enables users to review the messages of conversations in either a live mode or a time-shifted mode and to transition the conversation back and forth between the two modes, participate in multiple conversations and to archive the messages of conversations for later review or processing.

2. Description of Related Art

The current state of voice communications suffers from inertia. In spite of automated switching, high bandwidth networks and technologies such as satellites, fiber optics, Voice over IP (VoIP), wireless and cellular networks, there has been little change in how people use telephones. One is still required to pick up the phone, dial another party, wait for a connection to be made, and then engage in a full-duplex, synchronous conversation with the dialed party. If the recipient does not answer, no connection is made, and the conversation does not take place.

At best, a one-way asynchronous voice message may be left if the recipient has voice mail. The process of delivering the voice mail, however, is burdensome and time consuming. The caller is required to wait for the phone on the other end to stop ringing, transition into the voice mail system, listen to a voice message greeting, and then leave the message. Current voice mail systems are also inconvenient for the recipient. The recipient has to dial a code to access their voice mail, navigate through a series of prompts, listen to any earlier received voice messages in the queue, and then finally listen to the message of the sender.

Another drawback with typical voice mail systems is the inability to organize or permanently archive voice messages. With some voice mail systems, a user may save a message, but it is automatically deleted after a predetermined period of time and lost forever.

Yet another problem with current voice mail systems is that a connection must be made between the caller and the voice mail system before a message can be left. If no connection is made, there is no way for the caller to leave a message.

Current telephone systems are based on relatively simplistic usage patterns: real-time live calls or disjointed voice mail messages, which are typically deleted as they are heard. These forms of voice communications do not capture the real power that can be achieved with voice communication or take advantage of the advances of network speed and bandwidth that is now available. Also, if the phone network is down, or is inaccessible, (e.g., a cell phone user is in an area of no coverage or the phone lines are down due to bad weather), no communication can take place.

In general, telephone based communications have not kept pace with the advances in text-based communications. Instant messaging, emailing, faxing, chat groups, and the ability to archive text messages, are all commonplace with text based communications. Other than voice mail, there are few existing tools available to manage and/or archive voice messages. In comparison, the tools currently available to manage telephone communications are primitive compared to text communications.

The corporate environment provides just one example of the weakness in current voice communication tools. There is currently no integrated way to manage voice communications across an organization as a corporate asset. Employees generally do not record or persistently store their phone conversations. Most business related voice communication assets are gone as quickly as the words are spoken, with no way to manage or store the content of those conversations in any manageable form.

As an illustrative example, consider a sales executive at a company. During the course of a busy day, the executive may make a number of calls, and close several sales, with customers over the phone. Without the ability to organize, store, and later retrieve these conversations, there is no way for the executive to resolve potential issues that may arise, such as recalling the terms of one deal versus another, or challenging a customer who disputes the terms of a previously agreed upon sale. If this executive had the ability to easily retrieve and review conversations, these types of issues could be easily and favorably resolved.

Current tactical radio systems, such as those used by the military, fire, police, paramedics, rescue teams, and first responders, also suffer from a number of deficiencies. Most tactical radio communication must occur through a "live" radio connection between the sender of a message and a recipient. If there is no radio connection between the two parties, there can be no communication. Urgent messages cannot be sent if either the sender or the receiver does not have access to their radio, or a radio circuit connection is not established. Tactical communications are therefore plagued with several basic problems. There is no way (i) to guarantee the delivery of messages, (ii) for a recipient to go back and listen to a message that was not heard in real time; (iii) to control the granularity of the participants in a conversation; (iv) for the system to cope when there is a lack of signal integrity for a live conversation. If a message is not heard live, it is missed. There are no tools for either the sender or a recipient to manage, prioritize, archive and later retrieve (i.e. time-shift) the messages of a conversation that were previously sent.

Yet another drawback with tactical radio communication systems is that only one message can be sent at a time per channel. Consider an example of a large building fire, where multiple teams of fire fighters, police and paramedics are simultaneously rescuing victims trapped in the building, fighting the fire, providing medical aid to victims, and controlling bystanders. If each of the teams is using the same channel, communications may become crowded and chaotic.

Transmissions get "stepped on" when more than one person is transmitting at the same time. Also there is no way to differentiate between high and low priority messages. A team inside the burning building fighting the fire or rescuing trapped victims should have a higher priority over other teams, such as those controlling bystanders. If high priority messages are stepped on by lower priority messages, it could not only hamper important communications, but could endanger the lives of the fire fighters and victims in the building.

One possible solution to the lack of ability to prioritize messages is to use multiple channels, where each team is assigned a different channel. This solution, however, creates its own set of problems. How does the fire chief determine which channel to listen too at any point in time? How do multiple teams communicate with one another if they are all on different channels? If one team calls for urgent help, how are other teams to know if they are listening to other channels? While multiple channels can alleviate some issues, it can also cause confusion, creating more problems than if a single channel is used.

The lack of management tools that effectively prioritize messages, that allow multiple conversations to take place at the same time, that enable the time-shifting of messages to guarantee delivery, or that support archiving and storing conversations for later retrieval and review, all contribute to the problems associated with tactical radios. In first responder situations, such as with the military, police, and fire, effective communication tools can literally mean the difference between life and death, or the success or failure of a mission. The above burning building example is useful in illustrating just some of the issues with current tactical radio communications. Similar problems exist with the military, police, first responders and others who use tactical communications.

With packet-based networks, commonly used protocols include Transmission Control Protocol (TCP) and User Datagram Protocol (UDP). UDP offers the advantage of fast delivery of data, but at the expense of completeness. Packets may be dropped in transit and not available when attempting to render the data as soon as possible at the destination. In spite of the shortcomings, UDP is the standard for Voice over Internet Protocol (VoIP) transmissions due to its speed attributes. On the other hand TCP does guarantee the delivery of perfect (i.e., an exact copy of the transmitted data) data, but at the expense of latency. All packets are delivered, regardless of how long it takes. This delay makes TCP impractical for use with "live" phone calls. Currently there are no known protocols that offer the performance advantages of both TCP and UDP, where "good enough" media can be transmitted for rendering as soon as possible, with the eventual delivery of a perfect copy of the media. Also there is no protocol that determines how much information should be sent over the network based on the presence of recipients on the network and their intentions to render the data either live or in a time-shifted mode. In addition, other factors commonly considered, such as network latency, network degradation, packet loss, packet damage, and general bandwidth conditions, are used in determining how much data to transmit. Prior art systems, however, do not consider the presence and intentions of recipients. As a result, the default assumption is that the data is rendered by the recipient in real time. When a recipient is not going to render data immediately, these prior art systems unnecessarily use bandwidth when it is not needed, degrading the overall performance of the network.

For the reasons recited above, telephone, voicemail and tactical voice communications systems are inadequate. An improved voice and media communication and management system and method, and improvements in delivering voice and other media over packet-based networks, is therefore needed.

SUMMARY OF THE INVENTION

The above-described problems are solved by a communication application, method and apparatus that supports new modes of engaging in conversations and/or managing multiple conversations using a variety of media types, such as voice, video, text, location, sensor information, and other data. Users can engage in conversations by sending messages to designated recipients. Depending on preferences and priorities, the recipient(s) might participate in the conversation in real time, or they might simply be notified that the message is ready for retrieval. In the latter case, the recipient participates in the conversation in a time-shifted mode by reviewing and replying to the recorded message at their convenience.

Users are empowered to conduct communications in either: (i) a near-synchronous or "live" conversation, providing a user experience similar to a standard full duplex phone call; or (ii) in a series of back and forth time-delayed transmissions (i.e., time-shifted mode). Further, users engaged in a conversation can seamlessly transition from the live mode to the time-shifted mode and back again. This attribute also makes it possible for users to engage in multiple conversations, at the same time, by prioritizing and shifting between the two modes for each conversation. Two individuals using the system can therefore send recorded voice messages back and forth to each other and review the messages when convenient, or the messages can be sent at a rate where they essentially merge into a live, synchronous voice conversation. This new form of communication, for the purposes of the present application, is referred to as "Voxing."

When you "Vox" someone, the conversation consists of a series of discrete recorded messages, which are recorded in a number of locations, which may include the encoding device of the sender, (e.g. a phone or computer), servers on multiple transmission hops across the network, and the receiver's rendering device. Unlike a standard phone call or voice mail, the system provides the following features and advantages: (i) the conversation can transition between live and time-shifted or vice versa; (ii) the discrete messages of the conversation are semantically threaded together and archived; (iii) since the messages are recorded and are available for later retrieval, attention can be temporarily diverted from the conversation and then the conversation can be later reviewed when convenient; (iv) the conversation can be paused for seconds, minutes, hours, or even days, and can be picked up again where left off; (v) one can rejoin a conversation in progress and rapidly review missed messages and catch up to the current message (i.e., the live message); (vi) no dedicated circuit is needed for the conversation to take place, as required with conventional phone calls; and (vii) lastly, to initiate a conversation, one can simply begin transmitting to an individual or a group. If the person or persons on the other end notice that they are receiving a message, they have the option of reviewing and conducting a conversation in real time, or reviewing at a later time of their choice.

The communication media management system also supports new modes of optimizing the transmission of data over a network. The system actively manages the delivery of payloads to a recipient engaged in a conversation in real time when network conditions are less than ideal. For example when network conditions are poor, the system intentionally reduces the quality of the data for transmission to the point where it is "good enough" to be rendered upon receipt by the recipient, allowing the real time participation of the conversation. The system also guarantees the eventual delivery of an "exact" copy of the messages over time. The system and method therefore provides the advantages of both speed and accuracy. The utilization of network bandwidth is optimized by making tradeoffs between timeliness and media quality, using the presence and intentions of whether or not recipient(s) intend to review to the message immediately in real time, as well as measures of network latency, network degradation, packet loss or damage, and/or current bandwidth conditions.

It should be noted that the messages of conversations may contain voice only or voice, video and other data, such as sensor information. When the messages are reviewed, they are listened to or visually reviewed, or a combination thereof, depending on the type of media contained in the messages. Although as of the filing of the present application, most conversations are voice only, it is intended that the communication system and method described herein broadly includes conversations including multiple media types, such as voice and video for example.

BRIEF DESCRIPTION OF THE DRAWINGS

The invention may best be understood by reference to the following description taken in conjunction with the accompanying drawings, which illustrate specific embodiments of the invention.

It should be noted that like reference numbers refer to like elements in the figures.

DETAILED DESCRIPTION OF SPECIFIC EMBODIMENTS

Figure 1:
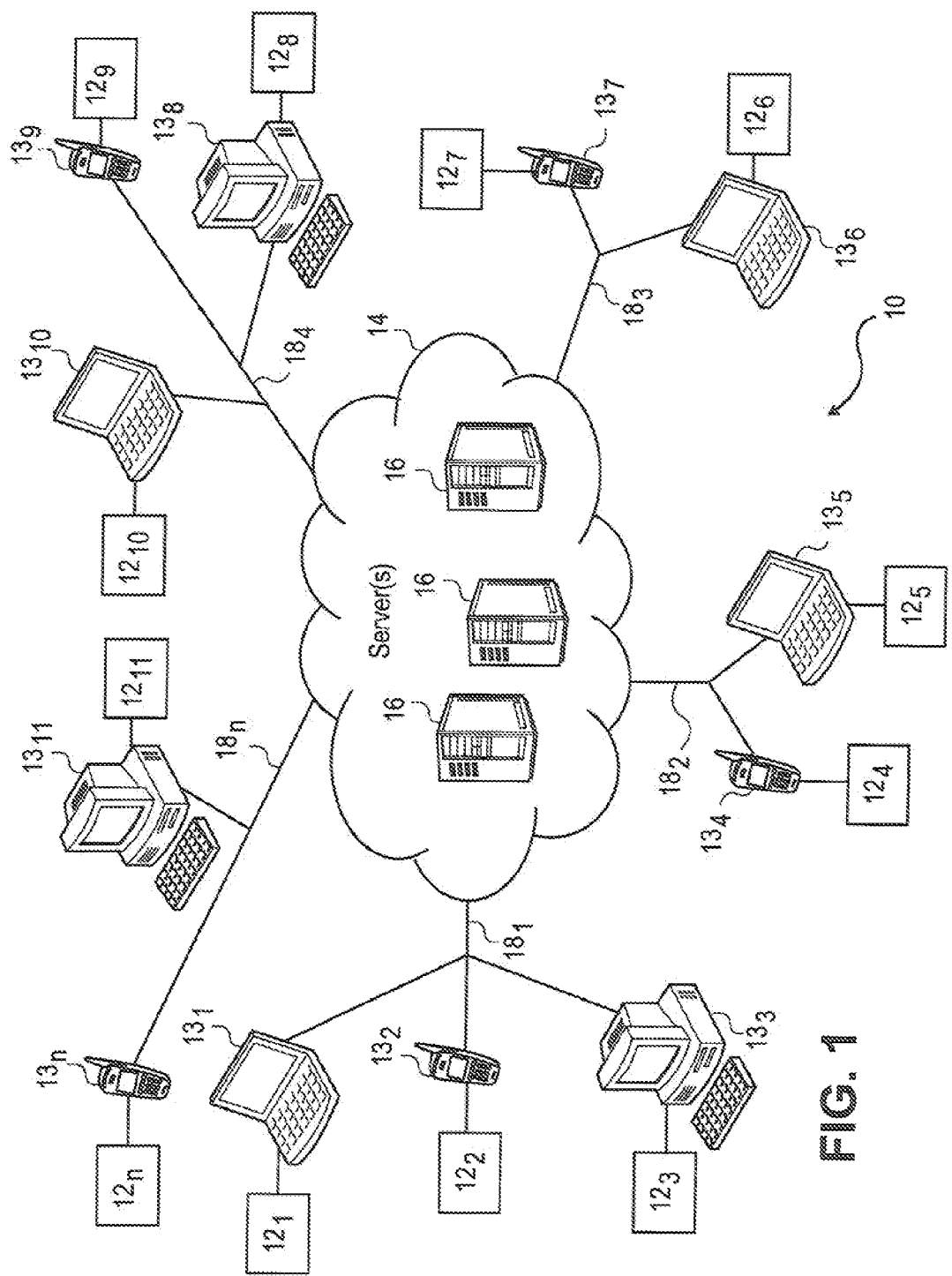
FIG. 1 is a diagram of the architecture of the communication and media management system of the invention.

The invention will now be described in detail with reference to various embodiments thereof as illustrated in the accompanying drawings. In the following description, specific details are set forth in order to provide a thorough understanding of the invention. It will be apparent, however, to one skilled in the art, that the invention may be practiced without using some of the implementation details set forth herein. It should also be understood that well known operations have not been described in detail in order to not unnecessarily obscure the invention.

A. Functional Overview

An improved voice and other media communication application, method and apparatus is disclosed which provides one or more of the following features and functions:

i. enabling users to participate in multiple conversation types, including live phone calls, conference calls, voice messaging, consecutive or simultaneous communications;

ii. enabling users to review the messages of conversations in either a live mode or a time-shifted mode (voice messaging);

iii. enabling users to seamlessly transition a conversation between a synchronous "live" mode and a time shifted mode;

iv. enabling users to participate in conversations without waiting for a connection to be established with another participant or the network. This attribute allows users to begin conversations, participate in conversations, and review previously received time-shifted messages of conversations even when there is no network available, when the network is of poor quality, or other participants are unavailable;

v. enabling the system to save media payload data at the sender and, after network transmission, saving the media payload data at all receivers;

vi. enabling the system to organize messages by threading them sequentially into semantically meaningful conversations in which each message can be identified and tied to a given participant in a given conversation;

vii. enabling users to manage each conversation with a set of user controlled functions, such as reviewing "live", pausing or time shifting the conversation until it is convenient to review, replaying in a variety of modes (e.g., playing faster, catching up to live, jump to the head of the conversation) and methods for managing conversations (archiving, tagging, searching, and retrieving from archives);

viii. enabling the system to manage and share presence data with all conversation participants, including online status, intentions with respect to reviewing any given message in either the live or time-shifted mode, current attention to messages, rendering methods, and network conditions between the sender and receiver;

ix. enabling users to manage multiple conversations at the same time, where either (a) one conversation is current and all others are paused; (b) multiple conversations are rendered consecutively, such as but not limited to tactical communications; or (c) multiple conversations are active and simultaneously rendered, such as in a stock exchange or trading floor environment.

x. enabling users to store all conversations, and if desired, persistently archive them in a tangible medium, providing an asset that can be organized indexed, searched, transcribed, translated and/or reviewed as needed;

xi. enabling the system to provide real time call functionality using a best-efforts mode of message delivery at a rate "good enough" for rendering as soon as possible (similar to UDP), and the guaranteed eventual delivery of exact copies of the messages as transmitted by requesting retransmission of any missing or defective data from the originally saved perfect copy (similar to TCP); and xii. enabling the system to optimize the utilization of network bandwidth by making tradeoffs between timeliness and media quality, using the presence and intentions of the recipient(s) (i.e., to either review the media in real-time or in a time-shifted mode), as well as measures of network latency, network degradation, packet loss or damage, and/or current bandwidth conditions.

In various embodiments, some or all of the numerous features and functions listed above may be implemented. It should be understood, however, that different embodiments of the invention need not incorporate all of the above listed features and functions.

B. Glossary

Prior to explaining the details of the invention, it is useful to define some of the terms and acronyms used throughout the written description. This glossary of terms is organized into groups of System Components, Media, Media Management, People and Conversation Management.

B.1. System Components

Client: A Client is the user application in the communication system, which includes a user interface, persistent data storage, and "Voxing" functionality. Users interact with the Client application, and the Client application manages all communications (messages and signals) and payload (Media) transfers that are transmitted or received over a network. The Client supports encoding of media (e.g., the capturing of voice, video, or other data content) and the rendering of media and supports security, encryption and authentication as well as the optimization of the transmission of data across the network. A Client may be used by one or multiple Users (i.e., multi-tenant).

Device: A physical device that runs the Client application. A User may be actively logged into a single Device or multiple Devices at any given point of time. In various embodiments, a Device may be a general-purpose computer, a portable computing device, a programmable phone, a programmable radio, or any other programmable communication device.

Servers: A computer node on the communication network. Servers are responsible for routing Messages sent back and forth between Users over the network and the persistent storage and archiving of Media payloads. Servers provide routing, transcoding, security, encryption and authentication and the optimization of the transmission of data across the network.

B.2. Media

Message: An individual unit of communication from one User to another. Each Message consists of some sort of Media, such as voice or video. Each Message is assigned certain attributes, including: (i) the User sending the message; (ii) the Conversation it belongs to; (iii) an optional or user created Importance Tag; (iv) a time stamp; and (v) the Media payload.

Media: Audio, video, text, position, sensor readings such as temperature, or other data.

Conversation: A thread of Messages (identified, persistently stored, grouped, and prioritized) between two or more Users on their Devices. Users generally participate in a Conversation using their Devices by either Reviewing Messages in real time or in a time-shifted mode, or creating and sending Messages of a Conversation as desired. When new Messages are created, they either define a new Conversation, or they are added to an existing Conversation.

Head of a Conversation: The most recent Message of a conversation that has been encoded by the most recent speaker. It is where a User is positioned in a Conversation when reviewing "live" or where one jumps to if the "Jump To Live" feature is used.

Multiple Conversation Management System or MCMS: An application that runs as part of a Client application, which enables a User to engage in multiple Conversations using a variety of Media types. With the MCMS application, a User selects one Conversation among the multiple Conversations as current, where only the Messages of current conversation are rendered. For the selected current Conversation, the User may transition from a series of back and forth Messages in time-shifted mode to near-synchronous "live" mode, similar to a standard telephone conversation, and back again. The Messages of the non-selected Conversations are in a paused state. Messages associated with the non-selected Conversion will accumulate if others are still participating in those Conversations. The User may selectively transition the current Conversation among the multiple Conversations and Review the accumulated Messages of the selected current Conversation.

Multiple Conversation Management System-Consecutive or MCMS-C: Similar to MCMS, with the added feature of rendering and enabling Users to manage and participate in multiple Conversations consecutively through a hierarchical system of Priorities and time-shifting, which are automatically managed by the system. The MCMS-C application allows the Messages of consecutive Conversations to be rendered in a prioritized order, as opposed to MCMS where only the Messages of the currently selected Conversation are rendered. MCMS-C is particularly applicable in situations where it is important that the Messages of the consecutive Conversations are rendered, in the prioritized order, and/or the receipt of all Messages, even those belonging to lower priority Conversations, is more important than receiving the Messages in real-time. Examples of situations where MCMS-C may be suitable include, but are not limited to, hospitals, taxi fleet management, or tactical communications.

Multiple Conversation Management System-Simultaneous or MCMS-S: Similar to MCMS, with the added feature of enabling With MCMS-S, multiple Conversations are selected for simultaneous rendering, as opposed to MCMS where the Messages of only the selected current Conversation are rendered. The MCMS-S application is particularly applicable in situations where a User is listening to multiple Conversations at the same time, such as a trader listening to multiple brokers on different exchanges and periodically sending trading requests to one or multiple of them simultaneously. MCMS-S may also be suitable for tactical communications as well.

Priority: The mechanism through which the system determines which Message to render next when a User is participating in MCMS-C. Priority is automatically managed by the system. A User can set default Priorities, or a predetermined set of system Priorities may be used. In the event of a conflict, where more than one Message is ready to be rendered at the same time, the system resolves the conflict at least partly based on Priority, to determine what Message to render immediately and what Message to time shift.

Tags: a set of attributes a User or the system may assign to a Conversation or a message, such as a topic (a company name), a directive ("action items"), a indicator ("conversation summary"), or any other label by which one might want to search or organize the data.

Importance Tags: A special Message attribute that enables a sender to specify when a Message is to be rendered, regardless of other Priority settings. An "urgent" Importance tag will override other Priorities for example. This feature is critical for tactical systems, though any system can be configured to use or disable this feature.

Packet: Any unit of binary data capable of being routed through a computer network. Each packet consists of header (meta data) and payload (media data). Includes standard packet protocols such as, but not limited to, Internet Protocol (IP), EvDO, UMTS or any other packet-based network, either radio, fiber optic, or wired.

Header or Packet Header: The portion of a packet that describes the packet; the meta data concerning the payload, its encoding type and destination.

Vox packet: A proprietary packet that enables the system and method to further refine and optimize the delivery of Messages, Media and other signaling information.

Media Payload (or Payload): The actual Media portion of a Packet.

B.3. Media Management

Time Shift Delay (TSD): The amount of time between the arrival of a Vox Packet and the rendering of the Packet on a Device. The TSD must exceed the Minimum Time Shift Delay. The TSD is typically determined by the User's behavior in choosing to review the Messages of a Conversation some time after receipt.

Minimum Time Shift Delay (MTSD): The time shift delay enforced by the Client to allow for jitter processing using jitter buffer techniques. This causes the system to delay rendering until an adequate number of the packets have arrived to create a usable media stream. The system will typically adaptively adjust the MTSD over time to compensate for variable conditions in the network.

Rendering: Delivering a Media stream to a User in a form suitable for User consumption (e.g., voice, text, graphic display, video, or a combination thereof).

Mixing: The Rendering of one or more Media streams. For example, the Media stream from two Participants of a Conversation may be Mixed when Rendered, creating a User experience similar to a conversation where multiple people are speaking at the same time.

Encoding: The process of translating Media either created by a User (such as voice or video) or otherwise originating on a Device (such as GPS or other sensor data), and converting the media into digital data to be processed by a Client.

Adaptive Jitter Buffer: Jitter buffers or de-jitter buffers are used to counter jitter (i.e., either the arrival of out of sequence packets or the delayed arrival of packets) introduced by packet switched networks, so that the continuous rendering of audio (or video) signals transmitted over a network can be performed without disruption. The data is stored in a buffer before Rendering to allow a reasonably sized buffer of Media to arrive. The Media may be rendered before all the Packets are received, trading off quality for currency. An Adaptive Jitter Buffer is capable of dynamically changing its size to optimize the delay/quality tradeoff.

Persistent Infinite Message Buffer (PIMB): The PIMB is a storage management system for the storage of time-based Media that performs both the de-jittering of "live" data and the storage and retrieval of archive data. The PIMB further includes the additional attributes of potentially infinite and persistence storage of Media. The PIMB maintains "exact" or full copies of Vox Packets of a Message and Conversations at some or all Participant Devices and/or Servers.

Packet Loss Compensation or Concealment) (PLC): During Rendering of a Media stream, the PLC component compensates for missing Packets, interpolating the results to present the stream to a reviewer. Missing Packets may be rendered as silence, or information from adjacent Packets may be used to present an interpolated sound or image. The particular method to be used will be dependent on the media, Codecs in use, and other generally known parameters.

B.4. People

User: A person who is authorized to use the system.

Contact: A record of either a User or non-user of the system. Users typically engage in Conversations with members on their list of Contacts. A non-user is a user that accesses or uses the system using a legacy phone, radio or other non-Client 12 enabled device.

Group: The association of multiple Contacts. Contacts may be selectively added or deleted from a Group. When a Conversation takes place among a Group, all the members of the Group may or may not participate.

Channel: Typically used for tactical communication systems. A Channel is similar to a Group in that it associates multiple Contacts with the Channel.

Participant: A person who is identified as a member of a Conversation. Could be a User or a non-User participant.

B.5. Conversation Management

Time Shifting: Time shifting is the ability to play any Message at any time after it has been received as determined by the User-recipient. By Time-Shifting, a User may Review a Message: (i) immediately on demand by Rendering immediately after the MTSD; or (ii) time-shifted in a mode of reviewing the Message upon the discretion of the User; (iii) from the archive for searching, reconstructions, etc. of old Conversations; (iv) after a delayed period of time to accommodate the Reviewing of other higher Priority Messages (or Conversations) that need to reviewed first; (v) and/or repeatedly if necessary for the Message to be reheard and understood. In other words, Time Shifting is the ability of a user to render a Message at any time after the system imposed MTSD.

Reviewing: Listening, viewing, reading or otherwise observing the Media content in Messages. Reviewing may take place in either a near synchronous real-time "live mode" or the time-shifted mode.

Intention: Either (i) a User-defined attribute capturing whether the User wants to Review the Messages of a Conversation either as soon as possible or Review the Messages in a time-shifted mode; (ii) implied by a User's behavior; or a combination of (i) and (ii).

Attention: A user attribute capturing whether the User is Reviewing the Messages of a given Conversation at the moment.

Catch Up To Live (CTL): A rendering mode that allows a User, who is not at the Head of a Conversation, to Review previous Messages more quickly to "Catch Up To Live" (i.e., the Head of the Conversation). The CTL feature may use any of a number of catch up techniques, such as the faster replay of Messages, the removal of gaps in the Media of the Messages, removal of hesitation particles, etc. When the User has caught up to live, the system seamlessly flows into the live Conversation. This is a very useful feature with conference calls, for example, in situations where a User needs to temporarily shift their attention away from the Conversation, but wishes to hear the entire Conversation upon their return.

Catch Up Mode: A user-configured or pre-configured mode that determines how the CTL process will catch-up (i.e., replay faster, remove silence, and hesitation particles, or a combination thereof).

Jump To Live (JTL): This feature allows a user to jump from their current position to the Head of a Conversation. A user will typically use the JTL feature when they do not want to Review all of the Messages between their current position in the Conversation and the Head. When the JTL feature is implemented, the user skips over any intervening Messages and starts Rendering the "live" Messages at the head of the Conversation.

MCMS Participant Attributes: A set of attributes, either defined by a User, interpreted by the system from the User's behaviors, assigned by an administrator, or a combination thereof, which define the Intention, Attention, Priority, and rendering preferences of a receiver for a given Conversation. The attributes include, but are not limited to: (i) the Intention of when a receiver would like to render to the Messages of the Conversation. Possible Intention values include: "now", "time-shifted", "Catch Up To Live" (CTL), "paused", and "never"; (ii) Catch Up Mode, which is a configuration setting which determines how the CTL process should catch the receiver up to live (e.g., play faster, skip silence gaps or hesitations, or play at normal speed); (iii) Time Shift Delay (TSD), which defines how far the receiver's current position in the conversation is from the Head of the Conversation, and (iv) the Priority of the Message with regard to the receiver's other Conversations.

C. System Architecture

Referring to FIG. 1, a block diagram of the telecommunication and media management system according to one embodiment of the invention is shown. The system 10 includes a plurality of Clients $12_1$ through $12_n$, running on Devices $13_1$ through $13_n$ respectively. The Devices 13 communicate with one another over a communication services network 14, including one or more Servers 16. One or more networks $18_1$ through $18_n$, is provided to couple the plurality of Devices $13_1$ through $13_n$ to the communication services network 14. In various embodiments, the networks 18 may be the Public Switched Telephone Network (PSTN), a cellular network based on CDMA or GSM for example, the Internet, a tactical radio network, or any other communication network, or a combination thereof. The communication services network 14 is a network layer on top of or otherwise in communication with the various networks $18_1$ through $18_n$. In various embodiments, the network layer 14 is either heterogeneous or homogeneous. Clients $12_1$ through $12_n$ communicate with one another and with Servers 16 over the networks $18_1$ through $18_n$ and network 14 using individual message units referred to as "Vox packets", which are described in detail below.

D. Client Architecture

Figure 2A:
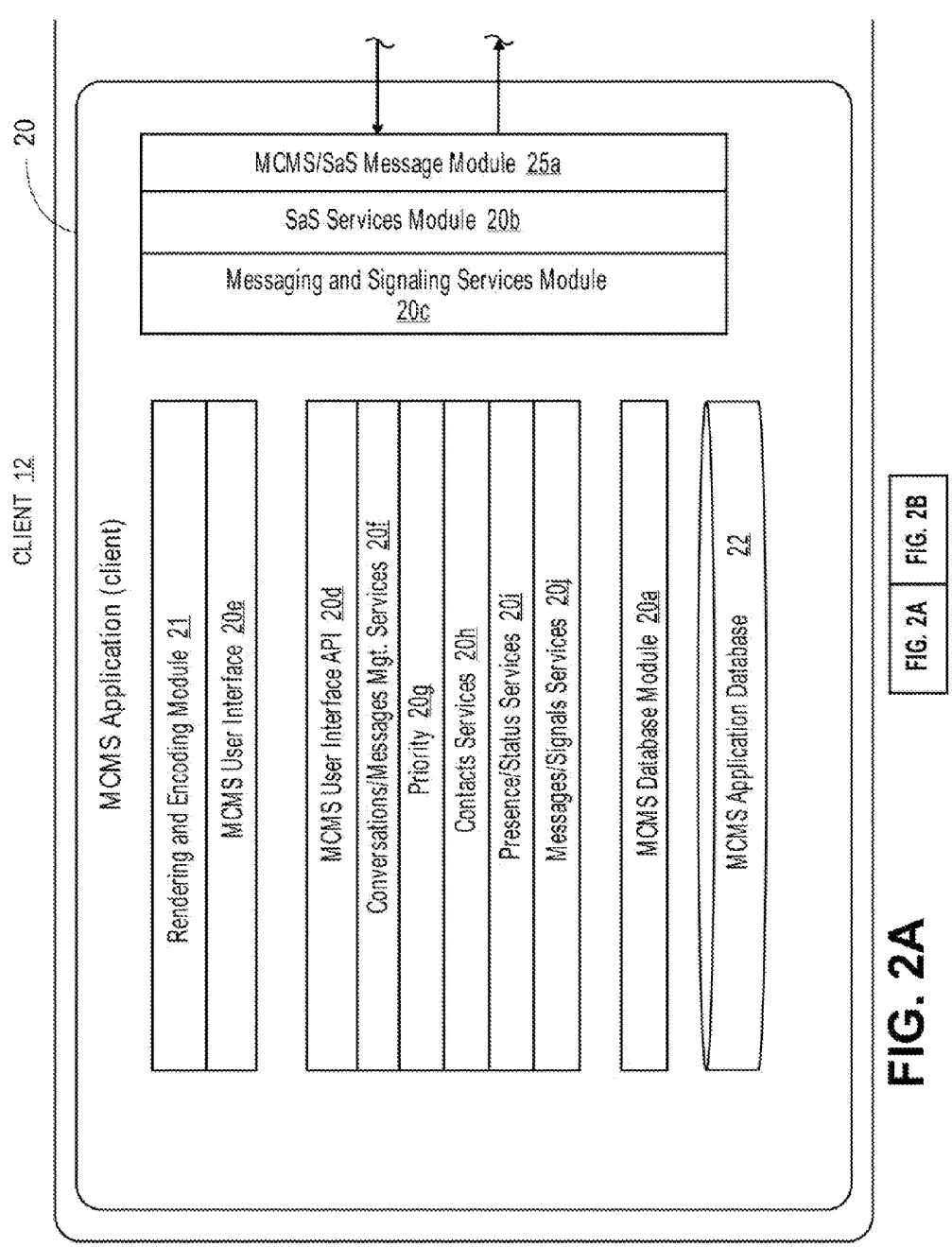
FIGS. 2A and 2B illustrate a block diagram of a Client running on a Device in the communication and management system of the invention.
Figure 2B:
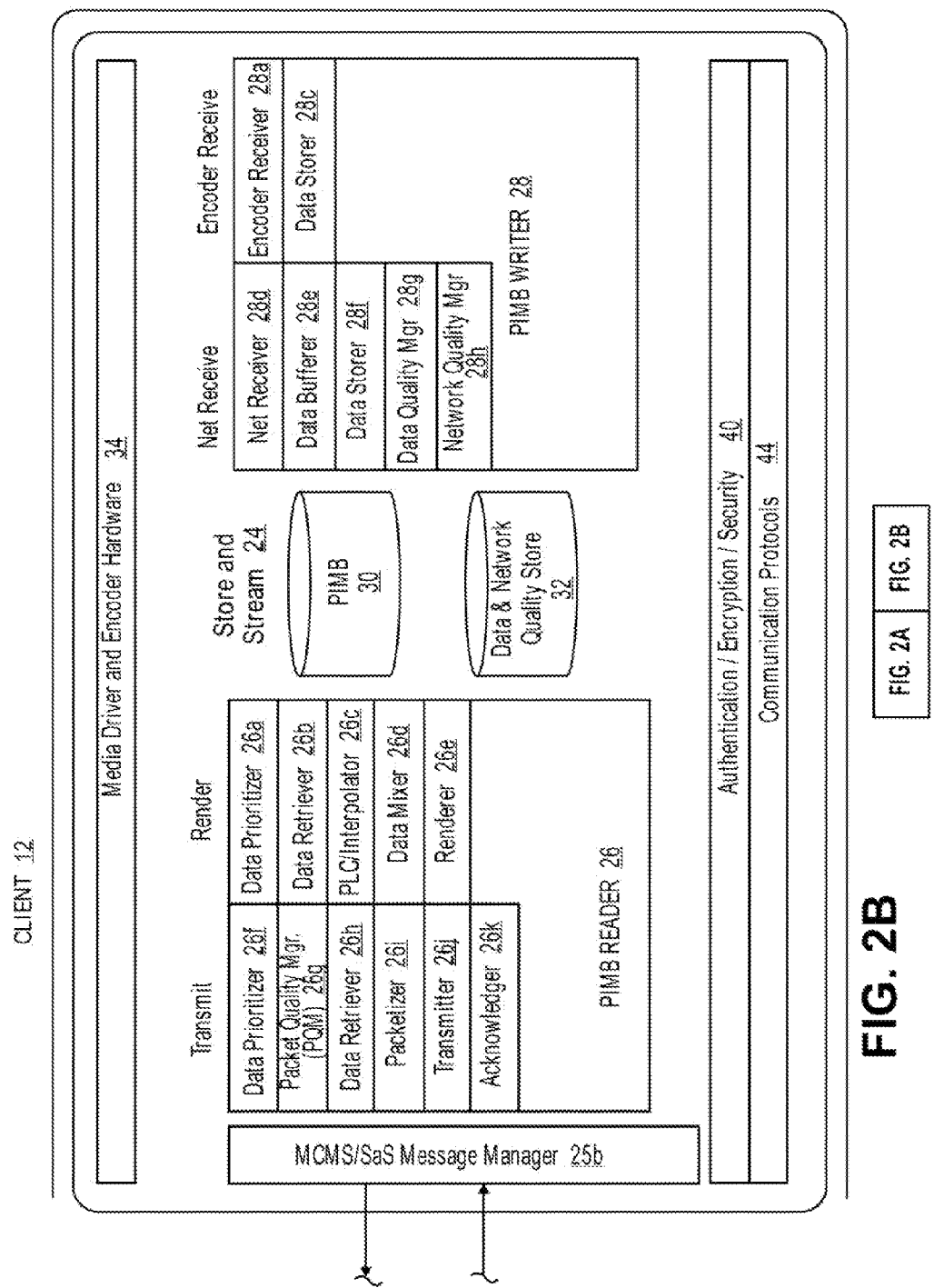

Referring to FIGS. 2A and 2B, a block diagram of a Client 12 running on a Device 13 is illustrated. As illustrated in FIG. 2A, the Client 12 includes Multiple Conversation Management System (MCMS) application 20, a rendering and encoding module 21, and an MCMS applications database 22. As illustrated in FIG. 2B, the Client 12 further includes a Store and Stream (SAS) module 24 with a Persistent Infinite Message Buffer (PIMB) reader 26, a PIMB writer 28, PIMB database 30, a data and network quality (DNQS) store 32, and Media driver and encoder hardware 34. The MCMS application 20 and the Store and Stream module 24 communicate with one another through message handling modules 25a and 25b respectively. The Client 12 further includes an authentication-encryption-security module 40 and a communication protocol module 44.

The module 40 provides authentication, encryption and security services during the transmission and receipt of "Vox" packets to and from the Client 12. The communication protocol module 44 encapsulates Vox packets into the native packets used by the underlying network 18 connected to the Device 13 running the Client 12 when transmitting data and de-encapsulating Vox packets from the native packets when receiving data. With the modules 40 and 44, multi-party end-to-end authentication, encryption and security is provided between Clients 12. Messages are authenticated, encrypted and secured across the networks $18_1$ through $18_n$ and network 14, from a first sending Device 13 to second receiving Device 13.

D.1.1. The MCMS Database

The database 22 stores and manages the persistent meta data for a number of entities in the system 10, including Contacts and Participants, Conversations and Messages (live and stored), and default Priorities, and information regarding the Servers 16. In addition, the MCMS database 22 stores the moment-to-moment operational data of a User's Conversations, presence, and status, as well as that of all the Participants conversing with the User or on the User's Contact list. For example, with regard to Conversations and Messages, the database 22 keeps track of status information, such as what Messages of a Conversation a User has or has not Reviewed, Priorities, and Catch Up To Live status for each Conversation in which the Client 12 is a Participant, the presence and status of all Participants, and other network and other system management data.

D.1.2. The MCMS Application

MCMS application 20 supports the different Voxing modes of engaging in conversations and/or managing multiple conversations using a variety of media and data types (voice, video, text, location, data, etc.). Users engage in Conversations by sending Messages to designated recipients using their Client 12 enabled Devices 13. Depending on preferences and Priorities, the recipient might Review the Message in real time, or they might simply be notified that the Message is ready for Reviewing. Users can transition from a series of back and forth Messages, which are Reviewed in a time-shifted (or voice messaging) mode or in a near synchronous, full duplex conversation (similar to standard "live" phone calls) and then back to voice messaging again. The MCMS application 20 allows a User to control their interactions with their most important Conversations in real-time without missing any Messages in other ongoing Conversations. For example, the MCMS application 20 notifies a User of urgent or high priority communications from a Conversation that they are not currently Reviewing. MCMS application 20 also enables all Messages from all Conversations to be stored for later retrieval so they can be reviewed at any time.

In accordance with various embodiments, there are several different operational modes of the MCMS application 20, including MCMS-Consecutive (MCMS-C) and MCMS-Simultaneous (MCMS-S), which support the consecutive and simultaneous rendering of Messages respectively. Each of these embodiments is described in more detail below. Unless specifically specified, the term "MCMS" is intended to generally mean the MCMS application 20, which includes the aforementioned different modes.

The MCMS application 20 is a multi-tiered architecture that includes a number of modules and services. The modules and services include the MCMS Database Module 20a, the SAS Services Module 20b, the Messaging and Signaling Services Module 20c, the User Interface Application Programming Interface (API) 20d, the User Interface Module 20e, the Conversations/Messages Management Services 20f, the Priorities Services 20g, the Contacts Service 20h, the Presence/Status Services 20i, and the Messages/Signals Services 20j.

D.1.2.1 The MCMS Database Module

The MCMS database module 20a is a service module that manages all function calls necessary for the MCMS application 20 to access the MCMS database 22.

D.1.2.2 The SAS Services Module

The SAS Services module 20b includes a set of function calls that enable communication and coordination between the MCMS application 20 and the Store and Stream module 24, and which are passed back and forth through the message handling modules 25a and 25b respectively. The set of function calls enable both the MCMS application 20 and the Store and Stream module 24 to operate as necessary to implement the various Voxing functions when invoked by Users and/or as dictated by network conditions. Some of the functionality performed by the SAS Services module 20b includes maintaining and communicating the status of Message transmissions and Message acknowledgments, the instructions for rendering of Messages, and the status and presence of Users.

D.1.2.3 The Messaging and Signaling Services Module

The Messaging and Signaling Services module 20c runs on both Clients 12 and Servers 16 and enables communication between the Client 12 and the Servers 16 of the system 10. This communication, which includes messages, data and other signals, allows the Client 12 and the system 10 to track and administer communications, network status, Users, and User status. Types of messages and signals sent between the Message and Signaling Services modules 20c running on the Clients 12 and the Servers 16 include, for example, network availability of Users, tracking of Messages that the Server 16 has sent to the Client 12 (possibly including a "high water mark") to determine if an entire message or some portion of a message is missing, (e.g., a sequence number per Participant per Conversation created by the "generating" Client), whether a user is speaking or Reviewing Messages of a given Conversation, where a User is with respect to the Head of a Conversation, or when a Participant is no longer Reviewing a Conversation live. These are examples a few of the many types of messages and signals sent between the Message and Signaling Services modules on the Clients 12 and Servers 16 and in no way should be construed as limiting the invention.

D.1.2.4 The User Interface API

The User Interface API 20d is a module that defines a set of function calls that define the programming interface between the User Interface module 20e and the underlying services of the MCMS application 20. The User Interface API 20d supports general-purpose methods such as UI application support, and all function calls necessary for a User Interface to operate the MCMS Application 20. In various embodiments, the User Interface API 20d enables the Client 12 to support a wide variety of user interfaces and device types, such as Adobe Flash-based and/or Microsoft Windows applications, cellular or mobile phone devices, PSTN devices driven with tones, a voice user interface (VUI), and physical radio communication interfaces. In various embodiments, the User Interface API module 20d enables the design of both highly flexible and highly constrained user interfaces to support the functionality of the MCMS application 20.

D.1.2.5 The MCMS User Interface Module

The MCMS User Interface module 20e supports the operation and functions of the audio and video user interface of the Client 12. The User Interface module 20e supports a host of user interactions and can be implemented with various interaction mediums, such as, an array of graphical user interface screens, an Audio/DTMF interface, or voice user interface on the Device 13, all of which enable a User to interface with the system 10. A partial list of User interactions that are supported include, for example, functions to: log-in; manage, join, and monitor Conversations; control Conversation rendering; manage Priorities; and requests to review archived Conversations. It should be noted that this list is exemplary and in no way should be construed as limiting the invention.

D.1.2.6 Conversation/Message Management Services

The Conversation/Message management services 20f is a module which defines a set of functions that manage the data structures and processes responsible for managing and retaining all information needed for the User to manage the receipt and Review of transmitted and received Media (e.g., voice or video content Messages) between the participants of a Conversation. The Messages are organized into Conversations. Media that is sent or received by the Device 13 running the application 12 is available for immediate Review while being received. The received Media is also recorded for Review in a time-shifted mode, Conversation management, and archival purposes. In an alternative embodiment, Messages or Conversations can be optionally marked for transience, specifying their desired retention requirements (e.g., some Messages will not be retained or stored beyond the requirements for immediate rendering). In yet another embodiment, Media can be optionally marked for review in a time-shifted mode only and cannot be reviewed immediately upon receipt.

The Conversation/Message management services 20f further enables, for each current or ongoing Conversation of the User, the sending of Media to a receiving Client 12 at any time, and the receiving Client 12 seamlessly associates these Messages with the appropriate Conversation, regardless of the actions or inaction of the receiver.

With the Conversation/Message management services 20f, all Conversations are essentially asynchronous. If two Users are actively engaged in a given Conversation and the User controlled delay between transmissions is minimal, the experience will be one of a synchronous full duplex conversation, as with current telephone or VoIP conversations. If either User delays their participation, for whatever reason, the Conversation drifts towards an asynchronous voice (or other Media) messaging experience. In alternative embodiments, Conversations can be optionally Tagged as asynchronous Messages only or synchronous Messages only. In either of these cases, the Conversation cannot drift between the two modes, unless the Tag is reset. After the Tag is reset, the Conversation again may flow between near synchronous (i.e. live or real-time) and asynchronous (i.e., time-shifted or voice messaging) modes.

The Conversation/Message management service 20f processes the transmission and receipt of Messages in a progressive fashion. When transmitting, Media may be created while Messages are simultaneously encoded, stored and transmitted. In other words, the transmission of Messages may occur simultaneously with the generation of Media by the User (i.e., while speaking into their Device 13 or generating video). On the receiving side, the receipt, storage, and Rendering of Messages also all occur progressively. Messages do not need to be completely received before they can be Rendered. The Rendering of Messages may occur at the same time Messages are being delivered, right up to the MTSD. Further, the service 20f is also capable of the simultaneous transmission of outgoing Messages and Rendering of incoming Messages. The progressive nature of the service 20f allows a User to be engaged in a live Conversation while storing and streaming the media of the Conversation for later retrieval and review as well other functions described herein.

The time-shifting of Messages by the Conversation/Message management services 20f allows a User to "Catch Up To Live" on a Conversation if they missed earlier Messages or were involved in another Conversation. This time-shifting process eliminates the need for Users to broadcast a request to their entire Group or Channel to have Messages repeated. Older Messages may be replayed at any time at potentially higher speeds to save time. Users may easily skip forward and backward through their Messages and within individual Messages. The Reviewing process may be configured on a Message-Priority basis to potentially skip lower priority Messages.

In one embodiment, the Conversation/Message management service 20f also identifies Messages by a specific Participant (speaker) and, by default, mixes Messages of a Conversation that were delivered at the same time (MCMS-S). In an optional embodiment, a User could Review the transmissions of different Participant speakers of a Conversation separately.

The Conversation/Message management module 20f further allows Conversation sharing among Participants, who can be added to an active or archived Conversation. In one embodiment, an added Participant to a Conversation is provided access to the Conversation and has the ability to retrieve the previous Messages of the Conversation for Review. In an alternative embodiment, the added Participant is provided access to the Messages of the Conversation only from the point where the new Participant joined, and not any previous Messages of the Conversation.

The Conversation/Message management module 20f is also responsible for managing the functions used to control all rendering tasks performed by the Store and Stream module 24. These tasks include rendering Media (i.e., voice, video, etc.) appropriately for the Device 13 running application 12. These rendering tasks include, but are not limited to, the rendering of Mixed Messages (i.e., overlapping messages), as well as rendering according to user-defined criteria, such as playing faster, catching up to live, removing silence, removing hesitation particles, frequency shifting, and the ability to apply independent gain control to individual senders in a multi-party conversation.

D.1.2.7 Priority Services

The Priority service 20g is a module that defines a set of functions that manage the data structures and processes responsible for managing and retaining all information needed for a User to manage the Priority of the consecutive Conversations (i.e., MCMS-C) in which the User is engaged. When a User participates in a number of consecutive live Conversations, the User is required to prioritize the Conversations. Issues arise when Messages of different Conversations are ready to be rendered at the same time. An algorithm is used to determine the order in which the Messages are rendered that considers the availability of Messages to be rendered and the Priorities set by the User. The algorithm determines that the available Messages with the highest priority are rendered first while any concurrently available Messages are time shifted automatically just enough to allow for the rendering of the higher priority Message. As rendering time becomes available, the system will automatically render the time-shifted messages according to the User's Priorities.

D.1.2.8 Contacts Services

The Contacts services 20h is a module that defines a set of functions that manage the data structures and processes responsible for managing and retaining all information needed for authenticating and associating one or more Contacts with Conversations. When sending a Message as part of a Conversation that is associated with a number of Contacts, all of the Contacts receive the Message.

D.1.2.9 Presence/Status Services

The Presence/Status services 20i is a module that defines a set of functions that maintain the data structures and processes responsible for managing and sharing presence and status information between certain Users and/or non-users of the system. In various embodiments, the presence and status information is maintained for all User and non-users engaged in the Conversations the User of the Client 12 is engaged in, all Users and non-users in the Contacts list, or Users within a predefined domain (e.g., the members of a corporation or other organization). These examples are merely illustrative and should not be construed as limiting. The Presence/Status services 20i module may manage and share presence and status information on any defined set of Users and/or non-users.

The Presence/Status service 20i enables Users to monitor the status of other User's Intentions, Attention, and their Time Shift delay on any given Conversation (i.e., how far back they are from Reviewing the Messages of the Conversation live). In one embodiment, privacy controls are provided concerning availability of Presence and Status data. The Presence/Status module 20i further controls the data that enables the system 10 to deliver Messages that match the behavior and Intentions of Users. For example, a User may indicate their Status by designating an Intention to either Review or not Review a Conversation live. In response, the Presence/Status services 20i issues commands that cause the rendering of Messages either "live" or time-shifted, in accordance with the Intention of the User. In addition, the Intentions of Users are shared with the other Participants of the Conversation. The service 20i is also capable of inferring other Status values from the User's behaviors. The Presence and Status information is also used to optimize network traffic and bandwidth, as described in more detail below.

D.1.2.10 Messages/Signals Services

The Messages/Signals services 20j is a module that defines a set of functions that manage the data structures and processes responsible for messaging and signaling Users of the system 10, using special messages or audible tones. The special messages or tones may include for example an indication if a Message or Messages are live or time-shifted, whom the Message(s) are from, Priority, and other factors. The Message/Signal service 20j further has the ability to (i) signal the presence or absence of Users on the network, as well as the ability to notify if one or more Users are no longer actively Reviewing the Messages of a Conversation; (ii) "ring" or otherwise notify another User to get their attention when they are paying attention to another Conversation or not paying attention to their Device 13 at all; (iii) leave a Message for Users currently not on the network 18 to immediately review the Message the next time the individual re-connects to the network 18; (iv) generate an audible or visible feedback that alerts the sender that a sent Message was not received by recipient(s), generate a confirmation when the Message has been received by the recipient(s), and/or a confirmation indicating when the Message has been Listened to by the recipient(s); and (v) implement a Priority scheme where individuals on a Conference or tactical call may be notified that their attention is immediately needed on the call. This indication may convey multiple levels of urgency and an acknowledgement of some kind by the recipient.

D.1.2.11 Rendering and Encoding

The rendering and encoding module 21 is responsible for performing all rendering tasks for the MCMS application 20. These tasks include rendering Media appropriately for the device 13 running application 12.

D.2 The Store and Stream Module

The Store and Stream module 24 supports a number of functions and performance attributes, which are described below.

With the Store and Stream module 24, Message transmission is essentially "full-duplex", enabling any party to send a Message at any time, even while another party is also sending a Message, or if the other party is unavailable or otherwise engaged. The Store and Stream module is able to render messages as in a live PSTN or VoIP call or deliver them for time shifted messaging modes. It is able to optimize transmission and control Rendering according to the desires of the User.

The Store and Stream module 24 maintains connectivity with all target recipients (e.g., Servers 16 or other Devices 13) on the underlying network 18, manages all message, signal, and media transmissions, and optimizes the delivery speed and bandwidth usage across the network 18 to meet a User's immediate performance requirements, while managing network quality and capacity. The module 24 adapts and optimizes Media delivery commensurate with the quality and capacity of the underlying network 18. When insufficient underlying network resources are available, the quality of the transmitted Media streams can be degraded. As bandwidth becomes available, the quality of the transmitted Media streams may be increased. In addition to tradeoffs of Media quality, the Store and Stream functionality can make tradeoffs in the amount of Media transmitted in each packet based on Users' intentions to render data in real time as described below.

By dynamically controlling the delivery rate of Media based on the conditions of the underlying network 18, the Store and Stream module 24 is optimized to deliver time-sensitive Media that is "good enough" to Render upon receipt, and the guarantee eventual delivery of exact or full copies of the Media for archival purposes through a background process of requesting retransmission of missing, low quality, or damaged packets. As long as sufficient network resources exist to meet minimum Media quality levels, this retransmission does not impede the Rendering of live call Media. The Clients 12 of the system 10 are thus designed to bridge the performance gap between the delivery of an exact or complete copy of the Media at the expense of substantial potential latency versus the quick delivery of Media, but with no guarantees of completeness. In the context of this application, the term "good enough" means that the quality of the Media is sufficient so that when it is rendered, it is intelligible. The notion of "good enough" is therefore subjective and should not be construed in absolute terms. For example, the quality level of certain Media to be good enough may vary depending on the type of Media, circumstances, and other factors.

The Store and Stream module 24 further persistently stores all Media created by or otherwise originating using a Device 13 or received over the network 18 from other Device 13 and/or users. There are several significant advantages of storing this Media on the Device 13 running the Client 12: (i) it enables Users to leave a Message for another party, even when the sender and/or the recipient has either unavailable or poor network connectivity. In the case of insufficient bandwidth, the Message will be transmitted as fast as available bandwidth can be effectively used. In the case of no connectivity, the Message is queued for transmission as soon as network connectivity becomes available, resulting in a time-shifted delivery; (ii) the User has the ability to pause, replay, fast-forward, and Catch-Up-To-Live with an ongoing Conversation, as well as retrieve and review the archived Messages of previous Conversations; and (iii) it enables the optimization of data payloads over the system 10 and improves system resilience against network bandwidth and connectivity problems that may occur from time to time.

The Store and Stream module 24 is also responsible for: Mixing Messages as appropriate to create overlapping Messages (generated by the normal overlap of speakers in a Conversation or background noise), simulating an actual Conversation where multiple parties are speaking; rendering transcriptions or translations of audio media; adjusting the rendering of Media according to a number of User-defined criteria including playing faster, removing silence gaps between spoken words, removing hesitation particles, and frequency shifting; and the ability to apply independent gain control to individual senders in a multi-party Conversation; as well as other potential Rendering options.

The Store and Stream module 24 manages control and informational messaging between itself and MCMS.

D.2.1 The Persistent Infinite Message Buffer (PIMB)

The Persistent Infinite Message Buffer or PIMB 30 is a set of indexed (i.e., time-stamped and sequentially numbered) Media payload data structures and a system for their storage and retrieval. In one embodiment, the data in the PIMB 30 is arbitrarily persistent, meaning it is available virtually forever or at least until the system runs out of storage. Various retention rates and strategies may be employed to make effective use of storage resources. Many possible implementations exist for the physical storage implementation of the PIMB 30, including, but not limited to: RAM, Flash memory, hard drives, optical media, or some combination thereof. The PIMB 30 is also "infinite" in size, meaning the amount of data that can be stored in the PIMB 30 is not inherently limited. This lack of limit is in comparison to existing jitter buffer technology that discards data as soon as it is rendered. In one specific embodiment, the PIMB 30 may be implemented using a small and relatively fast RAM cache memory coupled with a hard drive for persistent storage. As the physical storage capacity of the PIMB 30 is exceeded, the data is maintained on the Server 16 (as described below) for later retrieval on demand. User criteria or a replacement algorithm, such as least-recently-used, or first-in-last-out, is used to control the actual data stored in the PIMB 30 and the data that is maintained on the Server 16 or archived at any point in time. The PIMB 30 further provides the attributes of file system storage and the random access attributes of a database. Any number of Conversations, regardless of their duration or the number of Messages in each, may be stored and later retrieved for Review. In addition, the meta data associated with the Messages of a Conversation, such as its originator and its length, may be also stored in the PIMB 30. In alternative embodiments, the indexed Media payloads and other data can be stored for a designated period of time (e.g. 30 days). Once the age of the media exceeds the designated period, the payloads and data are discarded. In another embodiment, payloads can be discarded based on the sender and/or the recipient of the Message containing the payload, or the topic of the Conversation or Messages associated with the payload. In yet other embodiments, payloads and data may be marked for transience, meaning the Messages will not be stored in the PIMB 30 beyond the requirements for immediate Rendering.

D.2.2 The Data and Network Quality Store

The data and network quality store (DNQS) 32 is a data store for storing information regarding Media payloads and Vox packets that are either read from or written to the PIMB 30.

D.2.3 The PIMB Writer

The PIMB writer 28 writes data to the PIMB 30 for two basic purposes. The PIMB writer 28 writes data from a Media capturing device (e.g., a microphone or camera) on the Device 13 running the Client 12 ("Encode Receive"). The PIMB writer 28 also writes data received over the network 18 from other Clients 12 into the PIMB 30 ("Net Receive").

D.2.3.1 Encode Receive

For capturing Media from the Device 13, the PIMB writer 28 includes Encoder Receiver 28a and a Data Storer 28c. When a User speaks into the microphone or generates video images with the Device 13 for example, the hardware 34 receives the raw audio and/or video signals and provides them to the Encoder Receiver 28a, which encodes the signals into indexed media payloads (hereafter sometimes simply referred to as "payload" or "payloads"). The Data Store 28c stores the payloads into the PIMB 30. Other types of Media, such as sensor data is converted into payloads in a similar manner.

D.2.3.2 Net Receive

For storing Media received over the network 18 into the PIMB 30, the Net Receive function of PIMB writer 28 includes a Network Receiver 28d, a Data Bufferer 28e, a Data Storer 28f, a Data Quality Manager 28g, and a Network Quality Manager 28h. The Network Receiver 28d receives Vox packets over the network 18. The Data Bufferer 28e places the received Vox packets into their proper sequence and prevents the Rendering of the incoming Vox packets for at least the Minimum Time Shift Delay (MTSD) delay. The Data Storer 28f transforms the packets into indexed media payloads and stores the indexed media payloads in the PIMB 30. As the payloads are stored, the Data Quality Manager (DQM) 28g notes any missing or defective packets. If packets are missing or defective, the DQM 28g schedules a request for retransmission over the network 18. The sending device replies by resending the missing or defective packets. Eventually these packets are converted into indexed media payloads and stored in the PIMB 30. By retrieving the missing or defective packets, an "exact" copy of a sender's Message is eventually stored in the PIMB 30. The retransmission of missing and/or defective packets does not delay the rendering of Messages in real time, provided that the packets that have been delivered are of "good enough" quality and quantity. Retransmission requests may be delayed by the DQM 28g if insufficient network resources are available to support both the new "live" data as well as the retransmission.

D.2.4 The PIMB Reader

The PIMB reader 26 reads data from the PIMB 30 for two basic purposes. The PIMB reader 26 accesses the PIMB 30 when data is to be rendered ("Render") for the local Client 12. Data is also read from the PIMB 30 when data is to be transmitted ("Transmit") by the Client 12 over the network 18.

D.2.4.1 Render

For the rendering of messages on the Client 12, the PIMB reader 26 includes a Data Prioritizer 26a, a Data Retriever 26b, a Packet Loss Compensation/Interpolator ("PLC/Interpolator") 26c, a Data Mixer 26d and a Data Renderer 26e. The Prioritizer 26a prioritizes the data to be rendered by building an ordered queue of messages that could potentially be Rendered. It uses User configured Priority for the rendering of consecutive Conversations (MCMS-C). In addition, the Data Prioritizer uses the availability of media data to render within the limits imposed by the MTSD, the User's current Attention, and the User's defined and implied Intentions. The Data Retriever 26b retrieves the prioritized indexed media payloads from the PIMB 30. The PLC/Interpolator 26c performs packet loss compensation and interpolation on the retrieved payloads, using known packet loss compensation and interpolation algorithms. The particular method to be used is dependent on the media Codecs in use, and other well-known parameters. The Mixer 26d is used to appropriately mix concurrent data streams from multiple Messages of a single Conversation together. For example, if two or more Participants of a Conversation are speaking at the same time, the Mixer 26d mixes the Messages, creating the effect of both Participants speaking at the same time. In an alternative embodiment, the User has the option of Reviewing the multiple streams from one Participant at a time. If only one Participant in the Conversation is speaking, the Mixer 26d may simply pass the single Message stream, without performing any mixing. The Renderer 26e takes the data from the Mixer module 26d and converts it into a form suitable for the hardware driver 34. The hardware 34 then drives either the speaker or video display of the Device 13, depending on the type of Media, creating voice, video or some other audible and/or visible notifier on the Device 13.

D.2.4.2 Transmit

To prepare messages for transmission from the Client 12 over a network 18, the PIMB reader 26 includes a Data Prioritizer 26f, a Packet Quality Manager (PQM) 26g, a Data Retriever 26h, Packetizer 26i, a Transmitter 26j and an Acknowledger 26k. The Data Prioritizer 26f prioritizes the Messages for transmission over the network 18. Priority is determined using the MCMS Participant Attributes related to payloads available for transmission, network connectivity and bandwidth conditions, and the Intentions of Users beyond the next hop to either Render live or time-shifted, and, in some embodiments, possible optimizations of transmission bundling where multiple packets to any given next network hop are available. The prioritized packets are then optimized, using the PQM 26g, which assures the timely delivery of "good enough" data quality for live Messages, while minimizing real-time bandwidth, as described in more detail below. The Data Retriever 26h retrieves the appropriate payloads from the PIMB 30. The Packetizer 26i assembles the payloads into Vox Packets, which are then transmitted by the Transmitter module 26j over the network 18. When the recipient receives the Vox packets, an acknowledgement is sent back to Acknowledger 26k over the network 18 for notifying the sending User that a Message has arrived at its destination.

D.2.5 The Packet Quality Manager

The PQM 26g has several optimization goals: (i) the timely delivery of an adequate copy of time-sensitive Media ("as soon as possible to be good enough" for Rendering); (ii) the efficient use of available bandwidth, meaning using the optimal transmission frequency, payload quality, and packet size for the underlying network; and (iii) the ability to dynamically adjust or make changes in the transmission frequency, payload content, payload quality, packet size, etc. as network conditions change.

D.2.6 The Network Quality Manager

On the receiving side of a network transmission is the Network Quality Manager 28h (NQM). The NQM is responsible for observing specific properties of network performance for each sender that has sent media to the Client 12, comparing expectations of jitter, loss, and throughput to their actual values. This is used to compute a Network Quality Rating (NQR) for every sender. This NQR is used to indicate sender availability and Conversation live-ness to the User of the receiving device.

D.2.7 The Data Quality Manager

The Data Quality Manager 28g measures the quality of the data being received over the network by observing packet loss, jitter, and throughput. The DQM 28g uses these measurements for three purposes: (i) to send receipt reports back to the sender; (ii) optionally using those receipt reports to request retransmission of certain data; and (iii) making these measurements available to the NQM 28h.

E. Server Architecture

Figure 3:
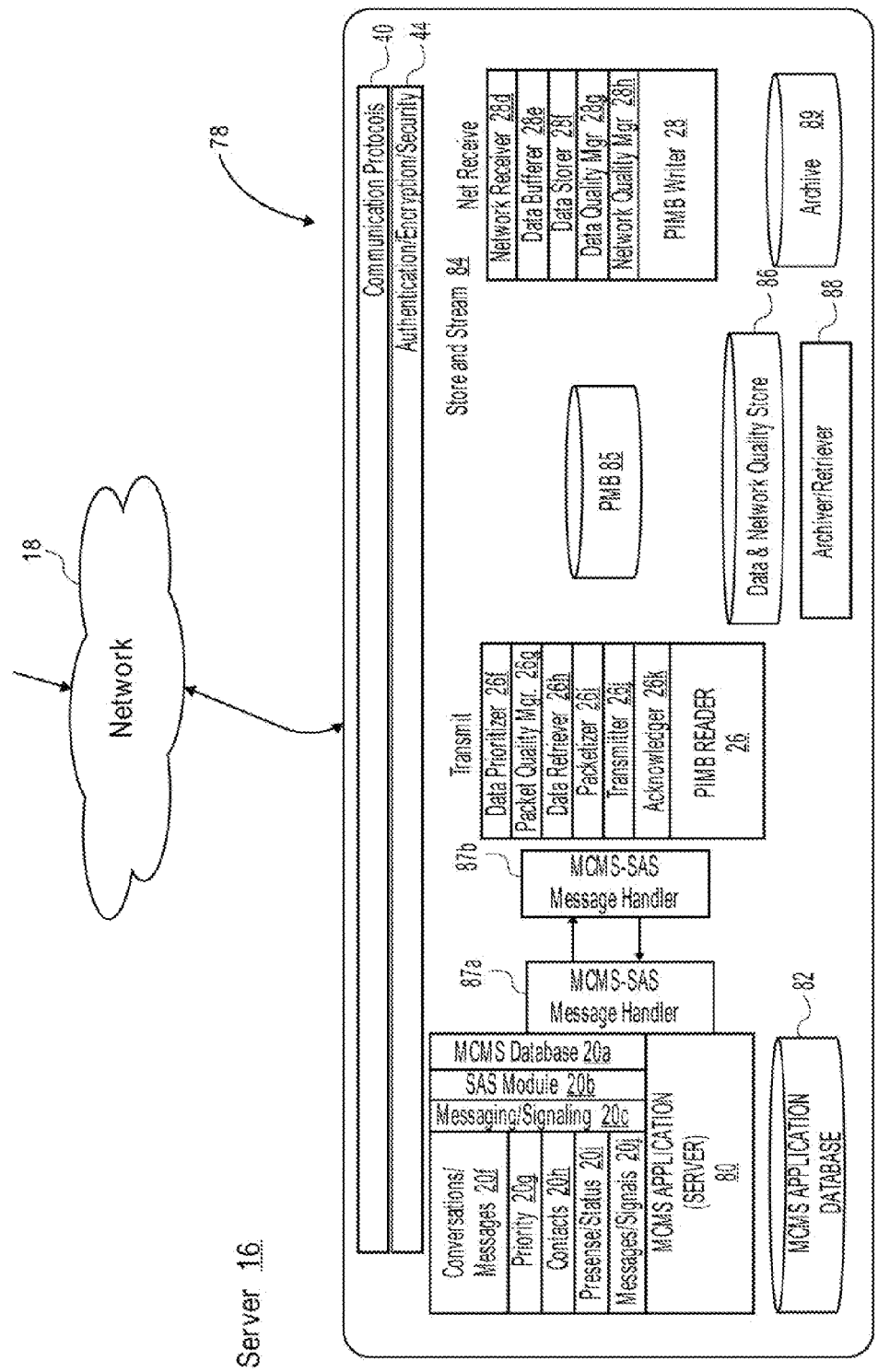
FIG. 3 is a block diagram of a Server used in the communication and media management system of the invention.

Referring to FIG. 3, a block diagram of the application 78 that runs on the Server(s) 16. The application 78 is similar to the Client application 12 in many regards and includes an MCMS server application 80, an MCMS database 82, a store and stream module 84, a PIMB 85, a data and network quality store (DNQS) 86, MCMS-SAS message handling modules 87a and 87b which manage messages and signals back and forth between the MCMS server application 80 and Store and Stream module 84, an archive/retriever 88, and an archive 89. The application 78 further includes an authentication-encryption-security module 40 and a communication protocol module 44.

The MCMS server application 80 is a multi-tiered architecture including a MCMS Database Module 20a, a Store and Stream (SAS) Module 20b, a Messaging/Signaling Module 20c, Conversations/Messages management services 20f, Priority services 20g, Contacts (including User and Authentication) services 20h, Presence/Status service 20i, and Messages/Signals services 20. The aforementioned modules and services of the application 78 are similar or the same as the modules and services having like reference numerals as the Client 12, and therefore are not described in detail herein, except for one notable exception. In various embodiments, the MCMS server application 80 and Store and Stream module 84, including the MCMS database 82, is configured to support many Users in one instance of the application. The one instance may be further configured to support multiple domains, where each domain is defined as a group of Users (i.e., a corporation or other group of Users belonging to a common organization). This architecture allows each application 78 on Server 16 to serve multiple users (or domains), where each user (or domain) is not visible to other Users. This partitioning is referred to as "multi-tenancy".

The server Store and Steam 84 module performs the functions of Net Receive and Transmit. For the Net Receive function, the module 84 includes a Net Receiver 28d, Data Bufferer 28e, a Data Storer 28f, a Data Quality Manager (DQM) 28g, and a Network Quality Manager 28h. For Transmit functions, the module 84 includes a Data Prioritizer 26f, Packet Optimizer 26g, Data Retriever 26h, Packetizer 26i, Transmitter 26j and an Acknowledger 26k. The aforementioned elements of the Store and Stream module 84 are similar or the same elements having like reference numerals as the Client 12, and therefore are not described in detail herein.

Since the Server 16 does not directly interact with Users, the encoding and rendering functions provided in the Store and Stream module 24 of the Clients 12 need not be present. The MCMS application 80, when running on Servers 16, does not interact directly with Users. Consequently, the user interface and user interface API modules and services 20e and 20d are not needed.

The application 78 on each Server 16 potentially serves multiple tenants, meaning it serves multiple Users of the system 10. The PIMB 85 of the server application 78 is therefore significantly larger and is used to store the media payloads of multiple Users, as opposed to the PIMB 30, which is used to store just the generated or received payloads of only a single User. The main purpose of the Store and Stream module 84 is to receive Messages transmitted by the Clients 12 and transmit Messages to other Clients 12. When a Client 12 transmits a message, the message contains an identifier associated with the target recipient. In response, the Server 16 finds a delivery route to a Client 12 associated with the intended or targeted recipient. As Messages are received, they are stored in the PIMB 85 and transmitted to the next Server 16 (i.e., the net "hop") of the network layer 14 along the path to the intended recipient(s), or to the recipient(s) directly depending on the system configuration. The archive-retriever 88 is responsible for archiving the media payloads stored in the PIMB 85 in archive 89. As the physical space in the PIMB 85 is exhausted, media payloads in the PIMB 85 are moved to the archive 89, which is a mass storage device. In various embodiments, the payloads stored in the PIMB 85 may be archived in accordance with User defined criteria and/or any known replacement algorithm, such as first-in-first-out (FIFO) or least recently used (LRU). It should be noted that only a single Server 16 is illustrated in FIG. 1 for simplicity. It should be understood that in actual embodiments, multiple servers or a "server farm" may be used for a network with a large number of Users.

The terms "persistent" and "infinite" used to describe the PIMB 30 and the PIMB 85 should not be construed literally as absolute terms. A User may wish to indefinitely store some Messages that are considered important. In other situations, such as a casual chat between two friends, the Messages may be deleted after a certain period of time to save space. According to various embodiments of the invention, different retention policies may be used, either set by the system 10 or configured by the User. The use of the word "infinite" refers to the lack of any preset time boundaries enforced by the PIMB. This is contrasted with current jitter buffer systems, which discard media after it has been rendered. The terms persistent and infinite should therefore be broadly construed to mean that the PIMB 30 and PIMB 85 have no internal limitations on the time ranges and quantities of Messages that can be stored therein.

There are a number of advantages to archiving the Messages of Conversations in a persistent storage medium. Voice messages and other Media can be organized, indexed, searched, transcribed, translated, and Reviewed as needed. Voice, as well as other Media, therefore becomes an asset that can be managed both by Users and organizations. These Media assets have value to corporations, first responders, police and fire departments, as well as the military.

F. The Vox Protocol and Indexed Media Payloads

As noted above, the Vox protocol is used by the Store and Stream module 24 to support all facets of payload transmission, storage, and optimization. The Vox packet is a structured message format designed for encapsulation inside a transport packet or transport packets of the underlying technology of the network 18. This arrangement significantly improves the flexibility of the system 10. By embedding the Vox packets into existing transport packets, as opposed to defining a new transport layer for "Voxing" applications, the system 10 takes advantage of current packet based communication networks running over the existing telecommunications infrastructure. A new network infrastructure for handling the Vox packets therefore need not be created to take advantage of all the benefits of the system and method described herein.

Figure 4A:
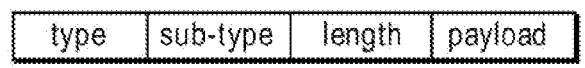
FIGS. 4A through 4D illustrate various embodiments of data payloads used in the communication and management system of the invention.

Referring to FIG. 4A, the general format structure of a Vox packet 95 is illustrated. The format of the Vox packet 95 includes fields for type, sub-type, length, and payload. The different types of Vox packets include authentication, signaling, media payload, media multiplex (one message), and media multiplex (multiple messages). The sub-type field is used to designate different types of authentication, signaling or media type messages. Possible sub-types for authentication Messages include those necessary for key exchanges and Authentication. Possible sub-types for signaling Messages include registration, routing, message set-up, and network management. Possible sub-types for Media messages include different Codec styles and different payload aggregation techniques. The length field defines the overall length or size of the payload. The payload field contains the actual payload or media of the packet 95.

Figure 4B:
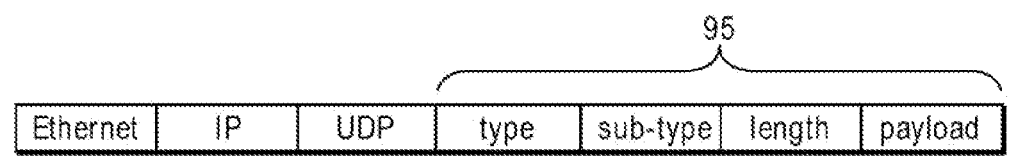

Referring to FIG. 4B, a diagram illustrating a Vox packet 95 encapsulated in an exemplary protocol used by the network 18 is shown. In this example, the Vox packet 95 is embedded in underlying UDP, IP and Ethernet transport packets 96 respectively. In this manner, the Vox packet 95 can be transported across underlying UDP, IP and Ethernet layers of the network 18. This is a standard protocol encapsulation technique used by packet networks.

Figure 4C:
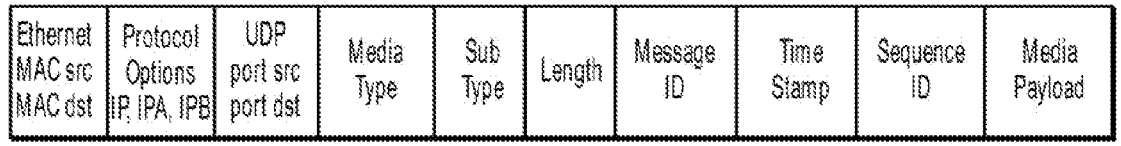

Referring to FIG. 4C, a diagram illustrating a media multiplex Vox packet 95 encapsulated in UDP, IP, and Ethernet 97 is illustrated. In this example, the Vox packet 95 includes a Media type field, a Media sub-type field, a length field, a message ID field, a time stamp field, a sequence ID field, and a Media payload field.

Figure 4D:
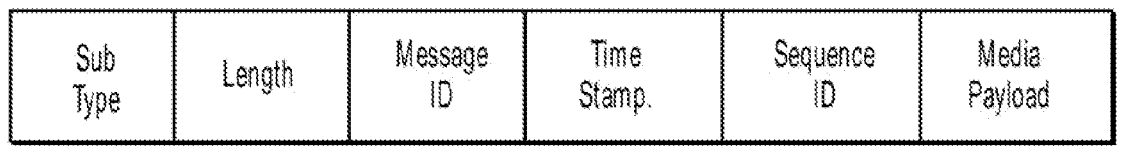

Referring to FIG. 4D, the format of an indexed media payload 98 is illustrated. The indexed media payload includes a sub-type field, a length field, a message identifier (ID) field, a time-stamp field, a sequence identifier (ID) field, and field for the Media payload.

The encapsulation of Vox packets 95 into the transport packets of the underlying network allows the Media, Messages and Conversations to each be defined by a number of attributes.

When Media is created or otherwise originated on a Device 13, it is typically time-based, meaning it changes in some meaningful way over time. As a person engages in a Conversation for example, their spoken words are strung together into sentences or statements, which vary over time, and the resulting data (streams and packets) will maintain the same variance over time. Similarly video (as opposed to a still photo) as well as GPS or other sensor data will vary over time. Regardless of the type or how it is originated, the Media is segmented and placed into the payloads of a plurality of Vox packets 95. The packets are then continually, stored, transmitted, received, stored and rendered in streams (i.e., streaming media) at the transmitting and receiving Devices 13 respectively. Since each packet 95 is indexed, time-stamped, and given a sequence identifier, the individual packets can be segmented into Messages. By sequentially threading the individual Messages together, Conversations may be constructed.

One further unique aspect of the system 10 is that the media payloads generated by a Client 12 are stored in multiple locations. Not only are the payloads stored in the PIMB 30 of the generating Device 13, but also in the PIMB 85 of the Server(s) 16 and the PIMB 30 of the receiving Devices 13. This basic feature enables or makes possible much of the Voxing functionality described above and provides the system 10 with both resilience and operability, even when network conditions are poor or when a Participant of a Conversation is not connected to the network.

G. Interoperability with Underlying Telecommunication Protocols

The system 10 is intended to run or be layered over a variety of existing communication networks 18, such as the Internet, fixed PSTN type circuit networks, and mobile or cellular phone networks, or a combination thereof. The system 10 is designed around the concept of moving many small units of information (i.e., the Vox packets) between different Clients 12 and Servers 16 in the system 10. While Vox packets may vary in size, depending on their function and payload, they all appear to be the same kind of data to the underlying network layer. In one embodiment, the system 10 has been designed and optimized for IPv4 networks such as the Internet, but other types of networks may be supported as well. For the purposes of this document, the term "IP" should be taken to mean IPv4, IPv6 or any other current or future implementation of the Internet Protocol.

Figure 5:
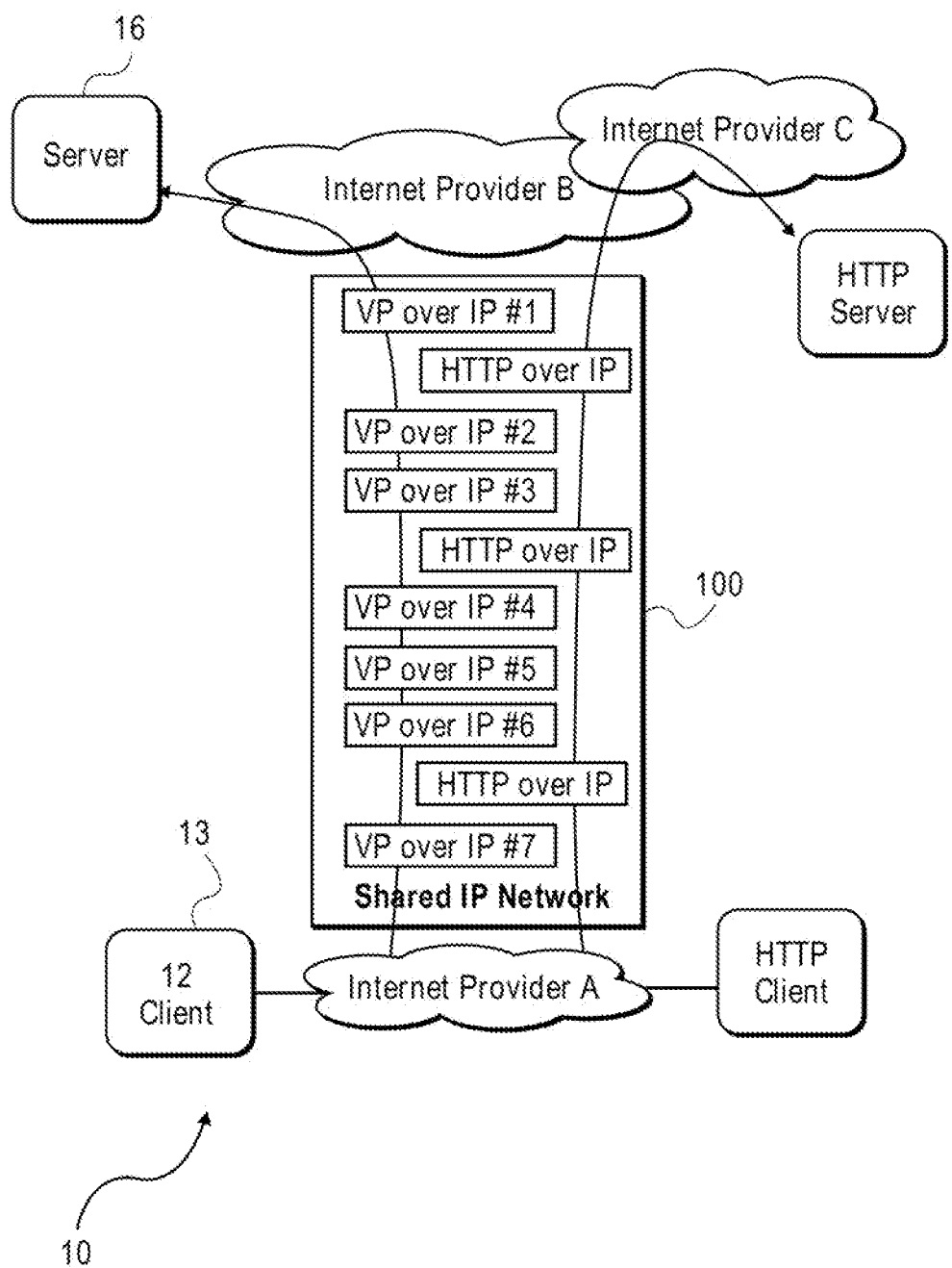
FIG. 5 is a diagram illustrating data being transmitted over a shared IP network in accordance with the invention.

Referring to FIG. 5, a diagram of a Client 12 running on Device 13 and communicating with a Server 16 over a shared IP network 100 is shown. As illustrated, the Client 12 is coupled to the shared IP network 100 through a first Internet service provider A and the Server 16 is coupled to the shared IP network 100 by a second Internet service provider B. During communication, the Vox packets 95 (designed "VP" in the figure) are encapsulated within UDP/IP packets and then interleaved among other IP protocol packets as is well known in the art and transmitted across the shared IP network 100 from the Client 12 to Server 16, or vice versa. As is well known, each lower packet layer encapsulates the entire packet of the layer immediately above it. Packets can also be sent in a similar manner between two Servers 16. Messages are sent from one Client 12 enabled Device 13 to another over a shared IP network 100. At each hop, the Vox packets 95 are embedded in the underlying IP protocol and transmitted, until they reach the target destination.

The diagram of FIG. 5 is merely exemplary, showing only a single Client 12 and Server 16 connected to the network 100 for the sake of illustration. In actual embodiments of the system 10, a large number of Clients 12 and one or more Servers 16 are typically connected to the shared IP network 100. It is also useful to note that the Client 12 and Server 16 do not have exclusive use of the IP network 100. In the example shown, an HTTP client, which is coupled to the network 100 through Internet provider A, can send packets back and forth with an HTTP server, coupled to the network 100 through a third Internet provider C. The system 10 does not control the manner in which the VPs embedded in the IP packets traverse the network 100. Rather, all packets that traverse and share the network 100 do so in accordance with the standard procedures of the underlying shared IP network 100.

Figure 6:
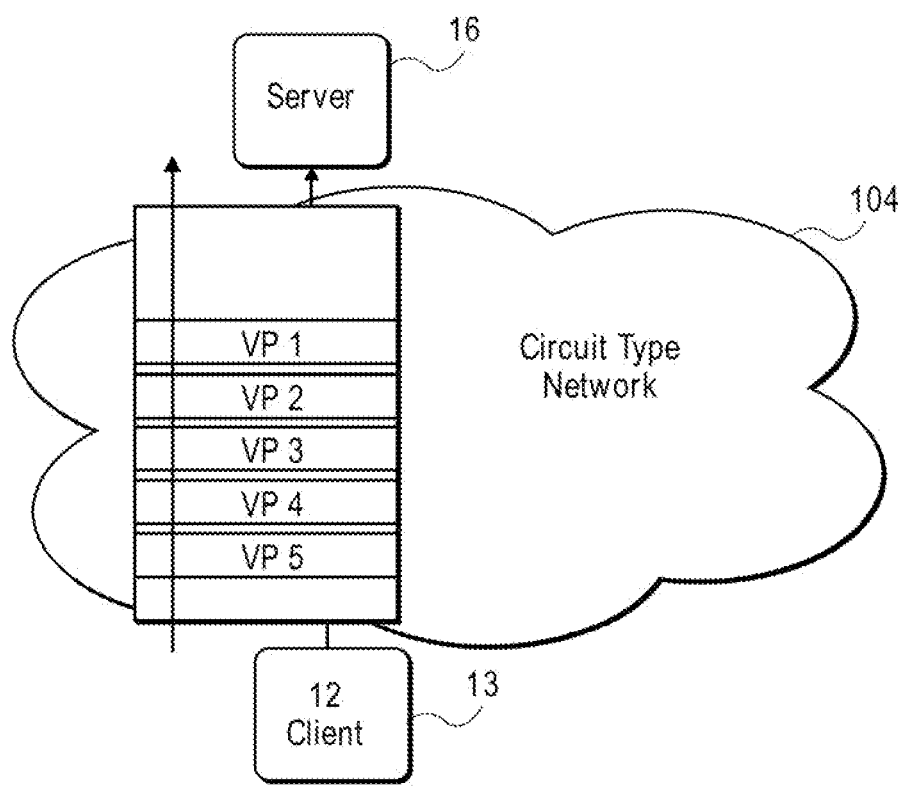
FIG. 6 is a diagram illustrating data being transmitted over a circuit based network in accordance with the invention.

Referring to FIG. 6, a "circuit" based network 104 such as a GSM mobile phone network is illustrated. The circuit network 104 is coupled between Client 12 running on Device 13 and Server 16. Once a circuit is established between the Client 12 and Server 16, the system 10 layers Vox packets (VP1, VP2, VP3, VP4, VP5, etc.) onto the underlying packets used by the network 104 and transmits them across the network 104, creating "virtual Vox" circuit. The Vox Packets sequentially traverse the circuit network 104, typically with spacing or framing data as is well known in the art for transmitting data over a circuit network. In addition, packet construction parameters, such as the payload size and the number of header fields included may be used to exploit the lack of per-packet overhead and to increase speed and/or efficiency of data transfer across the network 104. It should be noted again that for the sake of simplicity, only a single Client 12 and Server 16 are shown connected to the network 104. It should be understood, however, that additional circuits between Clients 12 and Servers 16 as well as other components may be established concurrently through the network 104. The network 104 is therefore not dedicated for the transmission of Vox Packets, but rather may be shared with other types of network traffic.

Figure 7:
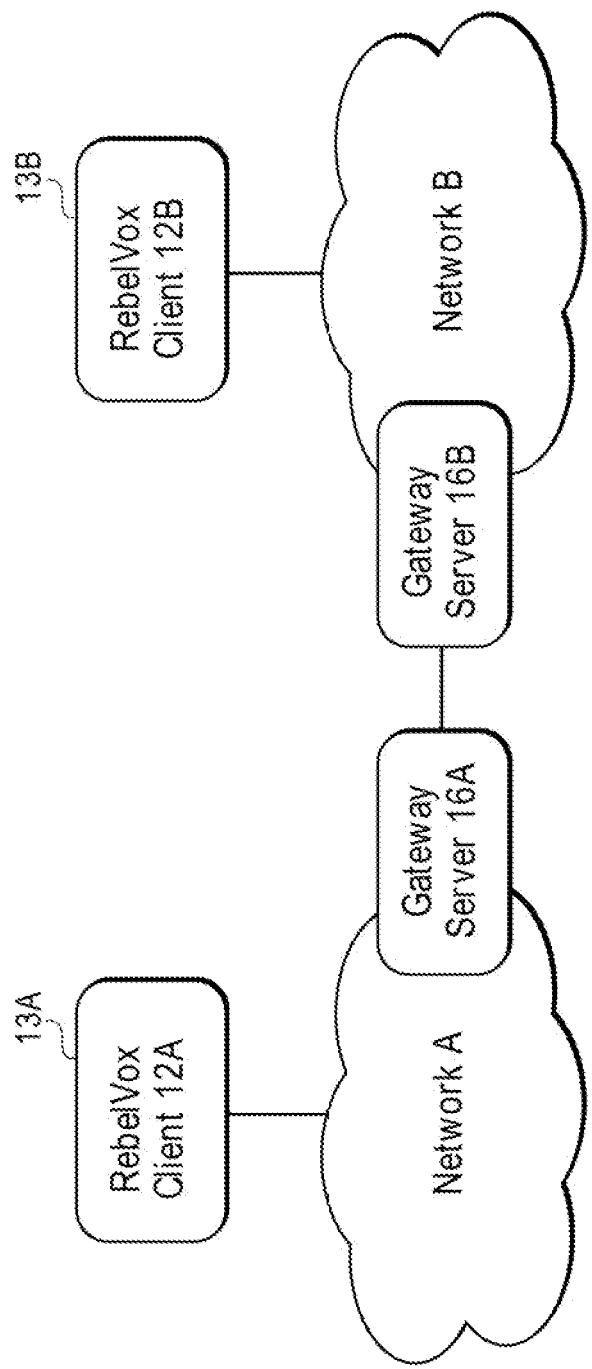
FIG. 7 is a diagram illustrating data being transmitted across both a cellular network and the Internet in accordance with the invention.

Referring to FIG. 7, a diagram illustrating communication between a first Client 12A enabled Device 13A associated with a first network A and a second Client 12B enabled Device 13B associated with a second network B is illustrated. The networks A and B further each include gateway Servers 16A and 16B respectively. The Gateway Server pair 16A and 16B facilitate communication between the two networks A and B, allowing the Devices 13A and 13B to communicate with each other. In various embodiments, the networks A and B could each be any type of network. For example, each network A and/or B could be an IP network, a circuit type network, or a wireless or cellular network (i.e., CDMA, GSM, TDMA, etc.). The Servers 16 that straddle the two networks A and B are considered gateway servers because they route traffic or serve as a "gate" between the two networks.

With the system 10, there are a several basic network interaction considerations to optimize system performance. These considerations include factors such as resolving the underlying address to which the Vox packets 95 are to be sent, the integrity of any sent Vox packets, and the management of the Maximum Transmission Unit (MTU) of a single Message that may be sent across a given network or combination of networks.

The address of a target Client 12 needs to be known so that the underlying network delivers the Vox packet 95 to the correct location. With IPv4 networks, the address is typically an IPv4 Address, which is a 32-bit number that uniquely identifies a host within the network. For other networking technologies, the address could be some other type of identifier. IP networks use the Domain Name System (DNS) to resolve human-readable names into IP addresses, and the Address Resolution Protocol (ARP) to resolve IP addresses into physical addresses. Regardless of the underlying networking technology, the system 10 uses one of the above-mentioned or other known addressing schemes for delivery of Vox packets 95 to the correct location.

As with almost any packet-based communication system, transmitted Vox packets might not be delivered to their addressed location if the underlying network is unable to deliver the packets in which the Vox packets are encapsulated. Most packet networks do not inform transmitters when packets are dropped. Instead they rely on the transmitters and receivers to notice and compensate for any dropped packets. The system 10 is designed to use these receiver receipt report messages to coordinate this packet loss management. If the underlying network is able to inform the sender of lost or dropped packets, the system 10 utilizes this information in its retransmission protocol.

The management of MTU is the determination of the Maximum Transmission Unit (i.e., the maximum size of a single message) that may be sent across a network. For packet-based networks, the underlying network imposes the MTU. For circuit-switched networks, the MTU may be a tunable parameter for network efficiency and performance. Thus in most cases, the underlying network imposes or determines the maximum size of the Vox packet 95 that may be transmitted efficiently. For example with IP networks, packets may be fragmented if the payload exceeds the MTU, but at a substantial performance penalty. With IP over Ethernet networks, the transmitting device has an MTU of 1518 bytes, as enforced by Ethernet. The largest IP packet must leave room for the Ethernet headers. The largest UDP packet must leave room for both IP and Ethernet headers and the largest Vox protocol that may be generated on Ethernet for example is the Ethernet MTU (1518)–IP header (20)–UDP header (8)=1490 bytes. Since the Vox protocol will have a header of its own, the actual Vox media payload will be less than 1490 bytes on an Ethernet network. For Gigabit Ethernet, the MTU could be much larger, but would be determined using a similar formula.

In a purely packet-based network, there are two potential values for MTU, the local link MTU and the path MTU. Determining the local link MTU yields the maximum size for Vox packets to be efficiently sent out to the local network interface. The path MTU yields the maximum size of Vox packet that may be sent intact all the way to the remote node. If a sender is connected via Ethernet, the Vox packet might pass through various other systems with smaller MTUs enroute to the recipient. The smallest MTU on the path to the destination needs to be resolved and known by the sender. In the IP world, there is a standard procedure for discovering the smallest MTU called "Path MTU Discovery". For other kinds of networks, an equivalent procedure may be used. Again, since the system 10 is layered on top of other networks, any of the above MTU algorithms may be used.

H. Operation Flow Diagrams

H.1 Store and Stream

Figure 8A:
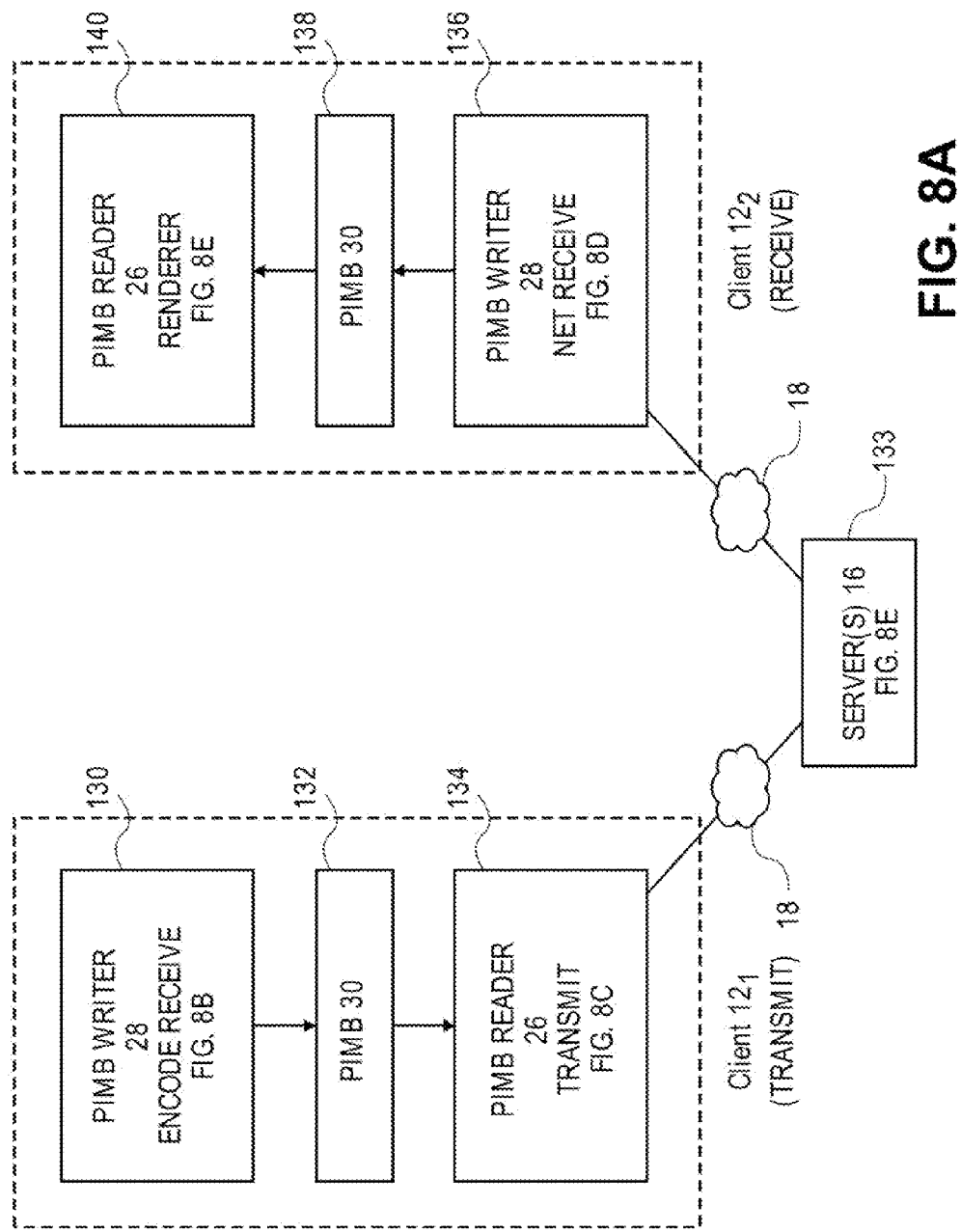
FIGS. 8A through 8F are a series of flow diagrams illustrating a store and stream function of the communication and management system of the invention.
Figure 8B:
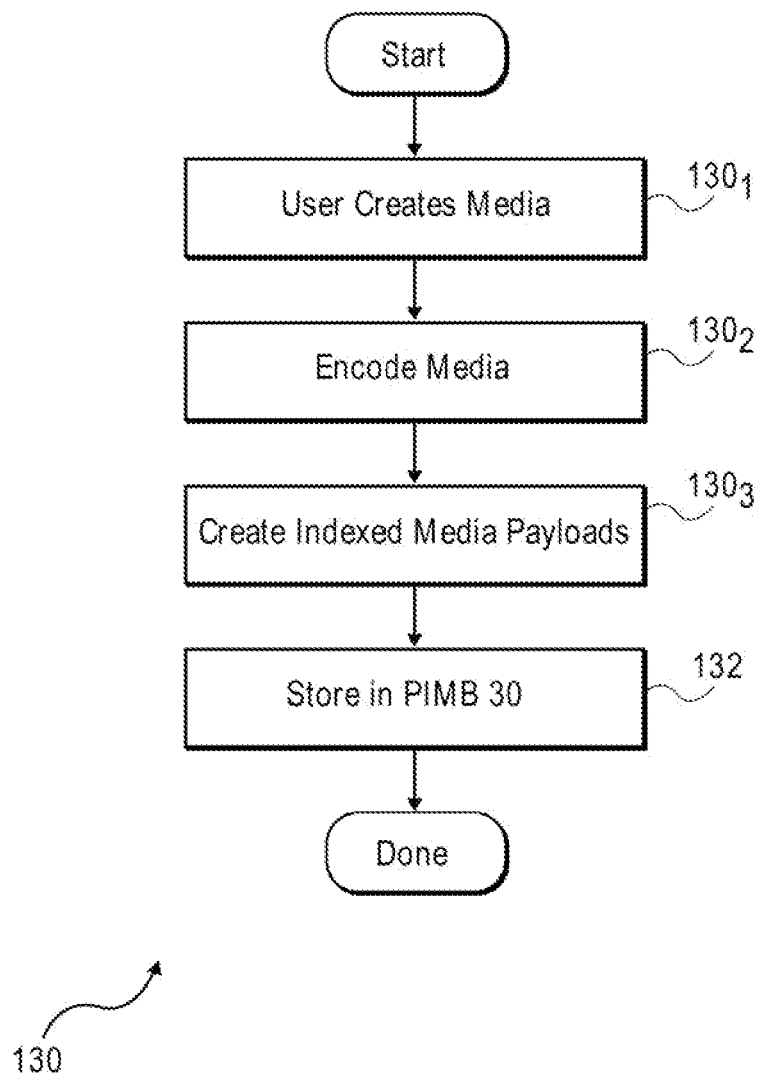
Figure 8C:
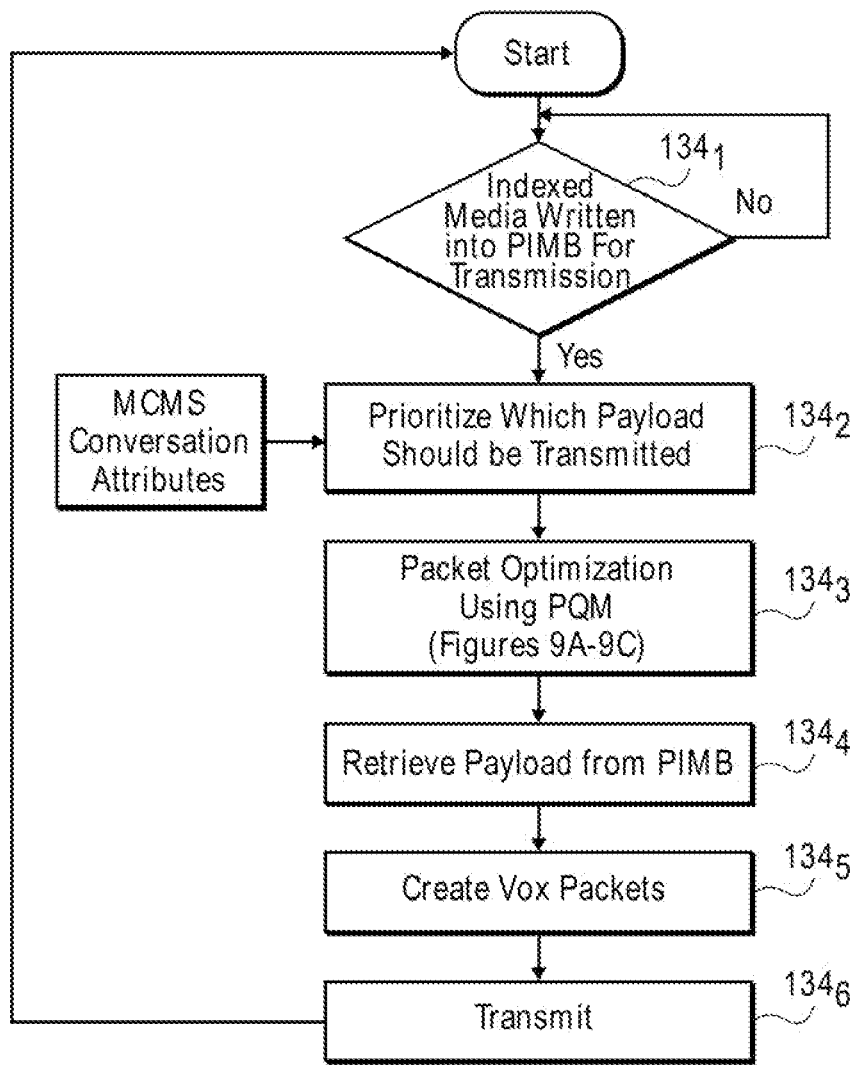
Figure 8D:
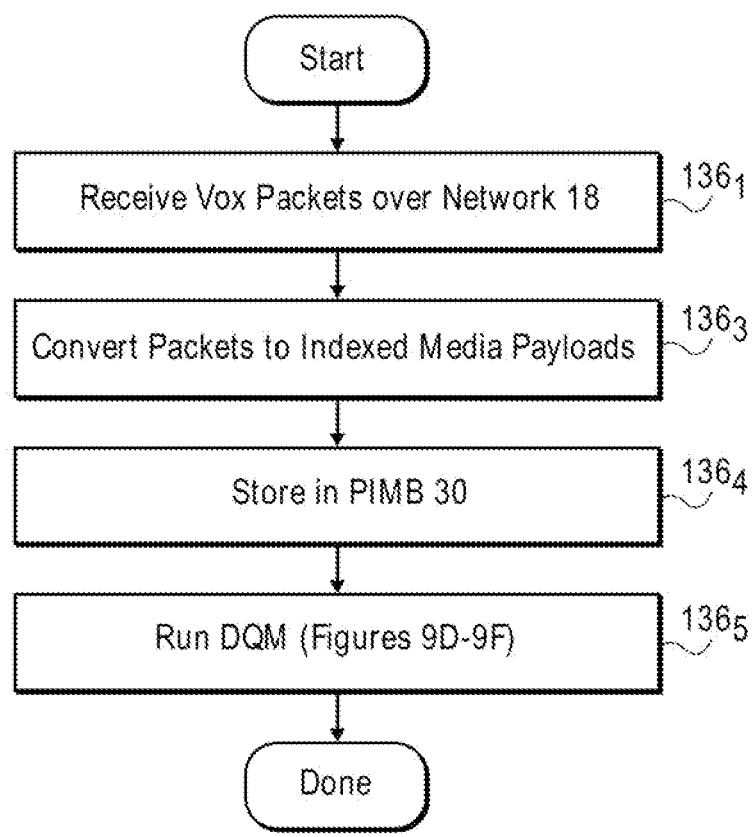
Figure 8E:
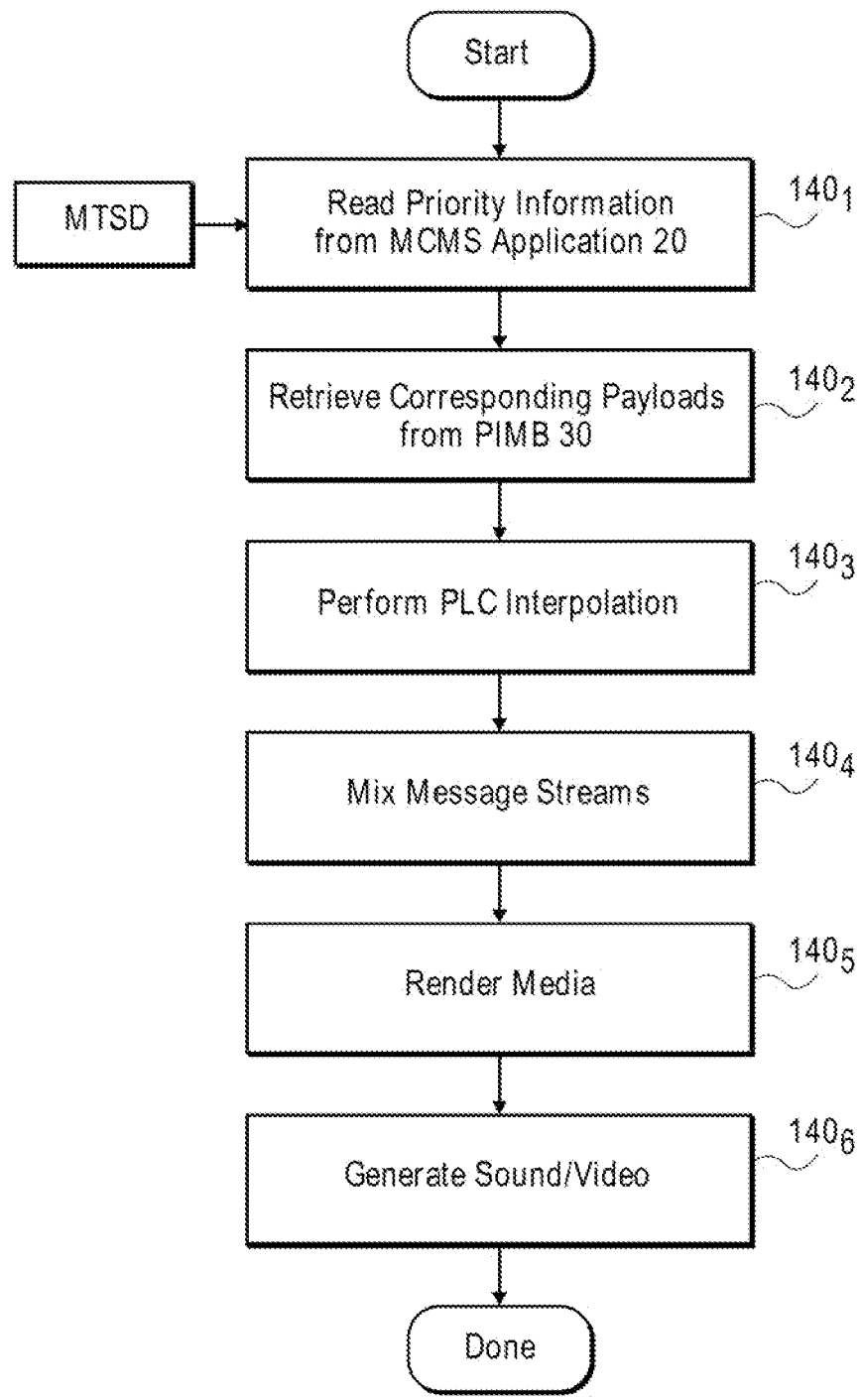
Figure 8F:
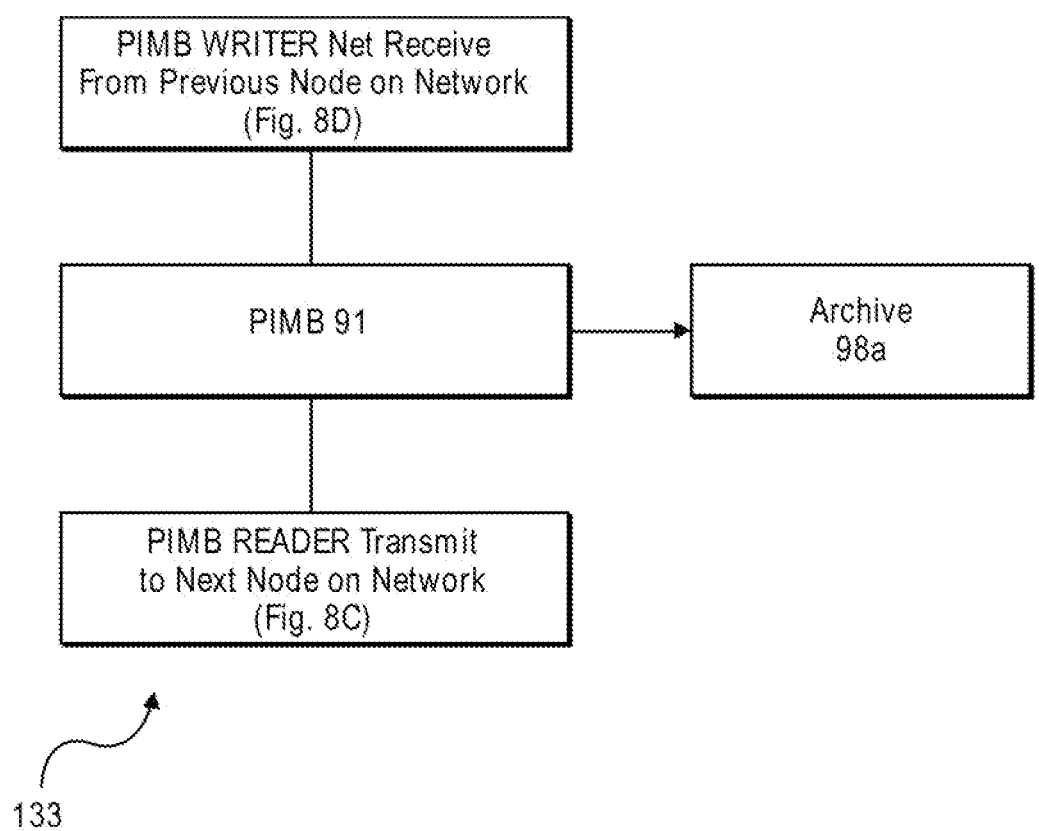

Referring to FIGS. 8A through 8F, a series of flow diagrams are provided to illustrate the operation of the store and stream module 24 and 84 on Clients 12 and Servers 16 respectively. FIG. 8A shows the sequence of operation for a first Client $12_1$ transmitting Messages to a second Client $12_2$. FIGS. 8B and 8C illustrate the operation of the PIMB writer 28 and PIMB Reader 28 on the transmitting Client $12_1$. FIGS. 8D and 8E illustrate the operation of the PIMB Writer 28 and PIMB Reader 26 on the receiving Client $12_2$. FIG. 8F illustrates a flow diagram of the Store and Steam module 84 on a server 16.

In FIG. 8A, the User of Client $12_1$ running on a Device $13_1$ originates Media to be transmitted. The Media can be originated at the Device 13 in a number of different ways such the User creating Media by speaking into a microphone or creating video content on their Device 13. Media is also originated by a Device 13 by receiving sensor data, such a GPS information or a temperature reading. Regardless of how the Media is originated, the Media is encoded by the PIMB Writer 28 (box 130), which converts the Media into indexed media payloads and stores them in the PIMB 30 (box 132) on Client $12_1$. The PIMB Reader 26 on the Client $12_1$ reads the payloads out of the PIMB 30, creates Vox packets, and transmits the packets to the receiving Client $12_2$ (box 134) over the network 18. Each Server 16 along the path between the sending Client $12_1$ and the receiving Client $12_2$ stores the transmitted payloads in the PIMB 85 and transmits the Vox packets to the next hop (box 133). At the receiving Client $12_2$, the net receive function of the PIMB Writer 28 converts the Vox packets into indexed media payloads (box 136) and stores the payloads into the PIMB 30 of Client $12_2$ (box 138). The rendering module of the PIMB reader 26 on Client $12_2$ renders the payload information read from the PIMB 30 into a medium suitable for human consumption, such as voice or video (box 140). Each of these steps are described in more detail below with respect to FIGS. 10B through 10E.

In FIG. 8B, a sequence of the Encode Receive function performed by the PIMB Writer 28 (step 130 of FIG. 8A) is provided in detail. In the initial step $130_1$, the User of the Device 13 running the Client $12_1$ originates the Media to be transmitted. As noted above, the Media may be derived by speaking into a microphone, using a camera, receiving sensor data, or by some other Media generating component. In the next step $130_2$, the Encode Receiver 28a encodes the Media and creates the indexed media payloads (step $130_3$), which are then stored in the PIMB 30 (step 132) by the Data storer 28c.

In FIG. 8C, the sequence of the Transmit function performed by the PIMB Reader 26 (step 134 of FIG. 8A) on the sending client $12_1$ is provided in detail. In decision loop $134_1$, the transmit function of the PIMB Reader 26 continuously checks to see if indexed media payloads that are to be transmitted have been written into the PIMB 30 and are available for transmission. If such payloads are available in the PIMB 30, the Data Prioritizer 26f prioritizes the payloads that should be sent first, using the MCMS Participant Attributes information, as illustrated in step $134_2$. Information about the highest priority payloads are passed to the Packet Optimizer module 26g which runs the PQM (step $134_3$), as described in more detail below with respect to FIGS. 9A-9C. The appropriate payloads are then retrieved from the PIMB 30 (step $134_4$) by the Data Retriever 26h and converted into Vox packets 95 by the Packetizer 26i (step $134_5$). The Vox packets 95 are then transmitted (step $134_6$) by the Transmitter 26j over the network 18 to the receive Client $12_2$, which sends back receipt reports reflecting the properties (loss, jitter, throughput) of the packets that have been received. These receipt reports provide the information necessary for the PQM to calculate the MABR for a given receiver. The aforementioned process is repeated for each transmission loop as indicated by the return arrow from the transmit step to the top of the flow chart.

In the embodiment described above, the media is encoded, stored in the PIMB 30 and then transmitted over the network in a serial fashion. In an alternative embodiment, the encoded media can be stored in the PIMB 30 and transmitted over the network in parallel, meaning the two functions occur substantially at the same time.

In FIG. 8D, the sequence for the Net Receive function (step 136 of FIG. 8A) of the PIMB Writer 28 on the receiving Client $12_2$ is illustrated. In the initial step $136_1$, the network receiver 28d receives the Vox packets 95 over the network 18. The Data Storer 28f converts the packets into indexed media payloads (step $136_3$), which are stored in the PIMB 30 (step $136_4$). As the payloads are stored, the Data Quality Manager (DQM) 28g is run. The DQM 28g checks for missing or corrupted packets, ensures the eventually storage of an exact copy of the transmitted data, and the sends receipt reports regarding the conditions of the network to the transmitter. Each of these functions of the DQM 28g are described in more detail below with regard to FIGS. 9D through 9F.

In FIG. 8E, the sequence for the Render function of the PIMB Reader 26 (box 140 of FIG. 8A) on the receive Client $12_2$ is illustrated. In the initial step $140_1$, the Data Prioritizer 26a prioritizes the indexed media payloads to be rendered as determined by the MCMS application 20 using the MTSD information as well as User status and presence information, including the User's Intentions and Attention status. The prioritized payloads are then read from the PIMB 30 (step $140_2$) by the Data Retriever 26b. The PLC/Interpolator 26c performs packet loss compensation and interpolation (step $140_3$) on the retrieved payloads, using known packet loss compensation and interpolation algorithms depending on which Codecs are used. In the next step, the Mixer 26d mixes (step $140_4$) multiple Messages of a Conversation if two or more Participants have generated Media at the same time within the same Conversation (e.g., both are speaking at the same time). The Renderer 26e renders (step $140_5$) the data stream from the Mixer 26d, generating sound, video, or other Media (step $140_6$) for the recipient User.

In FIG. 8F, the sequence for a Server 16 to receive Vox packets from the previous hop on the network 18, store, archive and transmit the Vox packets to the next hop is illustrated. In the initial step, the Server 16 performs the Net Receive function of the PIMB writer (similar to FIG. 8D) to store the indexed media payloads of the received data in the PIMB 85 and archive 89 or the Server 16. The server 16 also performs the Transmit function of the PIMB writer (similar to FIG. 8C) to forward the received packets onto the next hop on the network 18. In this manner, a copy of the media generated by the transmit Client $12_1$ is received, stored and transmitted at each hop along the path to the receive Client $12_2$.

In the aforementioned embodiment, the writing of received indexed media is stored in the PIMB 91 of the Server 16 and transmitted to the next hop in a serial fashion. In an alternative embodiment, the received indexed media payloads can be stored in the PIMB 91 and transmitted to the next hop substantially at the same time. The storage of Media on the PIMB 30 of both transmitting and receiving Devices 13 allows for the progressive transmission and rendering of Media. On the transmit side, the Media originating on the transmitting device may be progressively transmitted over the network as it is being received. In various embodiments, the encoded Media (regardless of how it is originated) may be progressively transmitted before, after, or at substantially the same time it is stored in the PIMB 30. On the receive side, the incoming Media may also be progressively rendered as it is received over the network, provided the User has opted to Review the Media in the near real-time mode. In various embodiments, the incoming Media may be progressively rendered before, after or substantially at the same time as it is stored in the PIMB 30 of the receiving Device 13. If the received Media is to be Reviewed in the time-shifted mode, then the Media is retrieved from the PIMB 30 (or possibly a PIMB 85 on a Server 16 if replaced on the local PIMB 30) for later Review at a time designated by the User.

In the context of the present application, the term progressive or progressively is intended to be broadly construed and generally mean the continuous processing of a data stream based on availability of the data. For example, as Media is created or otherwise originated on a Device 13, the progressive encoding, storage, packetization and transmitting of that media is continuous, so long as the Media is available. As a person speaks, that Media is progressive or continuously encoded, stored, packetized and transmitted for the duration of the persons speech. When the person pauses or stops speaking, there is no media to progressively process. When the person resumes speaking again, the progressive processing of the Media resumes. On the receive side, the Media is also progressive processed as the Media is being received (i.e., available). As the Media is received it is continuously stored. It will also be continually rendered as the Media is being received when in the near real-time mode or from storage when in the time-shifted mode. Although the above explanation was provided in the context of voice, it should be understood that all types of Media can be progressively processed in a similar manner. Also the progressive processing of Media does not necessarily have to be progressively processed in time-indexed order. Rather the Media is processed in the order in which it is received. If Media is received out of index order, in one embodiment, the Media is progressively processed in the order it was received and then organized into the indexed sequence in the PIMB 30. In an alternative embodiment, the received Media can be organized into its indexed sequence and then progressively rendered.

H.2 PQM Operation Flow Diagrams

The PQM 26g relies on a metric called the Maximum Available Bit Rate (MABR), which is a continually computed approximation of actual transmission capacity or bandwidth (i.e., a measure of the capability of the network at a given point in time) between a sending and receiving node pair. As instantaneous network conditions change, the MABR is updated. Regular measurements of network throughput, packet loss, and jitter are considered in computing the MABR. In an alternative embodiment, the MABR may also be manually set or limited based on time of day, type of network, other conditions or parameters.

The PQM also considers the Intention of the recipient(s) to optimize transmission for time-sensitivity. A transmission is considered time-sensitive if either (i) the Intention of the recipient(s) is to Review the transmission "live" or in the near real-time mode, or (ii) the recipient would like to immediately Review a Message that for some reason is not currently stored on their Device 13 (e.g., the Message was previously stored in the archive 89). The Intention of the recipient can be either inferred by the behavior of the recipient or the recipient may set or otherwise designate their Intention. On the other hand, a transmission is considered to be not time-sensitive if the Intention of the recipient is to Review the Message in the time-shifted mode. The Intention of the recipient to Review the transmission in either the live or time-shifted mode at least partially defines the "timeliness requirements" of the transmission. In various other embodiments, factors such as the urgency or priority of transmissions may also be considered in defining the timeliness requirement of the transmission.

The nodes in the network path between a sender and a receiving pair also need to be consistent regarding the status of intentions of the recipients. If one target recipient indicates timeliness, meaning they wish to Review the transmission immediately or live, then all the intermediate nodes on the network along the sender-receiver path need to have the same timeliness requirement, regardless of the requirements of other recipients. The timeliness requirement of each of the intermediate nodes is therefore dependent on the receiving nodes the transmission is being sent to. This dependency is sometimes referred to as a "union of requirements" for target nodes in the network transmission path.

The PQM further considers an Ideal Bit Rate or "IBR" for each scheduled Message payload transmission. For time-sensitive transmissions, the IBR is computed based on the packetization rate needed for substantially real time or live communication (referred to herein as the Real Time Bit Rate or RTBR). With voice for example, a packetization rate of a packet every 20 milliseconds containing 20 milliseconds of audio data is considered an acceptable IBR for conducting live conversations. The RTBR for such a system in kilobits per second would be the size of 1 second of audio payload data plus the size of all network headers that would be generated for the transmission. For video media or a combination of voice and video, the RTBR will likely be substantially higher than simply voice. For other types of media such as sensor or GPS positioning data, the RTBR will likely be lower than that of voice. For non time-sensitive transmissions, the IBR is set to a Maximum Efficiency Bit Rate (MEBR) to optimize the usage or efficiency of transmissions over the network. The MEBR is calculated by adjusting the packetization rate to its largest possible value for the underlying network. If multiple messages or payloads are to be sent between a sending and receiving pair, then an Aggregate IBR (AIBR) is considered for the transmission.

The PQM operates by sending data in a series of transmission loops for each sending and receiving pair. The transmission loops for each sending and receiving pair are independent. Any transmission on the network may affect the MABR of other sending-receiving pairs. Accordingly, the MABR is preferably continually computed for all recipients.

Figure 9A:
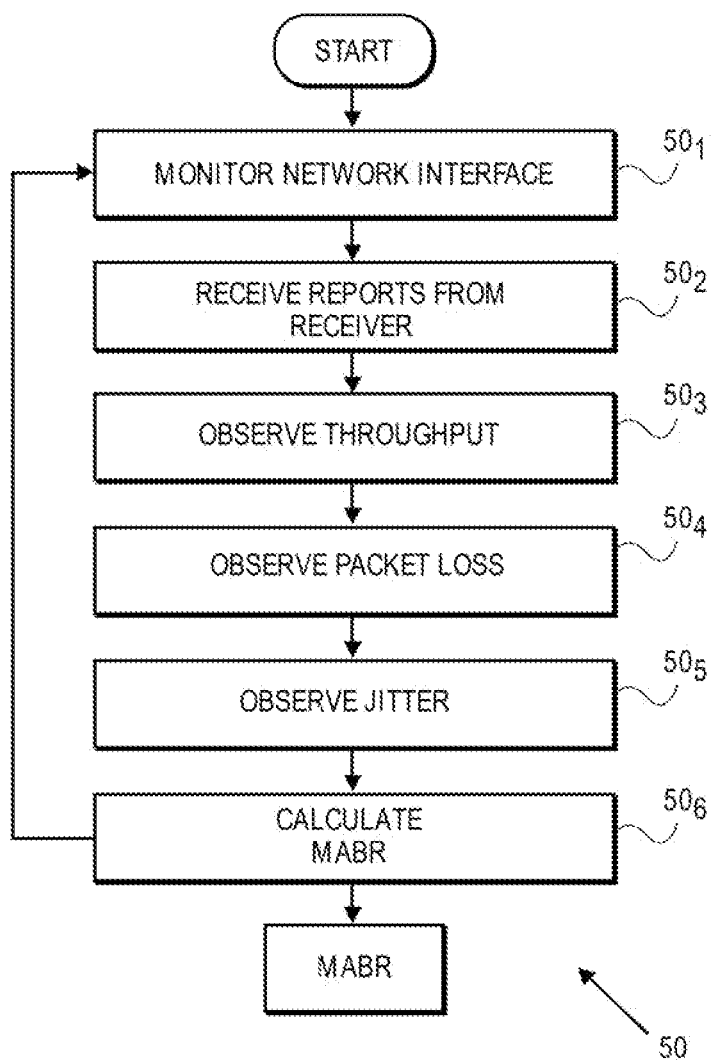
FIGS. 9A through 9C are flow diagrams illustrating the operation of a Payload Quality Manager (PQM) and FIGS. 9D through 9F are flow diagrams illustrating the Data Quality manager (DQM), both used by the Clients and Servers of the invention.
Figure 9B:
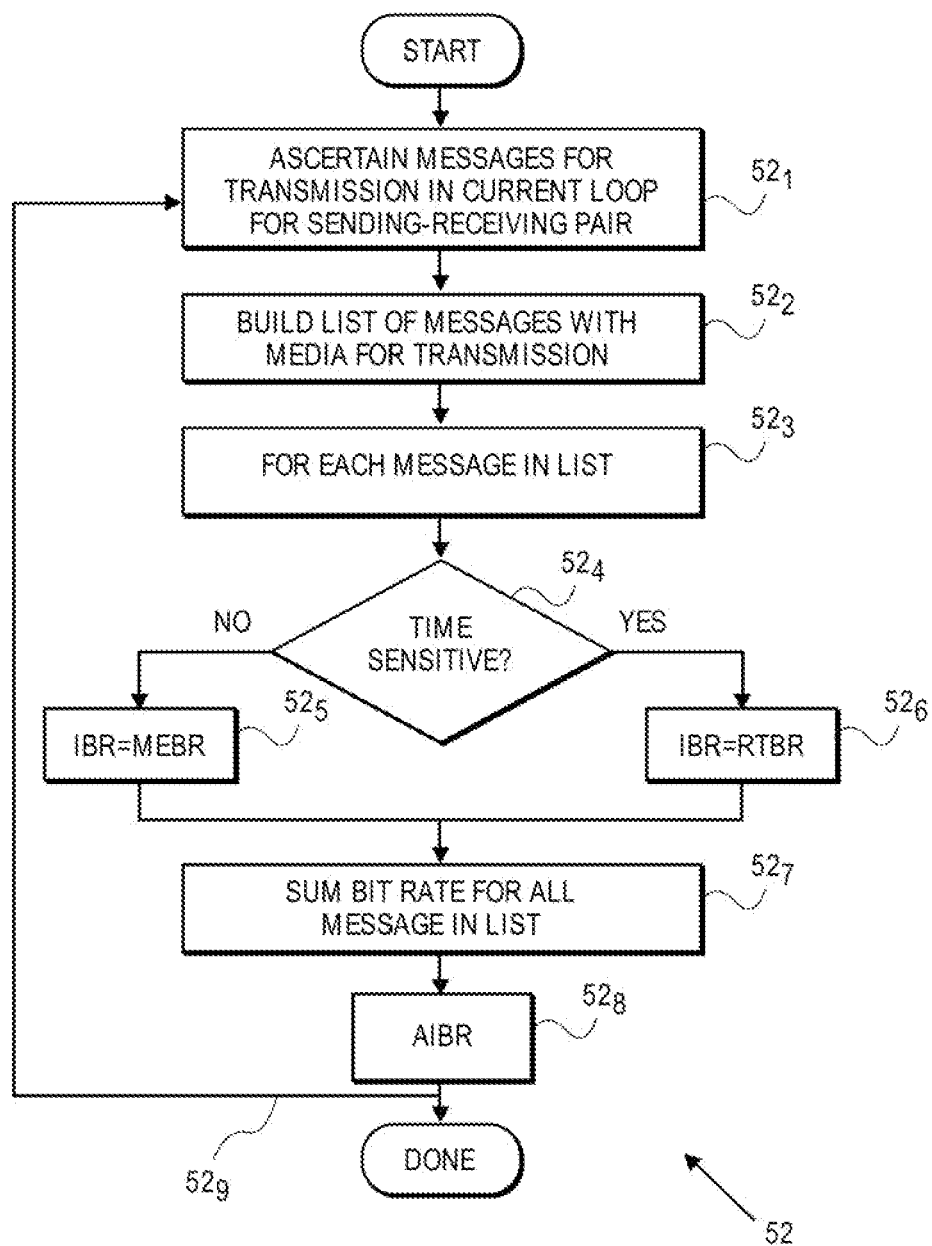
Figure 9C:
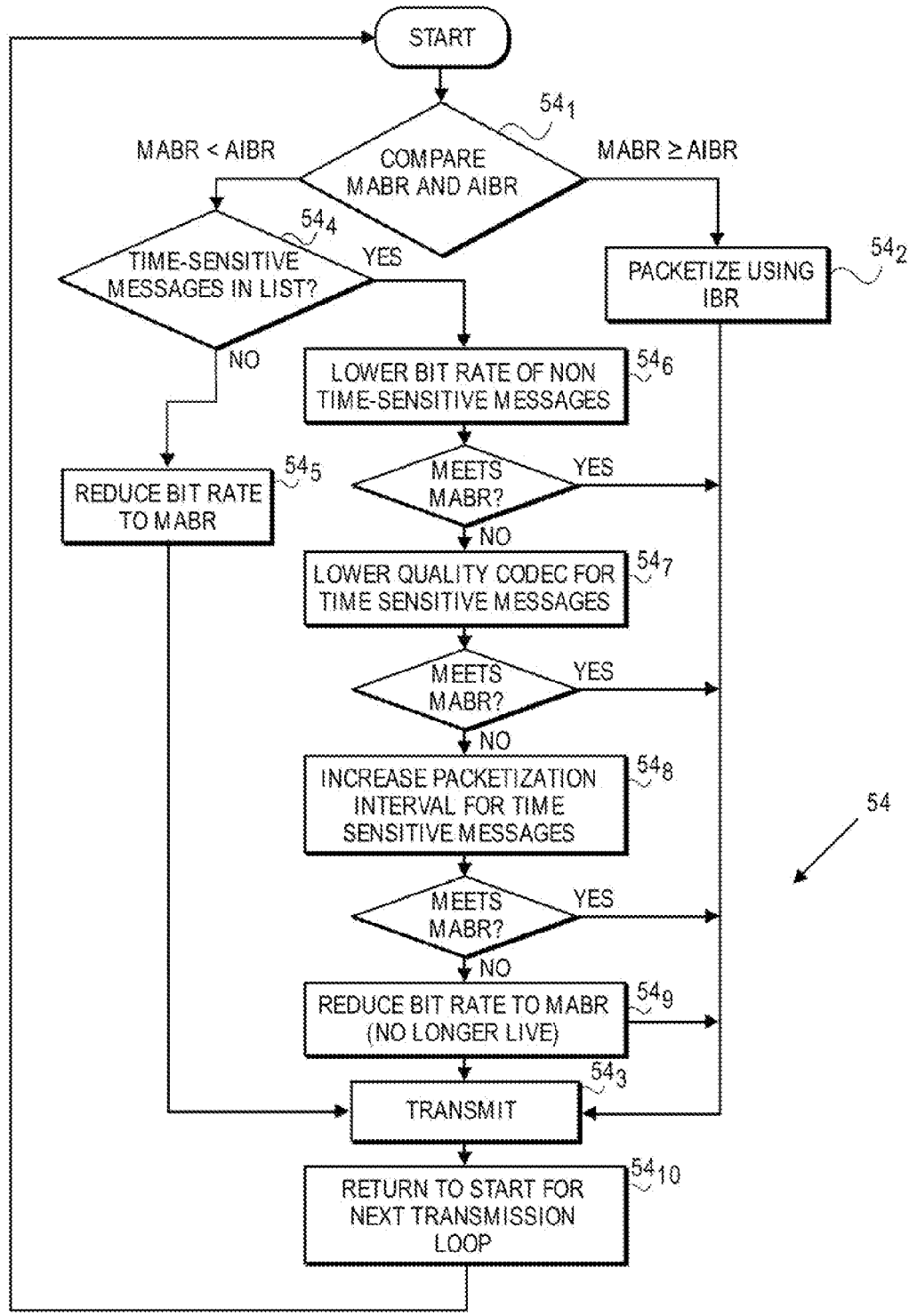

Referring to FIGS. 9A through 9C, flow charts illustrating the sequence of operation of the PQM for a single sending and receiving pair is illustrated. In FIG. 9A, the steps in determining the MABR between the single sending and receiving pair are illustrated. In FIG. 9B, a flow chart illustrating the steps for calculating the AIBR for each transmission loop for the single sending and receiving pair are illustrated. In FIG. 9C, a sequence for determining the amount of data to transmit between the sending and receiving pair per loop is illustrated. The processes illustrated in the three diagrams run simultaneously and interact with one another, as described in more detail below.

In FIG. 9A, a flow chart 50 for calculating the MABR for the network interface between the sending and receiving pair is shown. In the initial step $50_1$, the network interface between the sending and receiving pair is monitored. The sender periodically receives reports, which contain information regarding the status of the network connection at the receiver in step $50_2$. The reports include information regarding the current status of data throughput $50_3$, packet loss $50_4$, and jitter $50_5$ as observed by the receiver at the network interface. In step $50_6$, the MABR is calculated at the sender based on these observations contained in the reports. By monitoring or observing the data in these reports, the MABR value is continually adjusted based on current network capabilities or conditions between the sending and receiving pair. As network capabilities become more favorable for data transmission, the MABR will increase. If the network capabilities become less favorable for transmission, the MABR will decrease, potentially all the way to zero for an unusable network. The reports are similar to the packet loss reports generated by nodes in TCP networks, but additionally include throughput and jitter information as well.

If there are several network interfaces between the sending and receiving pair, an MABR is calculated for each interface for which a receipt report is received. If no traffic has been recently sent on the network, or no receipt reports have been received, the MABR may not reflect current network conditions. However, since receipt reports are generated continually by receivers while data is transmitted, the sender's MABR metrics will quickly converge to a more accurate value.

Referring to FIG. 9B, a flow chart 52 illustrating the steps for calculating the AIBR for a transmission loop is illustrated. In the initial step $52_1$, the Messages with Media (by which we mean portions of the time indexed media that belongs to this Message) ready to be transmitted between the sending and receiving pair in the current loop are ascertained. A list of Messages with Media is then built $52_2$. For each Message in the list $52_3$, the time-sensitivity or timeliness requirement of each Message is considered $52_4$. If a particular Message is not time-sensitive, then the IBR is set to the Maximum Efficiency Bit Rate (MEBR) $52_5$. On the other hand, if a Message is time-sensitive, then the IBR is set to the Real Time Bit Rate (RTBR) $52_6$. In the next step $52_7$, the previously computed IBRs for each of the Messages in the list are summed together, resulting in the Aggregate Ideal Bit Rate (AIBR) $52_8$ for the transmission loop. As signified by the return arrow $52_9$, the above-described process is repeated for each transmission loop between the sending and receiving pair.

Referring to FIG. 9C, a flow chart 54 illustrating the sequence for determining the rate of data to transmit between the sending and receiving pair per transmission loop is illustrated. In the initial step $54_1$, the MABR (as calculated in FIG. 9A) is compared to the AIBR (as determined in FIG. 9B) for the next transmission.

If the MABR is greater than or equal to the AIBR, then all the Messages identified as ready for transmission in the loop are packetized at the IBR rate $54_2$ and transmitted $54_3$.

On the other hand, if the MABR is less than the AIBR, then a series of procedures are applied to so that the PQM meets its goals of the timely delivery of an adequate copy of the data, the efficient use of available bandwidth, and/or adjustments to the payload content and quality, packet size, and transmission rate to meet current network conditions.

In the initial step, the Messages in the list are reviewed for time sensitivity $54_4$. If there are no time sensitive Messages, then the bit rate is reduced to the MABR $54_5$, and the Messages are transmitted $54_3$.

If the list includes time-sensitive Messages, the bit rate allocated for the non time-sensitive Messages is reduced $54_6$ until it meets the MABR limits. If reducing the bit rate all the way to zero is insufficient to meet the MABR, then these non time-sensitive Messages are removed from the list of Messages to be transmitted in the loop. If the bit rate has been reduced so that it is less than or equal to the MABR, then the remaining Messages are Packetized and transmitted $54_3$.

If the removal of non time-sensitive Messages was not sufficient to meet MABR, then another procedure involving the use of a lower quality Codec (or Codecs) for the remaining time-sensitive Messages $54_7$ is used. An attempt is made to transmit the payload data as fast as possible by sending fewer bits during the transmission loop. In other words, by reducing the quality of the payload, the transmission sends fewer bits in a given period of time. In various embodiments, different Codec or Codecs, each having a different bit rate versus quality tradeoff, may be used. If the use of the lower quality Codec or Codecs is sufficient, meaning the MABR limit is met, then the Messages are transmitted $54_3$.

If the use of lower quality Codec(s) still does not meet the MABR, then the packetization interval of the time-sensitive Messages is increased $54_8$. With this procedure, the header-to-payload ratio is increased, which lowers the overall bit rate but introduces latency (i.e., a delay in the delivery of the transmission to the recipient). If this procedure results in the reduction of the AIBR to less than or equal to the MABR, then the transmission $54_3$ occurs.

If after changing the packetization interval the MABR is still not met, then the bit rate may be progressively lowered $54_9$ to be within the MABR limit. When the bit rate is lowered in this manner, time-sensitive messages are sent at a rate that is not sufficient to maintain a live conversation. Therefore, the Conversation is forced out of "live". If the network is down or conditions are very poor, it is possible that no data transmission may occur. Again, the aforementioned sequence is repeated for each transmission loop $54_{10}$ between the sending and receiving pair.

If there are multiple network interfaces between the sending and receiving pair, the sequence described in relation to FIG. 9C is performed for each interface for which receipt reports are available. In various embodiments, the sender may contain logic to distribute the transmission load among the multiple interfaces. In different examples, the payloads can be sent only on one interface, while in other embodiments, some or all of the interfaces may be used.

The aforementioned description pertains to any sending and receiving pair in the system 10. In most situations, the sending and receiving pair will include a Client 12, enabled Device 13 and Server 16, two Servers 16, a Server 16 and Client 12 enabled Device 13, or even possibly two Clients 12 respectively. If a sending node is transmitting to two (or more) receiving nodes at the same time, the above mentioned sequence as described in relation to FIGS. 9A-9C occurs concurrently for each receiving-sending pair.

H.3 DQM Operation Flow Diagrams

The DQM 28g determines if data received at the Client 12 is either corrupted or if there are missing packets. In addition, the DQM 28g of a receiving Client 12 generates of the receipt reports, which are sent back to the transmitting node on the network. The DQM 28g also runs a background process to ensure that an exact copy of transmitted data is eventually received and stored. These functions are described below in FIGS. 9D through 9F respectively.

Figure 9D:
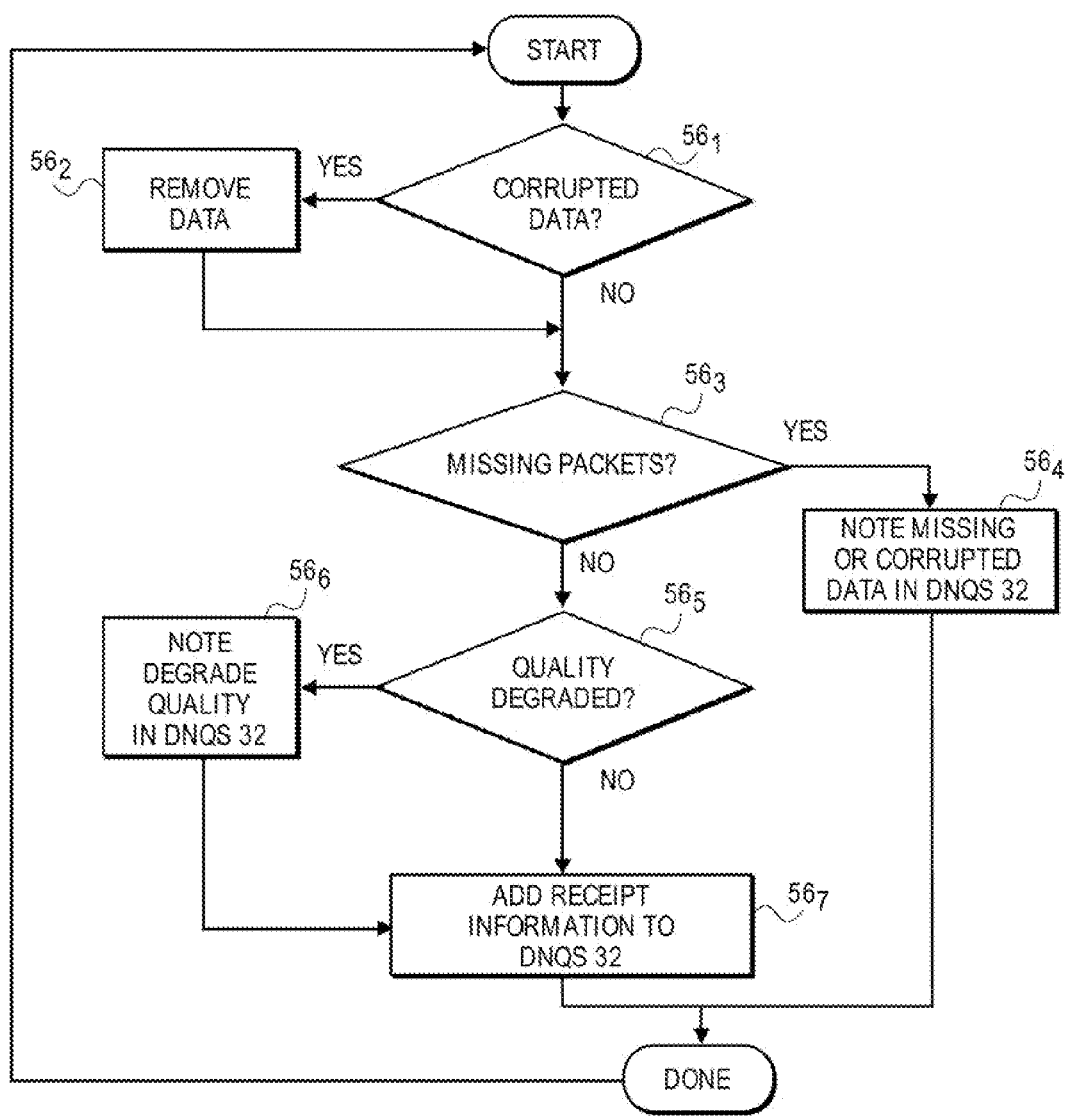

Referring to FIG. 9D, a flow diagram illustrating the operation of the DQM 28g for checking for missing and/or corrupted data is illustrated. In the initial step $56_1$, the DQM 28g checks for corrupted packets using well-known techniques, such as CRC or similar integrity checking mechanisms. If a packet is corrupted, that packet is treated as missing $56_2$. The DQM 28g next ascertains if any packets are missing $56_3$. If an out of sequence packet is not received after a predetermined period of time, it is assumed to be missing. The DQM 28g notes any missing or corrupted packets $56_4$ in the DNQS 32. On the other hand if no corrupted or missing packets are detected, the DQM 28g determines if the quality of the received data was intentionally degraded by the sender $56_5$ for the purpose of saving bandwidth. The degraded quality is noted in the DNQS 32 $56_6$. Regardless if the quality of the received data is degraded or not, receipt information (e.g., a packet sequence number, time stamp, and the network address of the next node in the network the packet is to be sent) of the data is stored $56_7$ in the DNQS 32. The aforementioned process is continually repeated, as signified by the return arrow to the start of the flow diagram.

As a result of the process detailed in FIG. 9D, information regarding the receipt of non-degraded packets, the deficiency of degraded quality packets, and missing packets, are all stored in the DNQS 32. As Media is received, the DNQS 32 maintains up-to-date information regarding the status of the Media.

Figure 9E:
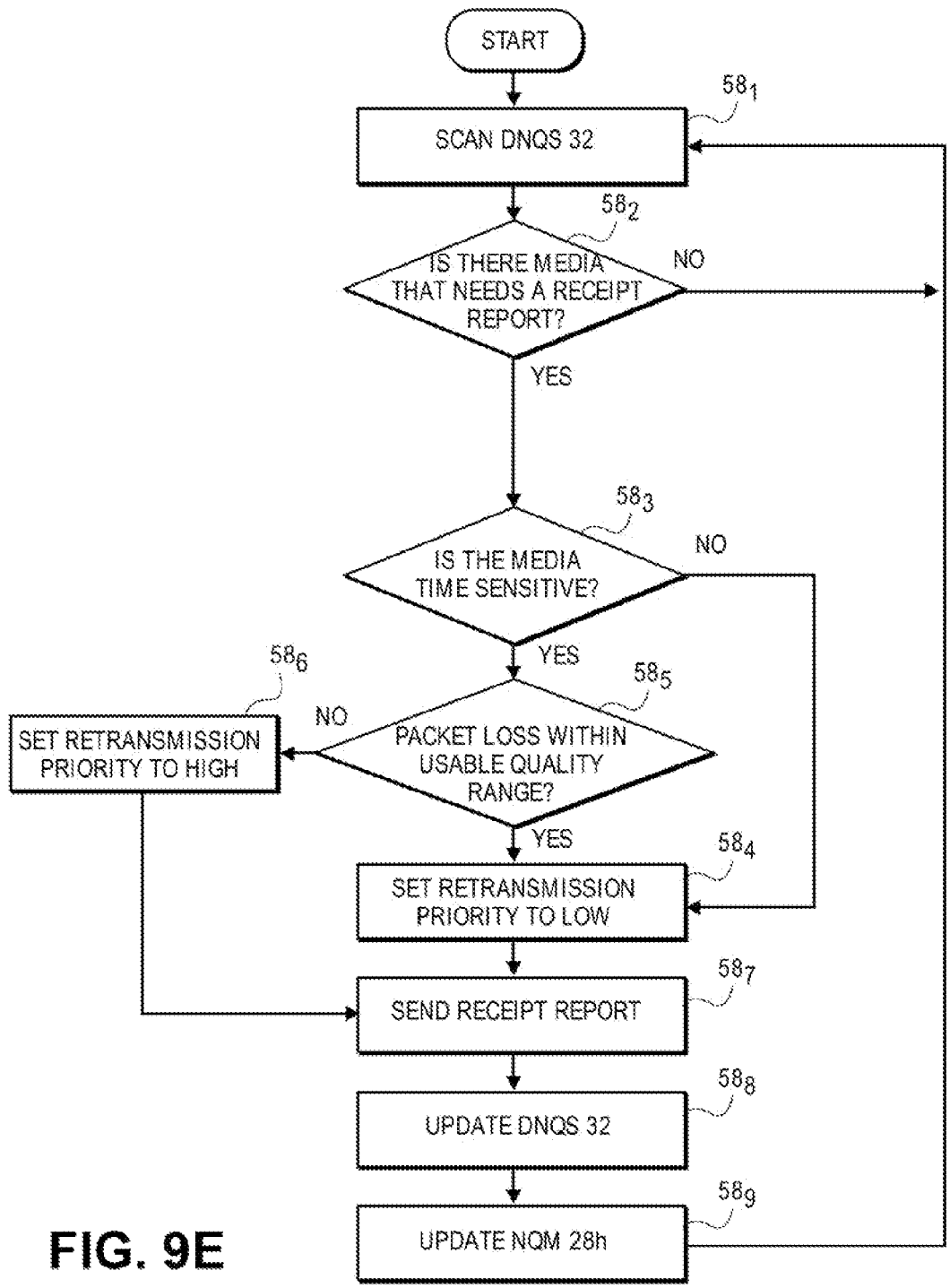

Referring to FIG. 9E, a flow diagram illustrating the operation of the receipt report generator function of the DQM 28g is illustrated. In the initial step, the DNQS 32 is periodically scanned $58_1$ to determine if there is any Media for which a receipt report needs to be generated $58_2$. If the answer is no, then the above scanning process is repeated. On the other hand if Media is identified, then the process determines if the Media is time-sensitive $58_3$, meaning either the User intends to Review the Media live or the user would like to immediately Review Media that is not stored on their Device 13.

If not time-sensitive, then the recipient informs the sender to set the retransmission priority (as defined below) to low $58_4$. If time-sensitive, then the amount of packet loss is considered $58_5$. If the amount of packet loss is outside a usable quality range, the retransmission priority is set to high $58_6$. As noted above, if the amount of packet loss is too large, the recipient may not be enabled to Review the Media upon receipt. If the quality is within an acceptable range, meaning the quality of the transmission is sufficient that it can be understood when rendered, then the priority for the sending of the receipt report is set to low $58_4$. Regardless if the recipient is Reviewing upon receipt or not, a receipt report is sent $58_7$, the DNQS 32 is updated $58_8$ and the Network Quality Manager (NQM) 28h is updated $58_9$. The retransmission requests defined in step $58_4$ is therefore conditional based on time-sensitivity. The transmission request defined in step $58_6$ is conditional on both time-sensitivity and quality.

The retransmission priority informs the PQM 26g of the sender to properly prioritize the transmission rate for the Media that requires retransmission. For example when the retransmission priority is set to high, then the sending PQM 26g of the sender should send any retransmissions before any new Media. If the priority is low, the PQM 26g should send the retransmitted Media after any new Media.

The aforementioned process is continuously repeated so that receipt reports are generated as Media is received. If the sender does not receive receipt reports in a timely manner, the PQM 26g of the sender will reduce the transmission rate, eventually stopping the transmission if no receipt reports are received.

Figure 9F:
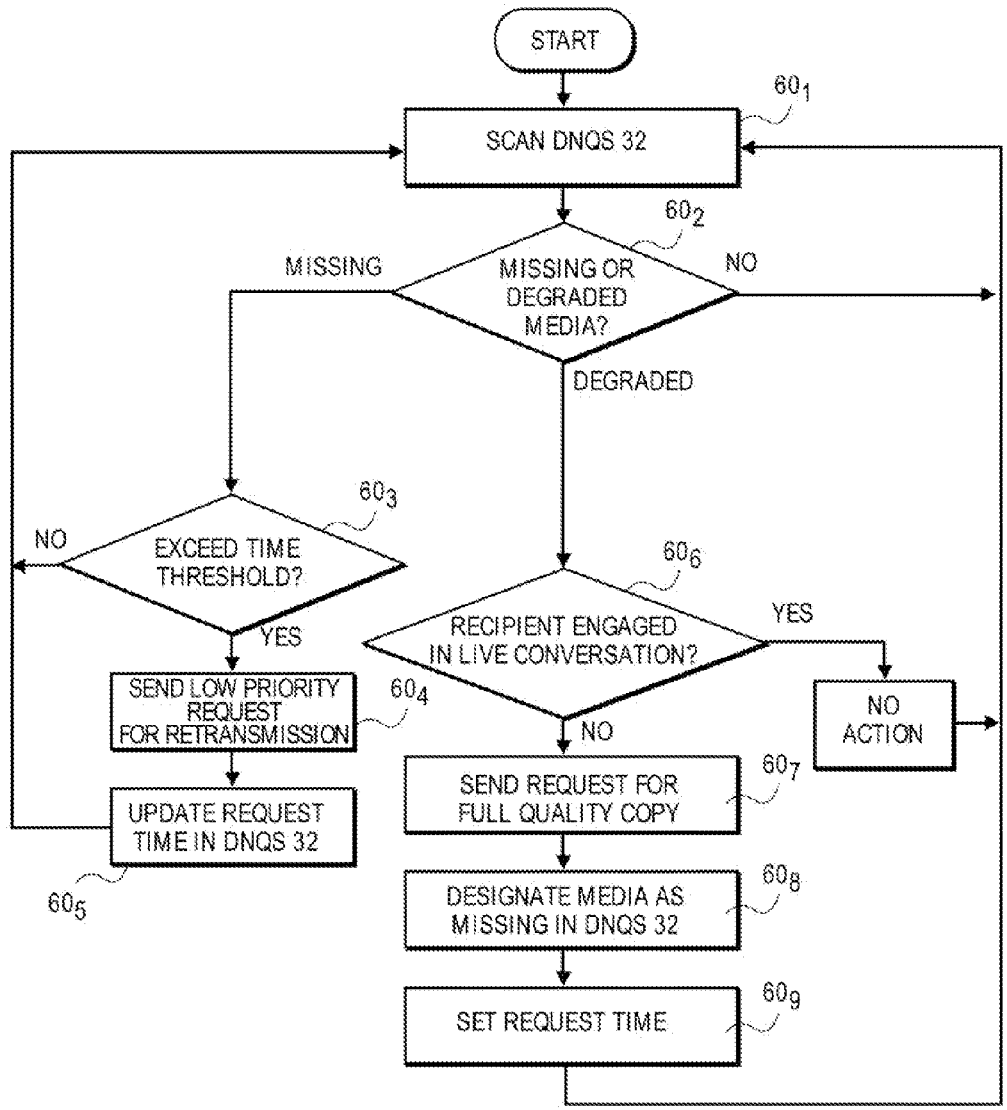

Referring to FIG. 9F, a flow diagram illustrating the sequence for requesting of missing or degraded Media is illustrated. In the initial step $60_1$, the DNQS 32 is periodically scanned for missing or degraded Media $60_2$. If there is no missing or degraded Media, then the above defined scan is periodically repeated.

Media is considered missing if an out of sequence packet does not arrive after a predetermined threshold period of time $60_3$. If the packet arrives before the threshold, then it is no longer considered missing. On the other hand if the packet does not arrive after the threshold is exceed, then it is deemed missing. With missing packets, a low priority request for retransmission is made $60_4$ and the time of the request is noted $60_5$ in the DNQS 32. This process is repeated until the missing packet is received. When the missing packet arrives and the corresponding Media is available in the PIMB 30, the missing status of the Media is removed from the DNQS 32. The retransmission request defined in step $60_4$ is therefore conditional based on whether the Media is determined to be missing.

If degraded, the DQM 32 determines if the Media is part of a live Conversation $60_6$. If not, a request for a full quality copy of the degraded Media is made $60_7$, the full quality Media is designated as missing $60_8$ and the request time is noted $60_9$, in the DNQS 32. If the Media is part of a live Conversation, then no action is immediately taken in order to preserve network bandwidth. When the Conversation transitions out of the live mode, then the steps $60_7$ through $60_9$ are performed to ensure that a full quality (i.e. an exact or perfect) copy of the degraded Media is eventually received. When the data becomes available in the PIMB 30 of the recipient Client 12, the degraded status of the associated Media is removed from the DQNS 32. The transmission request defined in step $60_7$ is conditional on whether the Media is both degraded and not part of a live conversation.

The aforementioned process is continually repeated, as signified by the return arrows from $60_5$ and $60_9$ to the top of the flow diagram at $60_1$. By repeating the process outlined in FIG. 9F, exact copies of all transmitted Media is eventually stored in the PIMB 30 of the receiving Device 13. In this manner, the storage of exact copies of transmitted Media is guaranteed at the recipient Device 13.

I. Graphical User Interface

Figure 10:
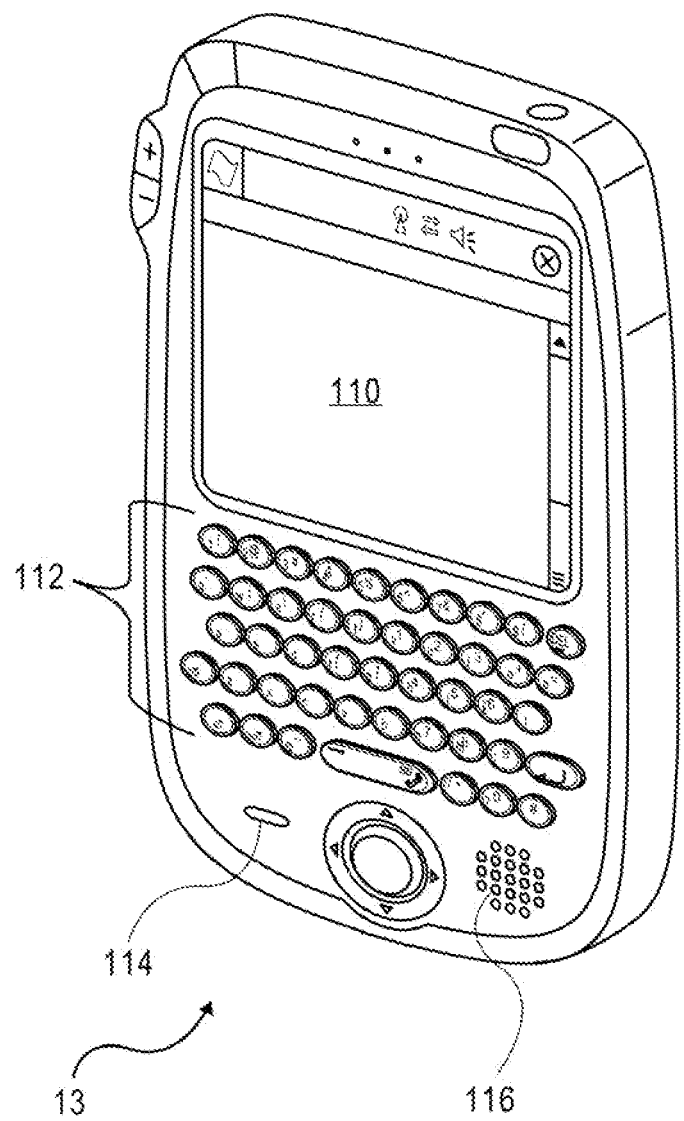
FIG. 10 is an exemplary device having a graphical user interface that may be used with the system of the invention.

Referring to FIG. 10, an exemplary Device 13 running Client application 12 is illustrated. The Device 13 includes a graphical user interface display 110, data entry buttons, keys, or keyboard 112, a microphone 114, and a transducer 116 for converting electrical signals into sound, such as a speaker. The display 110 may also accept input as a touch screen. Further, the display 110 and keyboard 112 may be combined using a touch screen interface. As noted above, the Device 13 may be a variety of different communication tools, such as a desktop computer, laptop or other mobile computers, personal digital assistants, a programmable land-line or cellular phone, or programmable radios, or just about any other type of programmable communication device. The exemplary Device 13 illustrated in the figure is intended to be "generic", in the sense that it is supposed to represent or encompass all of the communication devices listed above. In addition, the term "graphical" user interface should not be construed as limiting. Other types of user interfaces which can be implemented on a Device 13 as well including Audio/DTMF interfaces, Voice User Interfaces (VUI), radio switch interfaces, or a combination thereof, can all be used to implement the various functions described below. For the sake of simplicity, each of these types of methods by which a User may interact with their Device 13 are generically referred to as a "user interface".

All Devices 13, regardless of their type, preferably have a user interface that enables the user to operate the Device 13 and communicate with other User's in the system 10. Although the user interface can be designed to have virtually an infinite number of different look and feel implementations, there are certain functions and features that all Devices 13 should have in common. These functions and features are listed below.

The user interface preferably includes one or more of the following status indicators or flags: (i) battery indicator; (ii) connectivity indicator; (iii) clock; (iv) transmitter status; (v) transmission sync status; (vi) Reviewing status; (vii) Priority Messages needing attention; and (viii) missed Messages.

The user interface preferably includes the following functions, flags and components to conduct and manage a single Conversation: (i) name of a Conversation and/or list of Participants; (ii) Conversation status; (iii) Conversation type; (iv) Conversation duration; (v) time behind the Head of the Conversation; (vi) outstanding Messages; (vii) presence/status of Participants; (viii) meta data with navigation; (ix) Conversation attributes or designators; (x) Conversation set-up including title, scheduling, Participants, Conversation summary; and (xi) indicators showing which Participants have contributed Messages and which have Listened to or Reviewed messages.

The user interface also preferably includes, in addition to those listed immediately above, the following functions, flags and components to conduct and manage multiple Conversations: (i) a name/identifier for each Conversation; (ii) live/active or standing/inactive indicator; (iii) Review position, either at Head or Time shifted; (iv) Priority and other attributes; and (v) indicators of what portions of Conversations were missed.

The user interface also preferably includes, a number of navigation features, such as: (i) DVR style fast back/forward per conversation; (ii) instant messaging style personal message navigation; (iii) Conversation Time indicators; (iv) time scale shifting (i.e. zooming backward and forward through a Message or the Messages of a Conversation); (v) changing Priority of Conversations; (vi) hanging up; and (vii) home.

The aforementioned functions and features may be implemented in a variety of ways, for example using a touch-screen graphical user interface 110, or other input devices, such as the data entry buttons, keys, or keyboard 112, a mouse, by voice-activated commands, or a combination thereof. Again the functions and features listed above and how they are implemented is not intended to be exhaustive. The various methods and technologies that could be used is so comprehensive, that it is not practical to list or discuss them all herein.

J. Conversations

The MCMS application 20 supports a number of different types of Conversations, such as a near real time or "live" calls where the delay from when a Participant speaks and the other Participant(s) hear the first Participant is very small, Conversations where Participants exchange voice Messages back and forth with a longer delay between Messages, "live" conference calls involving multiple Users, standing Conference calls at a regularly scheduled times, or configurable structured call types such as a simultaneous briefing, where Participants each leave a Message briefing beforehand for others to Review to before everyone joins the live conference call. Yet another unique attribute of the MCMS application 20 is the ability for Users to transition between the different types of Conversations. For example, the Participants can seamlessly transition from a voice-messaging mode to a live call and back again. Or the Participants of a live conference call can transition to a voice-messaging mode and send updates or action items to each other after the conference call. While several examples have been noted, it should be understood that the system 10 is extremely flexible and provides numerous options to transition between different types of calls or Conversations and between multiple conversations. By varying the delay between Messages, the Participants effectively flows between the type of Conversation that best suits their needs. The above examples should therefore not be construed as limiting.

As noted above, Conversations consist of Messages maintained in their original context and sequence. A sent Message either belongs to an existing Conversation or begins a new Conversation. A typical Conversation includes a set of Messages that are organized around a defined subject matter, topic, time, Group or Channel. For example, Conversations may involve a common Group of people such as the members of a club, a company may have a standing Conversation at a fixed time, such as a weekly sales meeting, or friends may have ad-hoc Conversations on various topics, such as making dinner plans.

Each Conversation is defined by a set of attributes, including a name, a list of Participants, begin and end time, and state including at least pending, active, or terminated. Other Conversation states are possible in other embodiments. A User interacts with the MCMS application 20 on their Devices 13. In preferred embodiments, the interface allows a User to organize Conversations by any of the various attributes.

The relationship between a Participant and a Conversation also has attributes. These attributes include, but are not limited to, Priority, Status (states of participation in a Conversation). The values of Participant status include active, participation in more than one Conversation at a time, Reviewing a Conversation in a time-shifted mode, Catching Up To Live, passively participating (i.e., not actively Reviewing, but receiving high Priority Messages), standby, or ignoring a Conversation (i.e., declined to participate or record the Conversation).

From a recipient's perspective, a User may select or define the relative priority of Messages. For example, Messages from a person's boss would typically be given a higher Priority than a social acquaintance. In some embodiments, a recipient has the ability to set their own Priorities. In the implementation of MCMS-C the User selects a subset of their Conversations to be rendered consecutively. The User then sets ordered Priorities for these Conversations. The system uses the priorities set by the user to order the Messages to be rendered. The aforementioned algorithm queues the Messages to be rendered using User Priorities and information concerning Message data available (beyond MTSD).

In other embodiments, such as tactical communications, the recipient may have no or limited ability to set Priorities. For example, a fire fighter may have no ability to lower the Priority of Messages from the fire chief. A sending-User, however, has the ability to send urgent or highly important Messages. By Tagging a Message as urgent or an emergency, the Message is rendered as soon as possible at the recipient(s), overriding any Priority settings of the recipient. Any conflicts among multiple emergency messages are resolved based on a predetermined priority scheme.

K. MCMS Operation

Figure 11A:
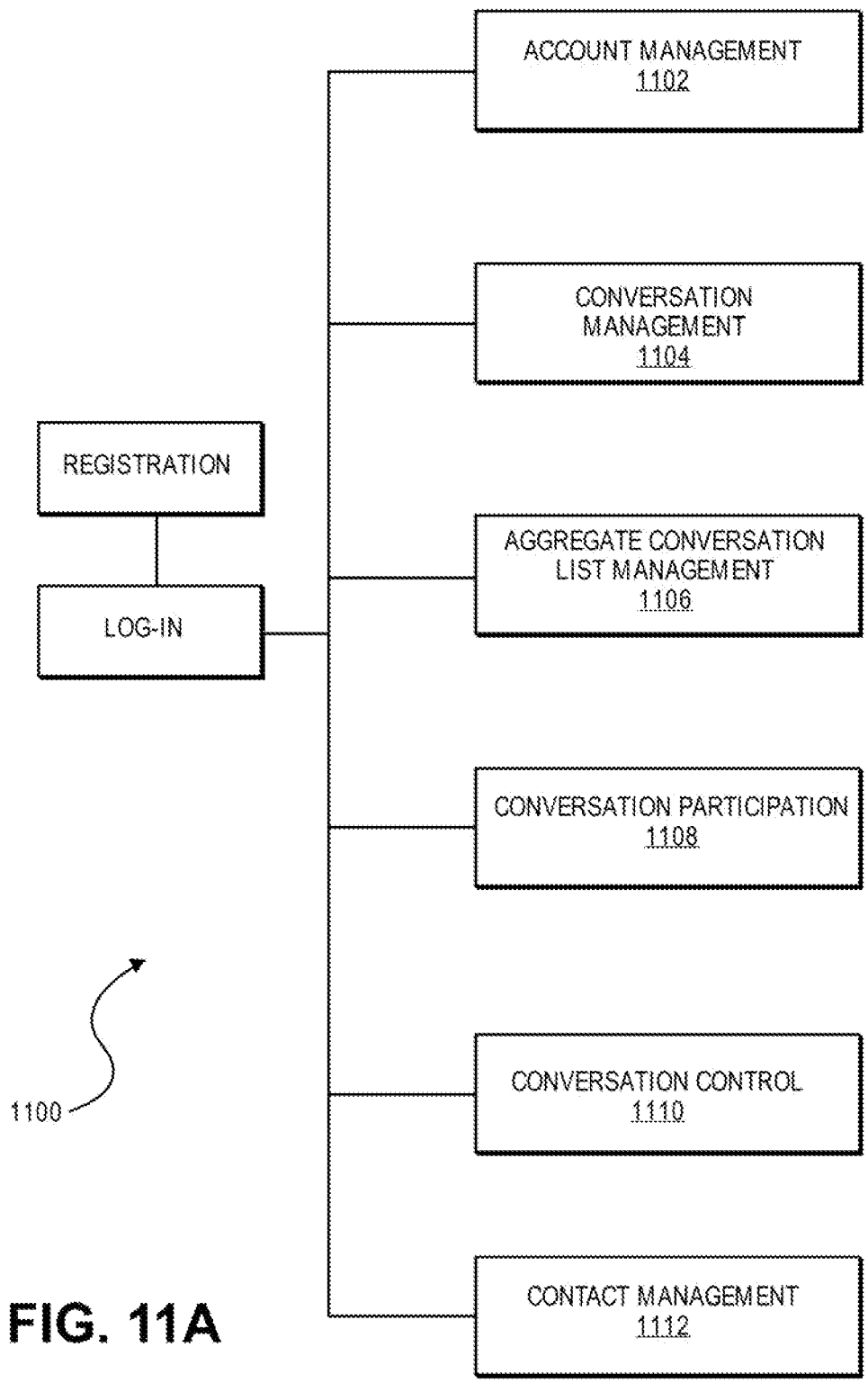
FIGS. 11A through 11F are diagrams illustrating multiple conversation management (MCMS) features of the invention.

Referring to FIG. 11A, an organizational diagram 1100 grouping the major functions of the MCMS application 20 is illustrated. The major functions include account management 1102, conversation management 1104, aggregate conversation list management 1106, conversation participation 1108, call controls 1110, and contact management 1112. After registering and logging into the system 10, the User may navigate through the user interface of their Device 13 implementing the various management functions, described in detail below. In some embodiments, this functionality will provide a great deal of flexibility. In other embodiments, such as tactical or communication radios, the implementation of the user interface may be constrained with many of the user functionality and options preconfigured to meet the utility of the device. The discussion here is exemplary and is not intended to be an exhaustive explanation of the MCMS functionality, but rather is intended to provide just an overview of some of the MCMS attributes.

K.1 Account Management

Under the account management function 1102, a registered User may change certain settings and preferences. A User may change their email address, password, name, phone number, phone password, call-in number, default and/or User defined rendering speeds, Tags, gain or volume levels for Reviewing Messages, Catch Up to Live mode, etc. To make these changes, the User enters the appropriate information through the interface 110 of their Device 13. The MCMS application 20 responds by writing the updated preferences into the MCMS database 22.

K.2 Conversation Management

Figure 11B:
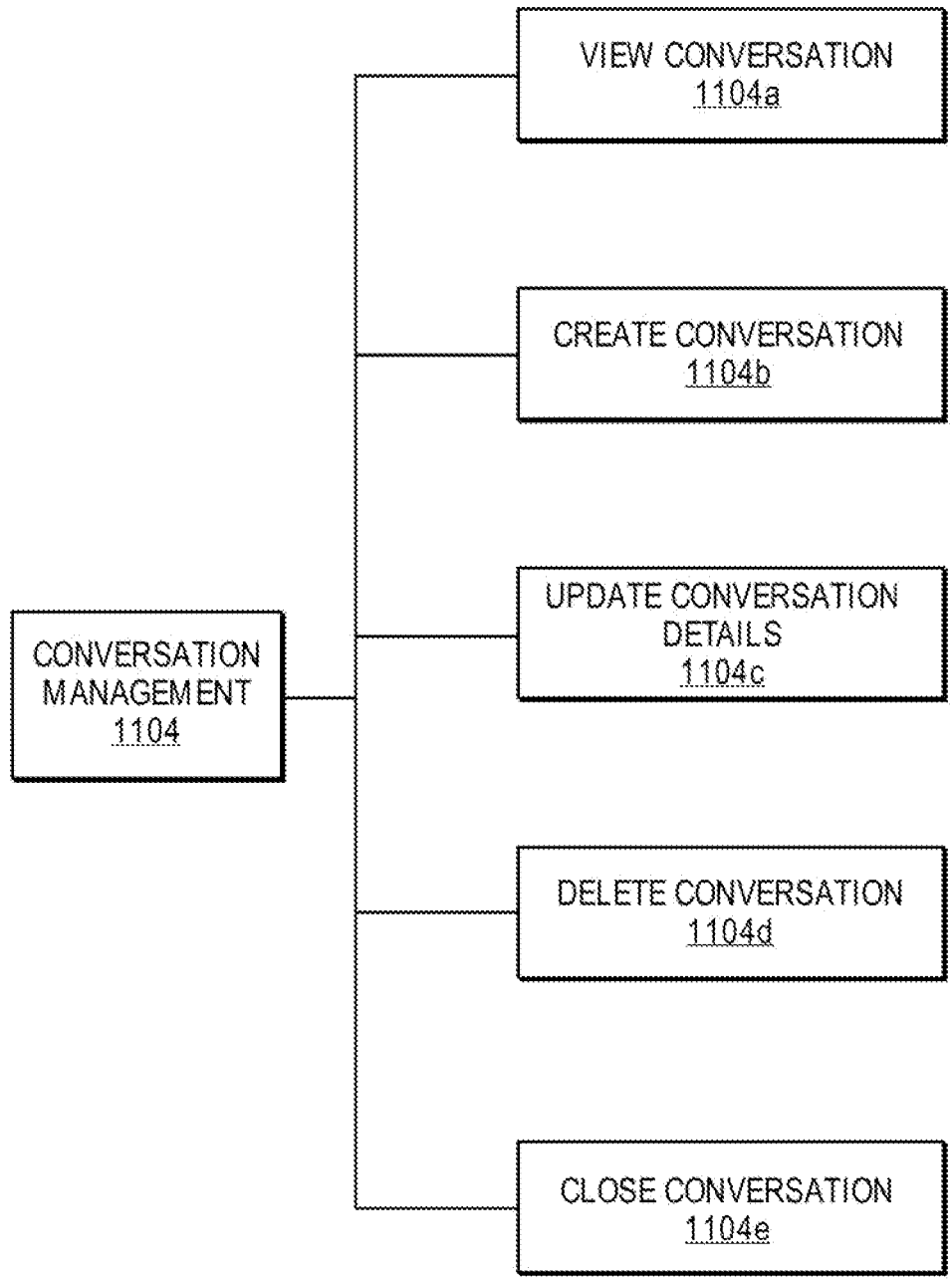

As illustrated in FIG. 11B, conversation management 1104 is a set of functions that allow a User to view their aggregate Conversation lists, create a new Conversation, update the details of a Conversation, delete a Conversation, and close a Conversation. Each of these functions are described below.

View Conversations 1104a—For each Conversation, the MCMS application 20 may provide the User the one or more of the following attributes: the name of the Conversation, the actual start time, the last activity, Tags, duration, and the list of Participants. For each Participant, the name and/or phone number, status (live, other call, in past, catch-up-mode, offline-reachable, offline-unavailable.)

Create a Conversation 1104b—A User creates a Conversation through the interface 110 by inputting a Conversation name, a list of Contacts, and an optional scheduled start time. If no start time is designated, it is assumed the start time is immediate. In response, the MCMS application 20 creates a new Conversation in the database 22, associating records for each Participant on the Contacts list. The MCMS application 20 also creates in the database 22 Participant records for each User on the Contact list, allowing the caller to receive the presence information of the others on the Contact list. If the Conversation is scheduled, the MCMS application 20 starts the Conversation at the designated time. Otherwise, the Conversation starts right away.

Update Conversation Details 1104*c*—The User may make changes to a Conversation through the user interface 110. For example, Participants may be added or removed. Any change in status of the participants is updated in the MCMS database 22.

Delete a Conversation 1104*d*—A User may delete a specific Conversation from their list of Conversations through the interface 110. In response, the MCMS application 20 notes the change in the database 22, and designates the Conversation as deleted.

Close a Conversation 1104*e*—A User may elect to terminate or close a Conversation. In one embodiment, only the User that creates a Conversation can elect to terminate that Conversation.

K.3 Aggregate Conversation List Management

Figure 11C:
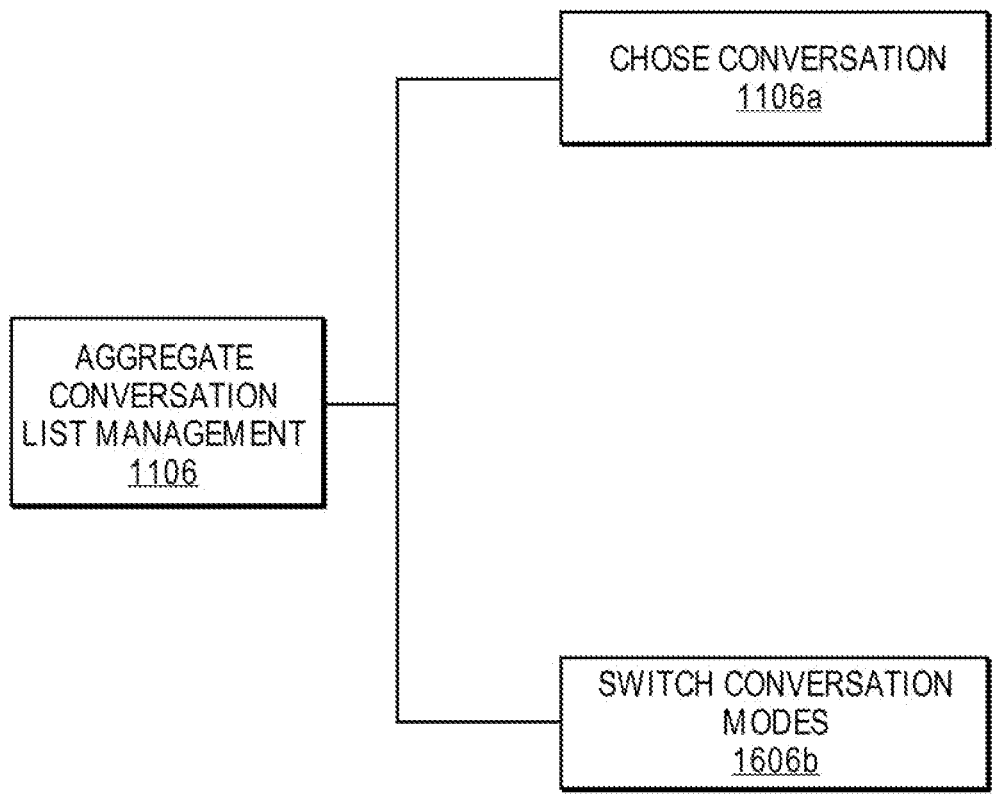

As illustrated in FIG. 11C, the aggregate conversation list management 1106 is a set of functions that allow a User to engage in multiple Conversations (i.e., the User's aggregate conversation list). The aggregate conversation list management functions allow a User, through the interface 110 on their device, to participate in one Conversation "live", while participating in other Conversations in a time-shifted mode.

Chose Conversation 1106*a*—Through the interface 110, a User may select one Conversation among the User's aggregate conversation list as current. The Messages of the current Conversation may be rendered in either the "live" or time-shifted modes. The User may switch the current conversation among the aggregate conversation list from time-to-time.

Switch Conversations Modes 1106*b*—In an optional embodiment, a User may be able to switch from the MCMS, MCMS-C and MCMS-S modes of operation.

K.4 Conversation Participation

Figure 11D:
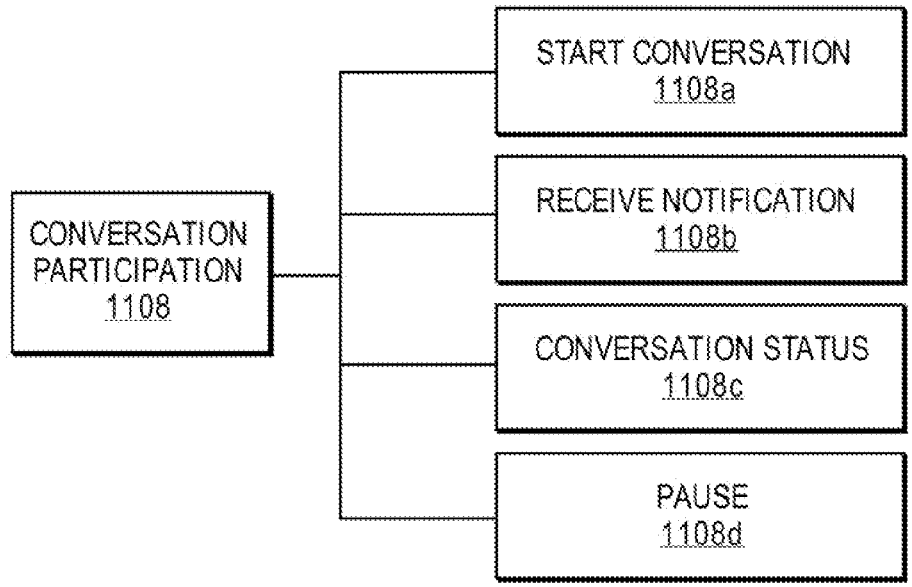

As illustrated in FIG. 11D, conversation participation 1108 is a set of functions that allow a User to start a Conversation, receive a notification to join a Conversation, obtain Conversation status information, and hang up on a Conversation.

Start a Conversation 1108*a*—After a Conversation has been created, either by the User through the interface 110 or the scheduler in the MCMS application, the status of each Participant is checked. If a Participant is offline, then an effort is made to contact that person. If a Participant is online but engaged in another Conversation, then the MCMS application 20 notifies that Participant. The presence status of all online Participants is updated in the database 22.

Receive a Notification 1108*b*—The system may notify a User that their attention has been requested on a Conversation through a graphic display and/or audible notification via the user interface 110.

Conversation Status 1108*c*—A user may request the status of a Conversation through the interface 110 of their Device 13. In response, the MCMS application 20 assembles the status information stored in the database 22 and presents the information to the User.

Conversation Pause 1108*d*—Through user interface 110, a User may hang up or switch away from an active Conversation. In response, the MCMS application 20 updates the User's participant status for active Conversations in the database 22 and directs the Store and Stream module 24 to remove the User from the Conversation.

K.5 Conversation Controls

Figure 11E:
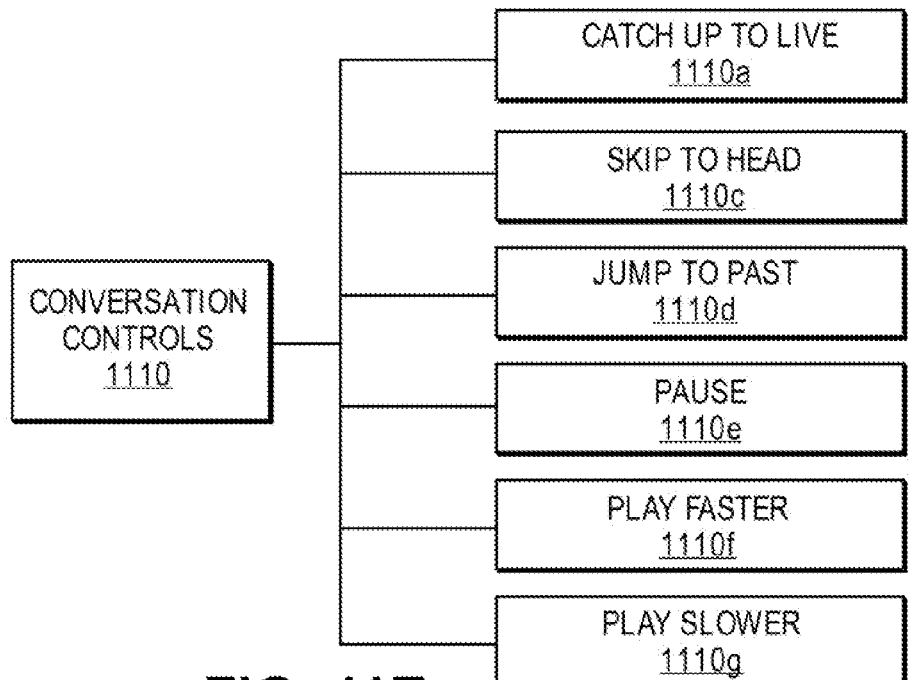

As illustrated in FIG. 11E, conversation control 1110 is a set of functions that allow a User to control their participation in a Conversation. These functions allow a User to catch-up-to live, skip to the Head, jump to a past location, pause, play faster and play slower when Reviewing the Messages of a Conversation. Each of these functions is triggered by the User through the interface 110 on the Device 13.

Catch-up-to-live 1110*a*—A User may Catch Up To Live in an ongoing Conversation using the "CTL" function. When this function is activated, the MCMS application 20 checks the last point in the Conversation the User has reviewed and directs the Store and Stream module 24 to render the Messages not previously heard, using a faster than normal rendering option designated by the User, and to seamlessly transition to live mode when it reaches the head.

Jump to Head 1110*c*—This function enables a User to jump to the Head of a Conversation, skipping over any intervening Messages between the current point of the User in the Conversation and the Head. When implemented, the MCMS application 20 instructs the Store and Stream module to immediately render the Messages at the Head of the Conversation. (If the Head of the Conversation is currently live this is called Jump to Live (JTL).

Jump to past 1110*d*—This function enables a User to jump back to a previous Message or point in the Conversation, similar to a rewind or replay function. When implemented, the MCMS application 20 instructs the Store and Stream module 24 to render Media starting from the rewind point.

Pause 1110*e*—This function enables the User to pause the Reviewing of the Messages of a Conversation. In response, the Store and Stream module 24 stops the rendering of Messages until another command is issued.

Play faster 1110*f*—This function enables a User to render Messages more quickly. In response, the Store and Stream module 24 renders the Messages at a faster rate than normal. The rendering rate may be either specified by the User or the User may select from a number of preset options.

Play slower 1110*g*—This function enables a User to render Messages more slowly. In response, the Store and Stream module 24 renders the Messages at a slower rate than normal. The rendering rate may be either specified by the User or the User may select from a number of preset options.

K.6 Contact Management

Figure 11F:
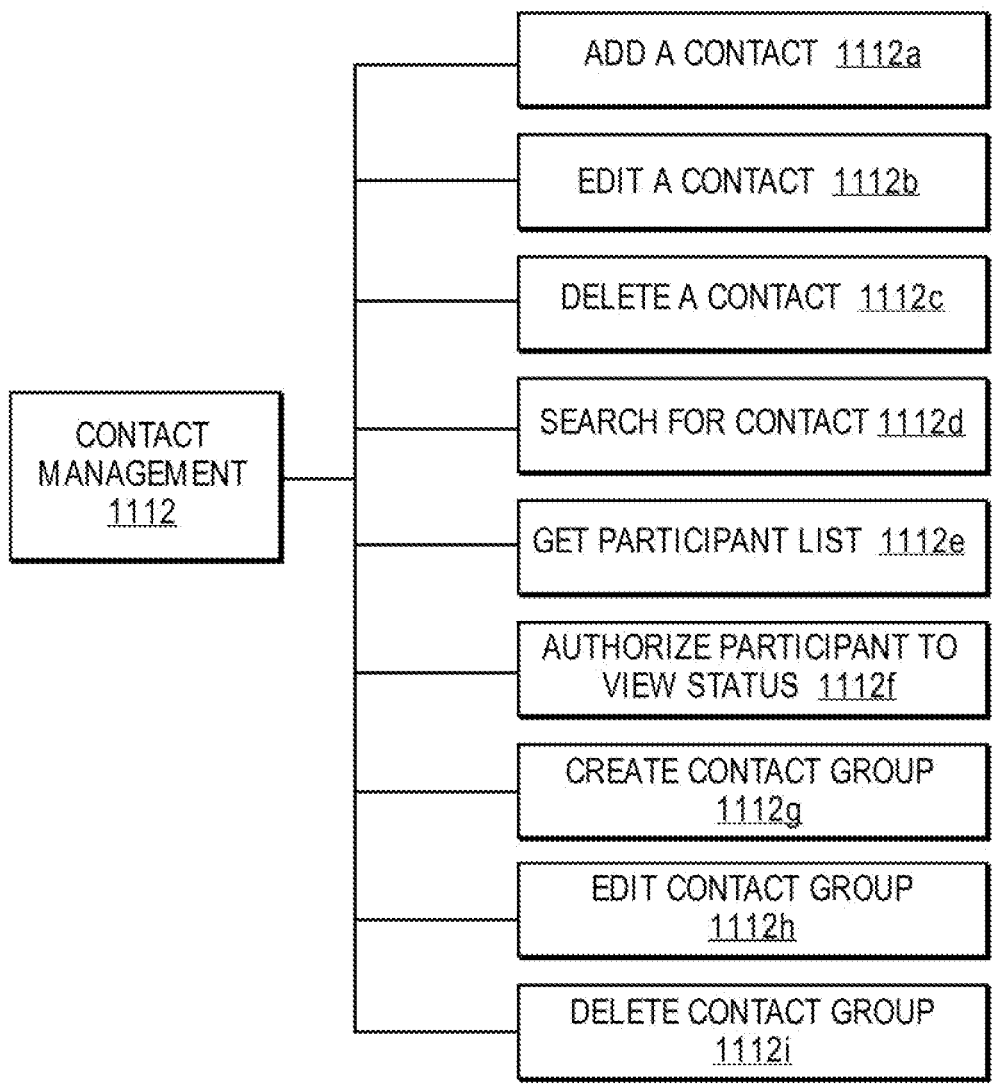

As illustrated in FIG. 11F, the system 10 provides the User with a host of functions for managing Contact lists and user Groups. These functions include the adding, editing, deleting Contacts and user Groups. Each of these functions are implemented by a User though the interface of their Device 13. Any revisions or deletions in a User's Contact list or Group list is stored in the MCMS database 22.

Add a Contact 1112*a*—This function enables a User to add a new Contact to their contact list. The new Contact can be either a registered User or an external contact. Typically the name, phone number(s), type of number (cell, office, home, computer, etc.), email address and other personal information are provided for each contact record.

Edit a Contact 1112*b*—This function enables a User to edit or update an existing contact record.

Delete a Contact 1112*c*—This function enables a User to remove or delete an existing contact record.

Search for a Contact 1112*d*—This function enables a User to search for a specific Contact in their contact list. The search may be conducted using a number of criteria, such as name, phone number, most recently called, most frequently called, Group, etc.

Get a Participant list 1112e—This function enables a User to search and retrieve a list of Participants of a Conversation by a number of different search criteria, including for example by name, most recent outgoing calls, most recent incoming calls, most frequently called, etc.

Authorize a caller to review status 1112f—This function enables a first User to authorize other Users to view the first User's status. Non-authorized Users may not view the status of the first User.

Create a Group of Contacts 1112g—This function enables a User to associate a number of Contacts into a Group. When a User defines a Group, the list of Contacts in that Group are stored in the MCMS database 22.

Edit a Contact Group 1112h—This function enables a User to edit a Group, or update the contact information for a member of the Group.

Delete a Contact Group 1112i—This function enables a User to delete a Group.

L. MCMS Operation

L.1 MCMS-C

Figure 12A:
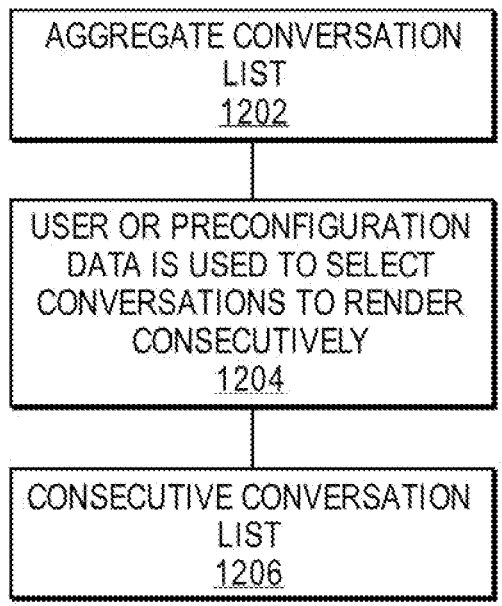
FIGS. 12A through 12C are diagrams illustrating the multiple conversation management system-consecutive (MCMS-C) features of the invention.

As noted above, the MCMS-C operation is similar to MCMS, with the added feature of enabling Users to manage and participate in multiple conversations consecutively through a hierarchical system of Priorities and the time-shifting of Messages, which are automatically managed by the system Implementing the MCMS-C functionality includes three basic processes. As illustrated in FIG. 12A, the first process involves defining a set of Conversations for consecutive rendering. Once the list is defined, a hierarchical set of Priorities and other factors are applied to the indexed media payloads associated with the set of Conversations. The indexed media payloads are then sequenced into a sequencing order. By rendering the media in the sequence order, the Messages of the set of Conversations are consecutively rendered.

Referring to FIG. 12A, a flow chart illustrating the steps for defining the list of Conversations to render consecutively is shown. In the initial step 1202, the User's aggregate list of Conversations is defined. Either the User or pre-configuration data (step 1204) is next used to select the Conversations among the aggregate list for consecutive rendering (step 1206). With a tactical communication system for example, typically pre-configuration data is used to impose the Conversations to be consecutively rendered. With non-tactical applications, the User is typically given a higher degree of flexibility to select the Conversations for consecutive rendering.

Figure 12B:
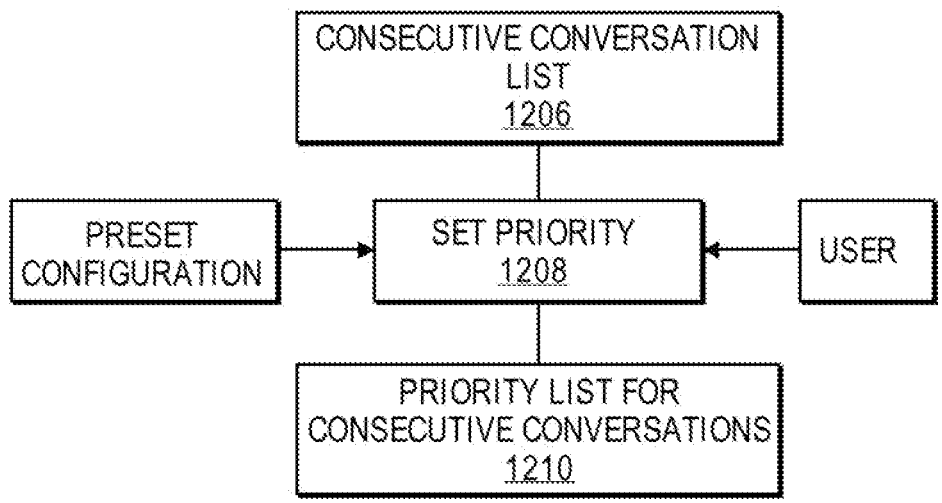

Referring to FIG. 12B, a flow chart illustrating the steps for defining hierarchical set of priorities for rendering the Messages of consecutive Conversations is illustrated. In the initial step (1208), a set of priority rules are defined and applied to the list of Conversations to be rendered consecutively (1206). In various embodiments, the set of priority rules may range from a rigid, hierarchical communication protocol to a highly flexible communication protocol. For example in a tactical communication system where a rigid hierarchy is often desirable, the set of priority rules will preferably impose a specific order in which concurrent Messages are rendered. For example with a first-responder tactical system, Messages from a fire chief may be given the highest priority. The next level of priority may be given to fire fighters inside a burning building. At the next level, priority may be given to fire fighters outside the building, etc. By defining a rigid priority, the current Messages of those supervising the efforts to fight the fire, or those in harm's way, are rendered ahead of those performing a less critical role. With non-tactical communications, a User may be given a great deal of flexibility to define their own priority scheme to meet personal needs. A sales executive may for example define a priority scheme listing consecutive Conversations with clients from the most important to the least important. Or a User may prioritize consecutive Messages among family and friends. Regardless of the scheme used, a priority list for consecutive Conversations is defined (step 1210) in this process.

Figure 12C:
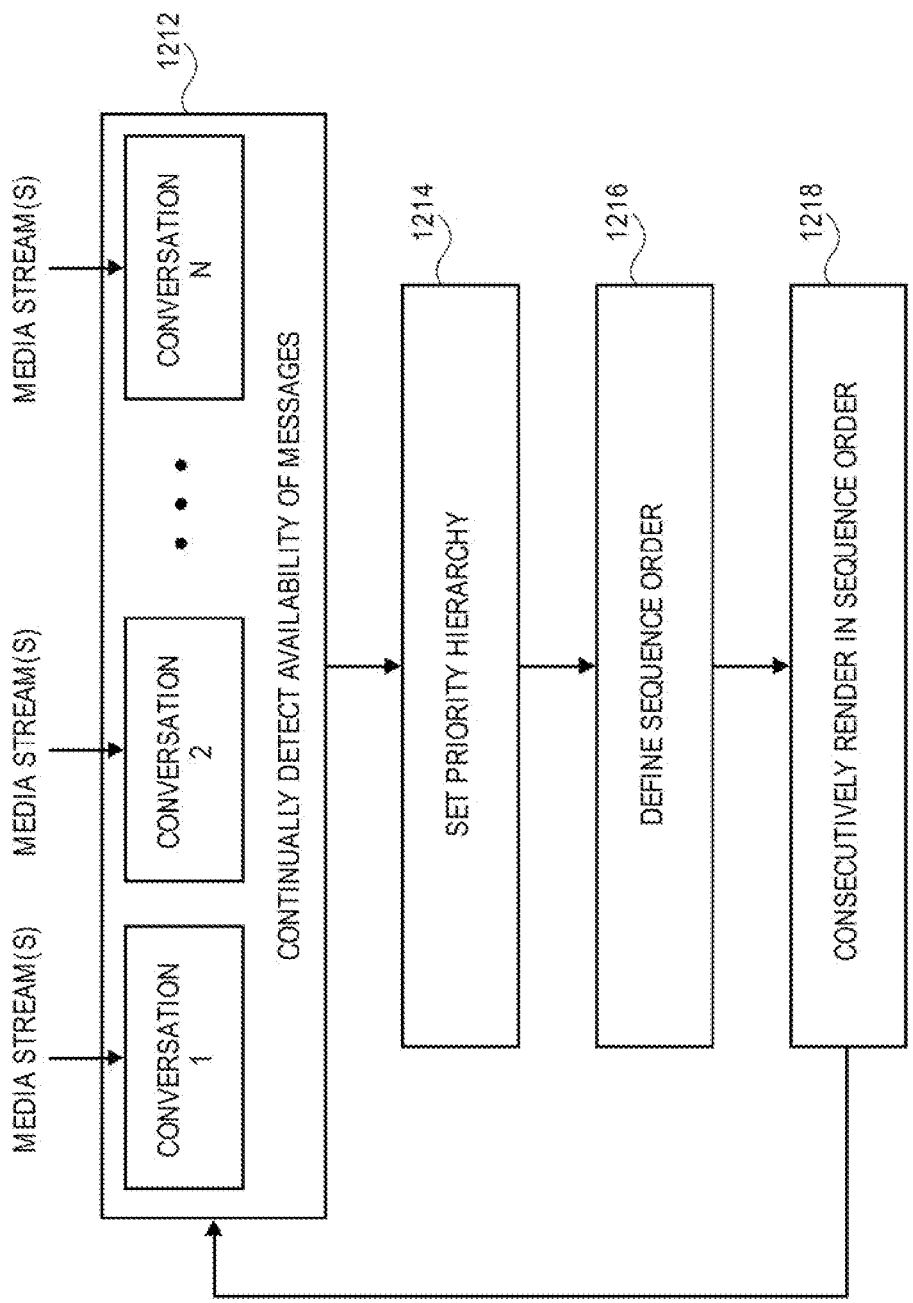

Referring to FIG. 12C, a flow diagram illustrating the construction of a queue of Messages received from the various consecutive Conversations is illustrated. In the initial step, the availability of non-rendered indexed media payloads of Messages (i.e., media streams) is continually detected (step 1212) for each of the Conversations to be consecutively rendered. The priority hierarchy is applied to the available indexed media payload streams (step 1214). Based at least partially on the priority hierarchy, and possible other parameters as mentioned below, the available indexed media payloads are arranged into a sequence order (step 1216). The indexed media payloads are then continuously rendered in the sequence order (step 1218). By continuously repeating the above-described process, the Messages of multiple Conversations are consecutively rendered.

In one embodiment, the sequencing order is based either partly or fully on the priority hierarchy. In alternative embodiments, other parameters in addition to the hierarchy and availability may be considered as well. For example, the sequence order may be defined using one or more parameters such as the switching costs associated with interrupting a currently rendered stream of indexed media payloads with the indexed media payloads of a higher priority Conversation, the quality of the available streams of indexed media payloads, the relative time the indexed media payloads were received, a shuffling order, or from input of a controller of the system.

Typically when conflicts between the Messages of different Conversations occur, the indexed media payloads first in sequence order are rendered while the rendering of other available indexed media payloads are paused or delayed. When there no conflicts, indexed media payloads are immediately rendered as they become available.

In yet another embodiment, the Messages of the consecutively rendered Conversations may be optionally reviewed in a time-shifted mode. If the User of the first communication device generated any Media associated with the consecutively rendered Conversations, that media is indexed and stored in the PIMB 30 of the Device as well as the PIMB(s) 85 of the Servers 16 on the network. Thus when a Conversation is reviewed in the time shifted mode, the User has the option of reviewing just the incoming Messages associated with the Conversation, or both the incoming Messages as well as the Media created by the first User associated with the Conversation in time index order.

L.2 MCMS-S Operation

In the MCMS-S or simultaneous mode, a User of a Client 12 enabled Device 13 may define a set of Conversations for simultaneous rendering. Once the set of Conversations is defined, the indexed media payload streams associated with the set of Conversations are simultaneously rendered on the Device 13, regardless if they overlap or not. In alternative embodiments, the User may optionally render the received indexed media payloads from the set of media streams separately. The indexed media payloads of the simultaneous Conversations may also be optionally rendered in near real-time or in the time-shifted mode.

L.3 MCMS, MCMS-C and MCMS-S Examples

In FIGS. 13A through 13D, a series of diagrams illustrating the attributes of a Conversation and the operation of MCMS, MCMS-C and MSMS-S is illustrated.

Figure 13A:
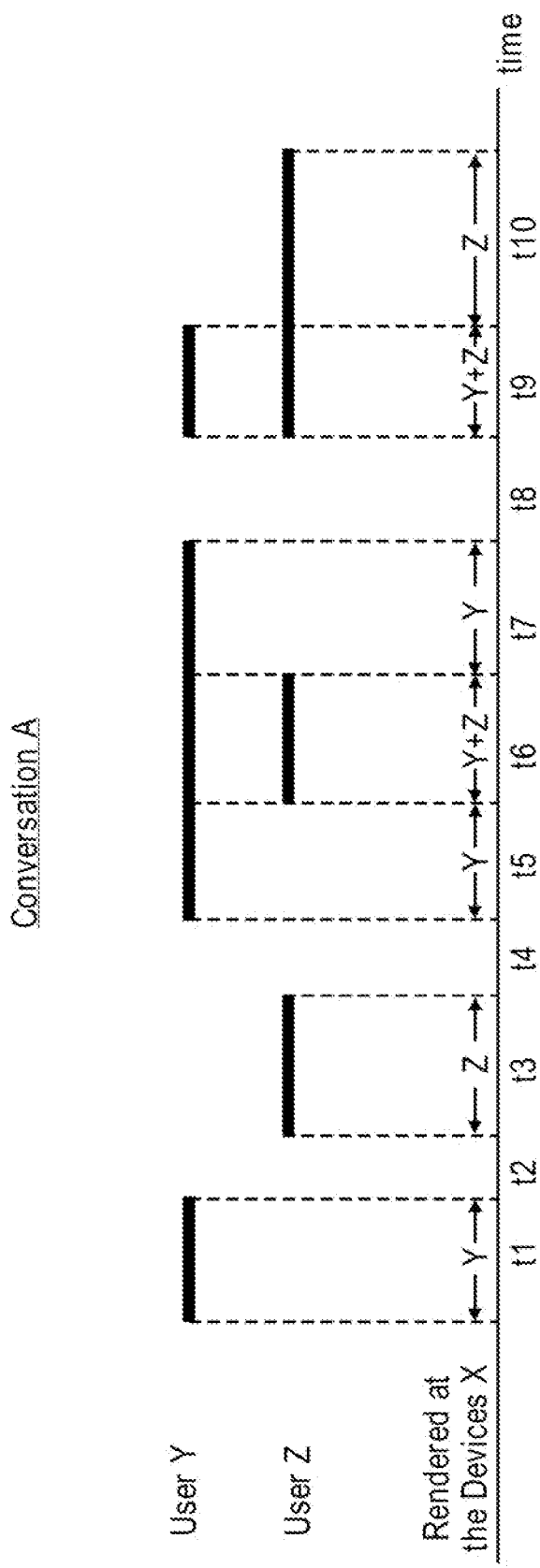
FIGS. 13A through 13D illustrate a series of diagrams detailing the operation of the invention.

In FIG. 13A, a time diagram illustrating the sequence of rendering the indexed media payloads of the Messages of a Conversation labeled "A" between a User "X" and two other users, designated "Y" and "Z". In this example, Media is generated by user Y during the time intervals designated by t1, t5, 56, t7 and t9. Media is generated by user Z during the time intervals designated t3, t6 and t9 through t10.

The rendering sequence at the Device 13 of User X is illustrated at the bottom of the figure. During intervals t1, t5, and t7, Media derived only from Y is rendered. During intervals t3 and t10, only Media derived from Z is rendered. In intervals t6 and t9, Media from both Y and Z is rendered. In intervals t2, t4 and t8, nothing is being rendered because neither users Y or Z are generating Media during these periods. It should be noted that intervals t1 through t10 are not intended to mean fixed time intervals, but rather, just periods of time when Media is being generated.

The diagram of FIG. 13A is useful in illustrating the attributes of Conversations. When one user is generating Media (either Y or Z), that Media is received at the Device 13 of X and is available for rendering. When both users X and Y are generating Media, both Media streams are received at Device 13 of X and is available for Mixing. When neither user X or Y is generating Media, no Media is received at Device 13 of X. As noted above, User X has the option of Reviewing the Media generated during Conversation A in either the near real-time or time-shifted modes. Also the User X has the option of Reviewing the Media in the Mixed format as illustrated, or to separately Reviewing the Media from Y and Z in the time-shifted mode.

Figure 13B:
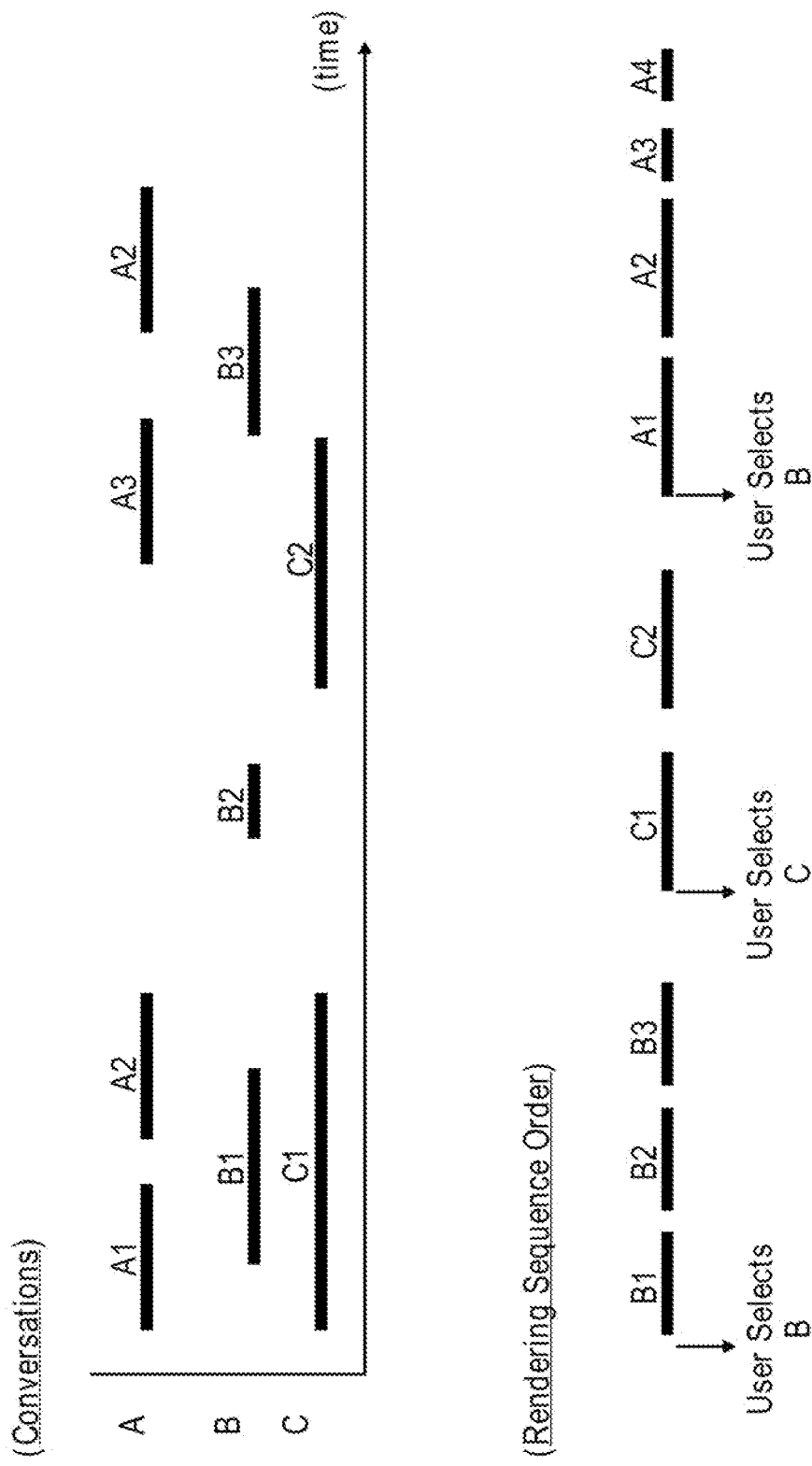

FIG. 13B illustrates the operation of MCMS. In this example, the User is Participating in three Conversations, designated A, B and C. For Conversations A, B, and C, the User either generates or receives Messages designated (A1, A2, A3, and A4), (B1, B2 and B3) and (C1 and C2) respectively. The timing and duration of each Message is indicated by the starting point along the time-line. It is useful to note that in this example, all of the Messages overlap in time to some degree, except Message B2.

With the MCMS application, the User selects one Conversation as current. For the selected Conversation, the User may Review incoming Messages and generate Messages which are transmitted to the other Participants of the Conversation. In this example, the User selects in order Conversation B, C and A as current respectively. The Message sequence is therefore initially B1, B2, and B3, followed by C1 and C2, and then finally A1 through A4. Again, while a particular Conversation is selected as current, the User may transition between the near real-time and the time-shifted modes and back again. The final rendering as illustrated in the diagram is not intended to correspond in timing of the received Messages as illustrated in the top portion of the diagram. Rather the lower portion of the diagram is intended to show only the rendering order of the Messages, based on Conversation order selected by the User.

The example of FIG. 13B is thus useful in illustrating the attributes of the MCMS application. A User selects one Conversation as current. The other Conversations are paused. The User may also transition the current Conversation among all the Conversations at any time.

Figure 13C:
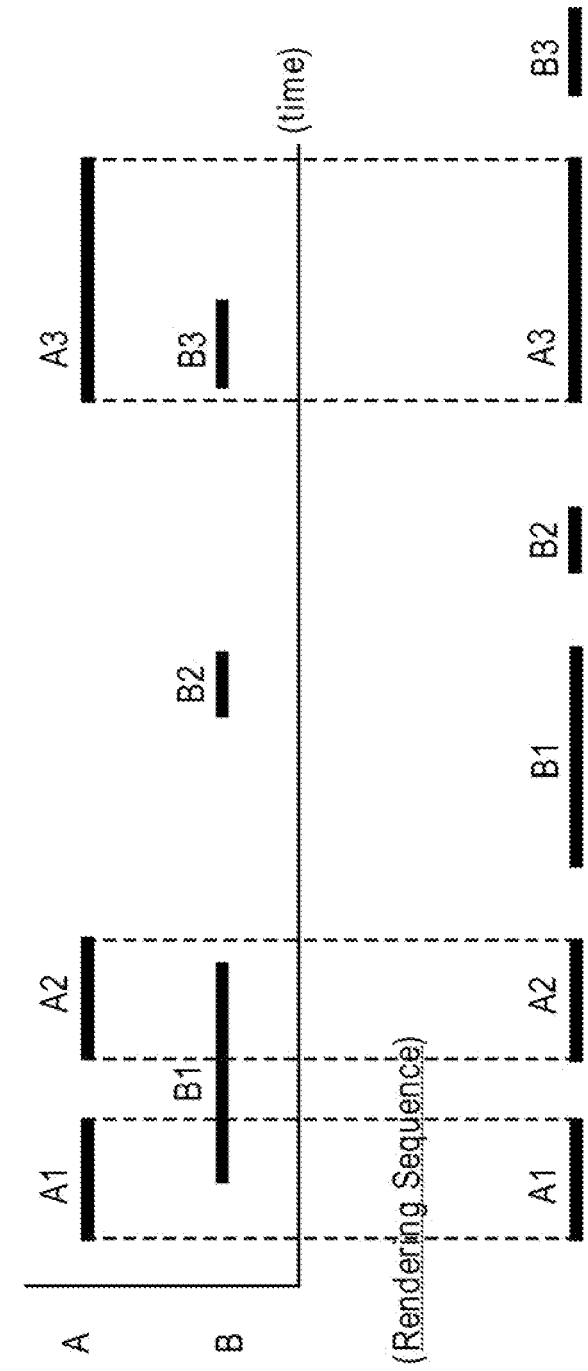

Referring to FIG. 13C, a diagram illustrating the operation of MCMS-C is illustrated. In this example, the User is Participating in two consecutive Conversations, A and B. With Conversation A, three Messages are received A1, A2, and A3. With Conversation B, three Messages are received B1, B2 and B3. It is useful to note that with this example, Message B1 conflicts with Messages A1. Also Conversation A has a higher priority that Conversation B.

During the consecutive rendering of the two Conversations, the higher priority Messages A1 and A2 are first rendered in near real-time, as represented by the vertical dashed lines in the figure. Since there is a relatively large time gap between Messages A2 and A3, this space is filled by time shifting and rendering Messages B1 and B2. When A3 arrives, it is rendered in near real-time, while Message B3 is rendered only after the higher priority Message A3 is rendered. By time-shifting rendering of the lower priority Messages between the higher Priority Messages, consecutive multiple conversations can be managed. It should be noted that in this simple example, priority is the only parameter used to determine the consecutive order for rendering. As noted above, a number of other parameters may be used as well.

Figure 13D:
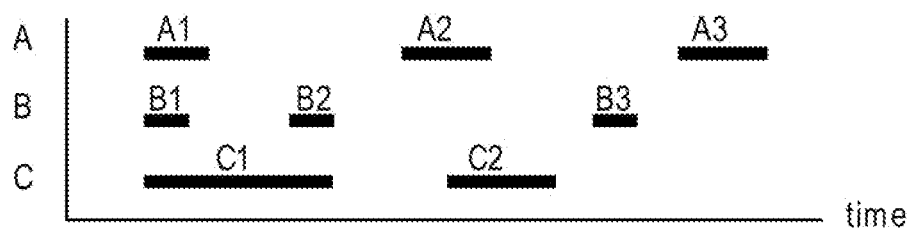
Figure 13D:
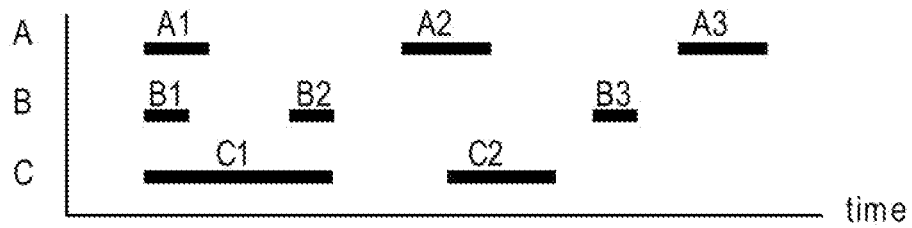

Referring to FIG. 13D, a diagram illustrating MCMS-S is illustrated. In this example, a User is engaged in three simultaneous Conversations, A, B and C. The Messages A1, A2 and A3, B1, B2 and B3, and C1 and C2 are received for each Conversation A, B and C are shown in the diagram respectively. With the MCMS-S, the incoming Messages are rendered at a recipients Device 13 as they are received. The rendering sequence of the Messages of the three Conversations A, B and C, as illustrated in the lower portion of the diagram, are therefore the same as when the Messages were received. In this manner, multiple Conversations may be simultaneously rendered.

In the aforementioned examples, several variations of the MCMS application were described, including MSMS-C and MCMS-S. Regardless of the specific type of MCMS application used, they all share several common characteristics. In each case, the Conversations are defined by a threaded sequence or organization of Messages. The Messages are segmented from a stream of Media, with each Message given a sequence identifier and indexed by the time the Media was created. Depending on the variation of the MCMS application, Messages can be rendered in accordance with one or more rendering options. The rendering options include, in one form or another, the filtering, grouping overlapping and/or serialization of Messages, using anywhere from zero to a plurality of different attributes. In this manner, multiple Conversations, each including a string of Messages, can be conducted on a single Client 12 enabled Device 13. Lastly, each of the variations of MCMS may handle the receipt of interrupt Messages in the same way. When an interrupt Message is received, it typically takes precedent over and is rendered before other Messages belonging to other Conversations.

M. Client and Server Hardware

Figure 14A:
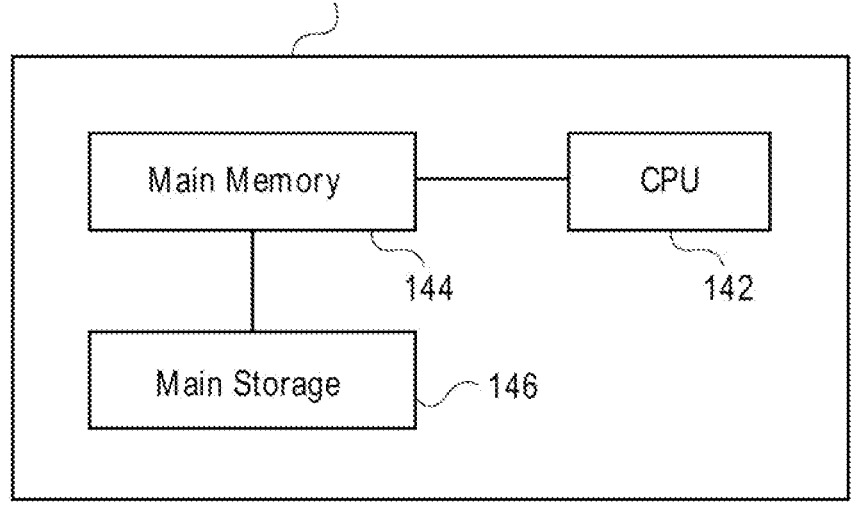
FIGS. 14A and 14B are block diagrams that illustrate the hardware used for running the Client and Server applications of the invention.

Referring to FIG. 14A, a block diagram 140 illustrating the hardware of a Device 13 used for storing and executing the Client application 12 is shown. The hardware includes a CPU 142, main memory 144 and mass storage 146. As is well known in the art, the Client application 12 is loaded and stored in main memory 144 and mass storage 146 and executed by the CPU 142.

Figure 14B:
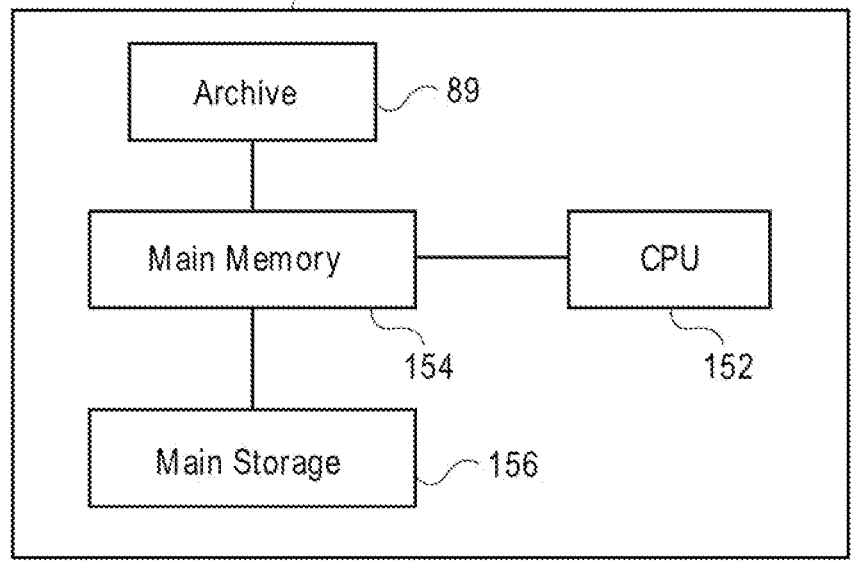

Referring to FIG. 14B, a block diagram 150 illustrating the hardware of a Server 16 used for storing and executing the server application 78 is shown. The hardware includes a CPU 152, main memory 154, mass storage 156, and the archive 89. As is well known in the art, the server application 78 is loaded and stored in main memory 154 and mass storage 156 and executed by the CPU 152. As noted above, indexed media payloads of one or more Users are stored in the archive 89.

Although many of the components and processes are described above in the singular for convenience, it will be appreciated by one of skill in the art that multiple components and repeated processes can also be used to practice the techniques of the system and method described herein. Further, while the invention has been particularly shown and described with reference to specific embodiments thereof, it will be understood by those skilled in the art that changes in the form and details of the disclosed embodiments may be made without departing from the spirit or scope of the invention. For example, embodiments of the invention may be employed with a variety of components and should not be restricted to the ones mentioned above. It is therefore intended that the invention be interpreted to include all variations and equivalents that fall within the true spirit and scope of the invention.

What is claimed is:

1. A method of providing and operating a progressive, store and forward, messaging system capable of supporting near real-time communication, the method comprising:

providing a communication application, configured to be embedded in a non-transitory computer readable medium on a communication device, the communication application including a progressive, store and forward, messaging module that progressively stores and progressively transmits over a network media of an outgoing message created using the communication device as the media of the outgoing message is created, the outgoing message intended for a recipient using a second communication device; and operating a progressive, store and forward, node on the network, the progressive, store and forward node on the network configured to:

(i) progressively receive the voice media of the outgoing message from the communication device;

(ii) progressively store the voice media of the outgoing message at the progressive, store and forward, node as the voice media of the outgoing message is progressively received; and (iii) progressively forward the voice media of the outgoing message to the second communication device, as the voice media is progressively received, when the second communication device is connected to and available on the network, so that the voice media of the outgoing message can be selectively reviewed in near real-time on the second communication device, without establishing a synchronous connection over the network between the communication device and the second communication device.

2. The method of claim 1, wherein the selective near real-time review of the voice media of the outgoing message means the rendering of the voice media on the second communication device, as the voice media is transmitted by the communication device and progressively forwarded to the second communication device by the progressive, store and forward, node, delayed by the latency on the network between the two communication devices.

3. The method of claim 1, further configuring the progressive, store and forward, node to progressively deliver the voice media of the outgoing message to the second communication device as the voice media is transmitted by the communication device.

4. The method of claim 1, further configuring the progressive, store and forward, node to progressively forward the voice message to the second communication device as the voice message is being created and transmitted by the first communication device.

5. The method of claim 1, further configuring the progressive, store and forward, messaging module to guarantee delivery of the outgoing voice message to the progressive, store and forward, node by transmitting the voice media of the outgoing message out of storage on the communication device if the communication device was disconnected from the network and/or unable to transmit the outgoing message when the voice media was created.

6. The method of claim 1, further configuring the progressive, store and forward, node to guarantee the delivery of the outgoing voice message to the second communication device by transmitting the outgoing message out of storage if the second communication device was disconnected from the network and/or unable to receive the outgoing message when received at the progressive, store and forward, node.

7. The method of claim 1, further configuring the progressive, store and forward, node to check the integrity of the outgoing voice message by noting missing and/or defective voice media of the outgoing voice message received at the progressive, store and forward, node.

8. The method of claim 1, further configuring the progressive, store and forward, messaging module to transmit a complete copy of the outgoing voice message by retransmitting lost and/or defective voice media in response to retransmission requests from the progressive, store and forward, node.

9. The method of claim 1, further configuring the progressive, store and forward, node to deliver a complete copy of the outgoing voice message to the second communication device by retransmitting lost and/or defective voice media in response to retransmission requests from the second communication device.

10. The method of claim 1, further configuring the progressive, store and forward, messaging module to progressively transmit the voice media of the outgoing voice message using a non-IP address identifier associated with the recipient, the progressive, store and forward, node using the non-IP address identifier to identify the second communication device on the network and to automatically and progressively transmit the voice media of the outgoing voice message over the network to the second communication device when connected to and available on the network.

11. The method of claim 1, further configuring the progressive, store and forward, node to guarantee delivery of the outgoing voice message to the second communication device, if the second communication device is disconnected from the network when the outgoing message is received at the progressive, store and forward node, by:

(i) ascertaining when the second communication device reconnects to the network; and (ii) transmitting the voice message out of storage on the progressive, store and forward node when the second communication device reconnects to the network.

12. The method of claim 1, further configuring the progressive, store and forward, messaging module to store the voice media of the outgoing voice message and voice media of an incoming voice message on the communication device so that the voice media of the incoming and/or the outgoing voice messages may be selectively rendered from storage.

13. The method of claim 1, further configuring the progressive, store and forward, messaging module to generate retransmission requests for voice media of an incoming voice message noted as missing and/or defective so that a complete copy of the voice media of the incoming voice message as transmitted is received at the communication device when the retransmission requests are satisfied.

14. The method of claim 1, further configuring the progressive, store and forward, messaging module to selectively render the voice media of an incoming voice message for the first time:
   (i) progressively as the voice media is progressively received over the network in a near real-time rendering mode; and
   (ii) in a time-shifted mode by retrieving and progressively rendering the voice media of the incoming voice message out of storage.

15. The method of claim 1, further configuring the progressive, store and forward, messaging module to selectively render voice media of an incoming voice message in either a near real-time mode or a time-shifted mode without interfering with the progressive storage of the voice media of either the outgoing message and/or another incoming voice message.

16. The method of claim 1, further configuring the progressive, store and forward, messaging module to thread together one or more outgoing voice messages and one or more incoming voice messages sharing a common attribute into a conversation.

17. The method of claim 1, wherein the outgoing voice message, in addition to voice media, comprise one or more of the following types of media: audio, video, sensor data, radio signals, position or GPS information, or any combination thereof.

18. The method of claim 1, wherein operating the progressive, store and forward, node on the network further comprises configuring the progressive, store and forward, node to:
   (i) check the integrity of the outgoing message by noting and obtaining any missing/defective voice media;
   (ii) find a delivery route over the network for delivering the outgoing message to the second communication device associated with the recipient; and
   (iii) automatically forwarding the outgoing message over the delivery route as the delivery route becomes available.

* * * * *

UNITED STATES PATENT AND TRADEMARK OFFICE
CERTIFICATE OF CORRECTION

PATENT NO. : 8,948,354 B2  
APPLICATION NO. : 14/463995  
DATED : February 3, 2015  
INVENTOR(S) : Katis et al.

Page 1 of 1

It is certified that error appears in the above-identified patent and that said Letters Patent is hereby corrected as shown below:

In the Specification:

Column 26, line 40, change "PIMB Reader 28" to --PIMB Reader 26--.

Signed and Sealed this
Twenty-ninth Day of March, 2016

Michelle K. Lee
*Director of the United States Patent and Trademark Office*